US012655008B2

(12) United States Patent
Rodriguez et al.

(10) Patent No.: US 12,655,008 B2
(45) Date of Patent: Jun. 16, 2026

(54) FLUID LINE CONNECTOR ARRANGEMENTS FOR HAND-HELD BEVERAGE DISPENSERS AND RELATED METHODS FOR USE

(71) Applicant: LANCER CORPORATION, San Antonio, TX (US)

(72) Inventors: Ricardo Abugarade Rodriguez, Schertz, TX (US); Anthony Joseph Behe, Jr., Converse, TX (US); John Dsouza, Live Oak, TX (US); Paul V. Watkins, Jr., Conifer, CO (US)

(73) Assignee: Lancer Corporation, San Antonio, TX (US)

( * ) Notice: Subject to any disclaimer, the term of this patent is extended or adjusted under 35 U.S.C. 154(b) by 121 days.

(21) Appl. No.: 18/809,724

(22) Filed: Aug. 20, 2024

(65) Prior Publication Data

US 2024/0409386 A1 Dec. 12, 2024

Related U.S. Application Data

(63) Continuation-in-part of application No. PCT/US2023/025909, filed on Jun. 21, 2023, and a continuation-in-part of application No. 18/126,410, filed on Mar. 25, 2023, now Pat. No. 12,157,659, which is a continuation of application No. 17/737,469, filed on May 5, 2022, now Pat. No. 11,643,318, which is a continuation of application No. 17/339,917, filed on Jun. 4, 2021, now Pat. No. 11,345,584.

(60) Provisional application No. 63/354,234, filed on Jun. 21, 2022, provisional application No. 63/129,380, filed on Dec. 22, 2020, provisional application No. 63/034,762, filed on Jun. 4, 2020.

(51) Int. Cl.
*B67D 1/00* (2006.01)
*B67D 1/14* (2006.01)

(52) U.S. Cl.
CPC ......... *B67D 1/0084* (2013.01); *B67D 1/1438* (2013.01); *B67D 2001/0094* (2013.01)

(58) Field of Classification Search
CPC ................ B67D 1/0084; B67D 1/1438; B67D 2001/0094; B67D 2210/0006
See application file for complete search history.

(56) References Cited

U.S. PATENT DOCUMENTS 3,703,187 A 11/1972 Booth
4,887,740 A 12/1989 Smith
4,986,449 A * 1/1991 Valiyee ................ B67D 1/0084 222/144.5
5,042,692 A 8/1991 Valiyee et al.
(Continued)

OTHER PUBLICATIONS

International Preliminary Report on Patentability for PCT Application No. PCT/US2023/025909, Issued Aug. 30, 2024 for PCT Application Counterpart to U.S. Appl. No. 18/809,724.

*Primary Examiner* — Donnell A Long
(74) *Attorney, Agent, or Firm* — Christopher L. Makay

(57) ABSTRACT

A fluid line connector arrangement includes a first connector assembly of the fluid line connector arrangement, as particularly configured to efficiently connect and secure fluid line fittings to a hand-held beverage dispenser, and a second connector assembly of the fluid line connector arrangement, as particularly configured to efficiently connect and secure a fluid line fittings to a beverage fluid source.

15 Claims, 62 Drawing Sheets

(56) References Cited

U.S. PATENT DOCUMENTS

| | | | | |
|---|---|---|---|---|
| 5,152,429 | A * | 10/1992 | Billings | B67D 1/10 222/144.5 |
| 6,322,051 | B1 | 11/2001 | Salmela | |
| 7,028,864 | B2 | 4/2006 | McCann et al. | |
| 7,080,525 | B2 | 7/2006 | McCann et al. | |
| 7,658,006 | B2 | 2/2010 | Schroeder | |
| 7,931,382 | B2 | 4/2011 | Hecht | |
| 8,109,413 | B2 | 2/2012 | Schroeder et al. | |
| 8,123,079 | B2 | 2/2012 | Schroeder et al. | |
| 8,162,182 | B2 | 4/2012 | Martindale | |
| 8,177,100 | B2 | 5/2012 | Salmela et al. | |
| 8,251,087 | B2 | 8/2012 | Hecht | |
| 8,272,536 | B2 | 9/2012 | Valiyee | |
| 8,336,736 | B2 | 12/2012 | Schroeder et al. | |
| 8,387,829 | B2 | 3/2013 | Schroeder et al. | |
| 8,418,888 | B2 | 4/2013 | Schroeder et al. | |
| 8,448,821 | B2 | 5/2013 | Hecht | |
| 8,459,505 | B2 | 6/2013 | Martindale et al. | |
| 8,479,954 | B2 | 7/2013 | Schroeder et al. | |
| 8,573,254 | B2 | 11/2013 | Martindale et al. | |
| 8,770,442 | B2 | 7/2014 | Santy et al. | |
| 8,814,003 | B2 | 8/2014 | Santy et al. | |
| 8,881,949 | B2 | 11/2014 | Schroeder et al. | |
| 8,944,290 | B2 | 2/2015 | Schroeder | |
| 9,010,579 | B2 | 4/2015 | Baker et al. | |
| 9,038,986 | B2 | 5/2015 | Hecht | |
| 9,085,451 | B2 | 7/2015 | Santy | |
| 9,192,191 | B2 | 11/2015 | Hecht et al. | |
| 9,284,176 | B2 | 3/2016 | Tuyls et al. | |
| 9,417,652 | B2 | 8/2016 | Hecht et al. | |
| 9,546,085 | B2 | 1/2017 | Baron et al. | |
| 9,622,615 | B2 | 4/2017 | Hecht et al. | |
| 9,655,985 | B2 | 5/2017 | Hecht et al. | |
| 9,840,406 | B2 | 12/2017 | Santy et al. | |
| 9,964,234 | B2 | 5/2018 | Hecht et al. | |
| 9,988,256 | B2 | 6/2018 | Salem | |
| 10,053,353 | B2 | 8/2018 | Tuyls et al. | |
| 10,065,847 | B2 | 9/2018 | Tuyls et al. | |
| 2008/0223876 | A1* | 9/2008 | Schroeder | B67D 1/0084 222/144.5 |
| 2009/0120960 | A1* | 5/2009 | Schroeder | B67D 1/0086 222/144.5 |
| 2009/0283543 | A1* | 11/2009 | Schroeder | F16L 39/00 222/144.5 |
| 2011/0042415 | A1* | 2/2011 | Santy | B67D 1/0867 222/144.5 |
| 2013/0048674 | A1* | 2/2013 | Baker | B67D 1/0086 222/144.5 |
| 2013/0119089 | A1* | 5/2013 | Tuyls | B67D 1/0865 165/104.11 |
| 2013/0221025 | A1* | 8/2013 | Schroeder | B67D 1/00 222/23 |
| 2016/0153708 | A1* | 6/2016 | Tuyls | B67D 1/0865 165/100 |
| 2016/0176696 | A1* | 6/2016 | Hecht | B67D 1/0888 222/144.5 |
| 2021/0380389 | A1 | 12/2021 | Martin et al. | |

* cited by examiner

S8
S6
S4
S2
CW
S1
PW
S3
S5
S7
68
69
70
71
72
76
77
38
39

FLUID LINE CONNECTOR ARRANGEMENTS FOR HAND-HELD BEVERAGE DISPENSERS AND RELATED METHODS FOR USE

BACKGROUND OF THE INVENTION

1. Field of the Invention

The present invention relates to post-mix drink dispensing, and, more particularly, but not by way of limitation, to features and accessories for hand-held beverage dispensers, including arrangements for removal or attachment of post-mix type drink dispenser assemblies from or to hand-held beverage dispensers; and connector assemblies for connecting flow control assemblies to hand-held beverage dispensers.

2. Description of the Related Art

Post-mix type hand-held beverage dispensers, such as are often referred to as bar guns or soda guns are well known conveniences in the food and bar service industries, enabling beverages to be prepared as they are dispensed by mixing together a beverage product, such as, for example, a syrup or like concentrate, and a diluent, such as, for example, plain water or carbonated water. Beverage product and diluent sources connect with a flow control assembly utilized to provide ON-OFF flow control and regulated flow of the beverage products and diluents to a hand-held beverage dispenser. A fluid line connector arrangement couples the flow control assembly with the hand-held beverage dispenser to deliver the beverage products and diluents from the flow control assembly to the hand-held beverage dispenser while allowing portability of the hand-held beverage dispenser.

SUMMARY OF THE INVENTION

A fluid line connector arrangement may include a connector assembly at the proximal end of the fluid line assembly, in addition to the connector assembly provided at the distal end. Like the connector assembly provided at the distal end, which implements a header assembly about a header plate of the header assembly, the connector assembly at the proximal end of the fluid line assembly implements a header assembly about a header bar. Like the header plate of the first connector assembly, the header bar of the second connector assembly comprises specially formed tapered connector holes, which are utilized to receive and retain the barbed quick connect fittings and the proximal ends of the individual fluid lines in the same manner as does the header plate receive and retain the barbed quick connect fittings at the distal ends of the individual fluid lines.

BRIEF DESCRIPTION OF THE DRAWINGS

FIG. 6 is a top rear end isometric view;

FIG. 7 is a top front end isometric view;

FIG. 8 is a rear end elevational view;

FIG. 9 is a cross-sectional plan view taken along lines 9-9 of FIG. 8; and FIG. 10 is a cross-sectional plan view taken along lines 10-10 of FIG. 8.

FIG. 11 is an exploded top rear end isometric view;

FIG. 12 is a top front end isometric view; and

FIG. 13 is a right side elevational view.

FIG. 14A is a top plan view;

FIG. 14B is a cross-sectional elevational view taken along lines 14B-14B of FIG. 14A;

FIG. 15A is a top plan view; and

FIG. 15B is a cross-sectional elevational view taken along lines 15B-15B of FIG. 15A.

FIG. 16A is a partially exploded top rear end isometric view; and

FIG. 16B is a partially exploded bottom front end isometric view.

FIG. 17A is a bottom front end isometric view; and

FIG. 17B is a right side elevational view.

FIG. 18A is a partially exploded bottom front end isometric view; and

FIG. 18B is a partially exploded right side elevational view.

FIG. 19A is a bottom front end isometric view; and

FIG. 19B is a right side elevational view.

FIG. 20A is a bottom front end isometric view; and

FIG. 20B is a right side elevational view.

FIG. 22 is a rear end isometric view; and

FIG. 23 is a right side elevational view.

FIG. 25A is a right side elevational view; and

FIG. 25B is a bottom plan view.

FIG. 26A is a right side elevational view; and

FIG. 26B is a top plan view.

FIG. 27A is a top front end isometric view;

FIG. 27B is a bottom front end isometric view; and

FIG. 27C is a front end elevational view.

FIG. 28A is a top front end isometric view;

FIG. 28B is a bottom front end isometric view;

FIG. 28C is a front end elevational view;

FIG. 28D is a top rear end isometric view; and

FIG. 28E is a rear end elevational view.

FIG. 29A is an exploded cross-sectional elevational view corresponding to the view of FIG. 29C, and showing an initial stage of interconnection;

FIG. 29B is a partially exploded cross-sectional elevational view corresponding to the view of FIG. 29C, and showing an intermediate stage of interconnection; and FIG. 29C is a cross-sectional elevational view taken along lines 29C-29C of FIG. 28E, and showing a final stage of interconnection.

FIG. 31A is an exploded cross-sectional elevational view corresponding to the view of FIG. 29A, and showing an initial stage of application;

FIG. 31B is a partially exploded cross-sectional elevational view corresponding to the view of FIG. 29B, and showing a first intermediate stage of application;

FIG. 31C is a cross-sectional elevational view corresponding to the view of FIG. 29C, and showing a second intermediate stage of application; and FIG. 31D is a cross-sectional elevational view corresponding to the view of FIG. 29C, and showing a final stage of application.

FIG. 33A is a top front end isometric view; and

FIG. 33B is a bottom front end isometric view.

FIG. 34 is a top front end isometric view;

FIG. 35 is a bottom front end isometric view;

FIG. 36 is a front end elevational view;

FIG. 37 is a right side elevational view;

FIG. 38 is a cross-sectional elevational view taken along lines 38-38 of FIG. 36; and FIG. 39 is a cross-sectional plan view taken along lines 39-39 of FIG. 36.

FIG. 40 is an exploded top front end isometric view;

FIG. 41 is a top rear end isometric view; and

FIG. 42 is a right side elevational view.

FIG. 43 is a top plan view; and

FIG. 44 is a cross-sectional elevational view taken along lines 44-44 of FIG. 43.

FIG. 45A is a partially exploded top front end isometric view; and

FIG. 45B is a partially exploded bottom rear end isometric view.

FIG. 46A is a top front end isometric view; and

FIG. 46B is a top plan view.

FIG. 47A is a partially exploded top front end isometric view; and

FIG. 47B is a partially exploded top plan view.

FIG. 48A is a top front end isometric view; and

FIG. 48B is a top plan view.

FIG. 49A is a top front end isometric view; and

FIG. 49B is a top plan view.

FIG. 53A is a top front end isometric view; and

FIG. 53B is a top plan view.

FIG. 54A is a bottom rear end isometric view; and

FIG. 54B is a bottom plan view.

FIG. 55A is a front end elevational view;

FIG. 55B is a rear end elevational view;

FIG. 55C is a top plan view; and

FIG. 55D is a right side elevational view.

FIG. 56A is a cross-sectional elevational view taken along lines 56A-56A of FIG. 55C; and FIG. 56B is a bottom front end isometric view of the cross-sectional elevational view of FIG. 56A.

FIG. 58A is a cross-sectional elevational view taken along lines 58A-58A of FIG. 57; and FIG. 58B is a top front end isometric view of the cross-sectional elevational view of FIG. 58A.

FIG. 62A is a cross-sectional elevational view taken along lines 62A-62A of FIG. 61; and FIG. 62B is a top front end isometric view of the cross-sectional elevational view of FIG. 62A.

FIGS. 63-64 illustrate various aspects of a first stage in deployment of the second connector assembly for use with the exemplary suitable beverage fluid source, where:

FIG. 63 is an isometric view depicting the front end of the second connector assembly as arranged with the exemplary suitable beverage fluid source; and FIG. 64 is an isometric view depicting the rear end of the second connector assembly as arranged with the exemplary suitable beverage fluid source.

FIGS. 65A-65B illustrate various aspects of the adaptation of the exemplary suitable beverage fluid source for use with the fluid line connector arrangement, where:

FIG. 65A is a front end isometric view; and

FIG. 65B is a front elevational view.

FIG. 66 is an isometric view illustrating various aspects of a second stage in deployment of the second connector assembly for use with the exemplary suitable beverage fluid source.

FIG. 67 is a partially exploded top front end isometric view illustrating the header subassembly of the connector assembly with a first housing member and second housing member of an alternative enclosure subassembly of an alternative second connector assembly.

FIG. 68 is a partially exploded bottom rear end isometric view illustrating various aspects of a first stage in deployment of the alternative second connector assembly for use with an alternative exemplary suitable beverage fluid source.

FIG. 69 is a bottom rear end isometric view illustrating various aspects of a second stage in deployment of the second connector assembly for use with the alternative exemplary suitable beverage fluid source.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

As will be readily appreciated by those of ordinary skill in the relevant arts, the depicted hand-held beverage dispenser 5 is of the well-known class of dispensers often referred to as bar guns or soda guns. In any case, and like the dispensers of its class, the hand-held beverage dispenser 5 of the present invention is intended for use in dispensing-on demand-a variety of post-mix beverages.

Figure 1:
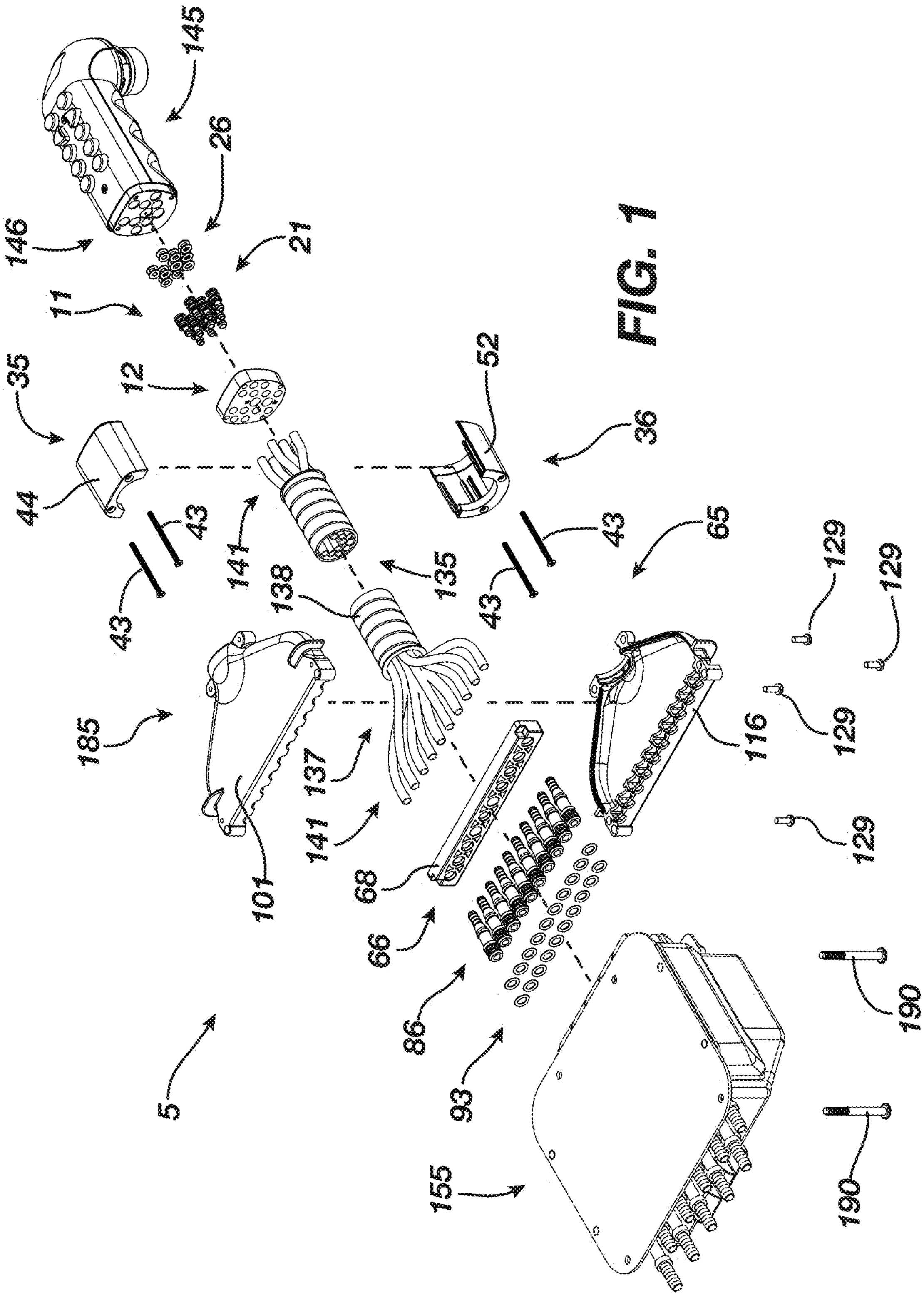
FIG. 1 is an exploded top isometric view illustrating various aspects of a fluid line connector arrangement according to a preferred embodiment, together with an exemplary hand-held beverage dispenser and an exemplary beverage fluid source as are representative of such hand-held beverage dispensers and beverage fluid sources suitable for use in connection with the fluid line connector arrangement.
Figure 2:
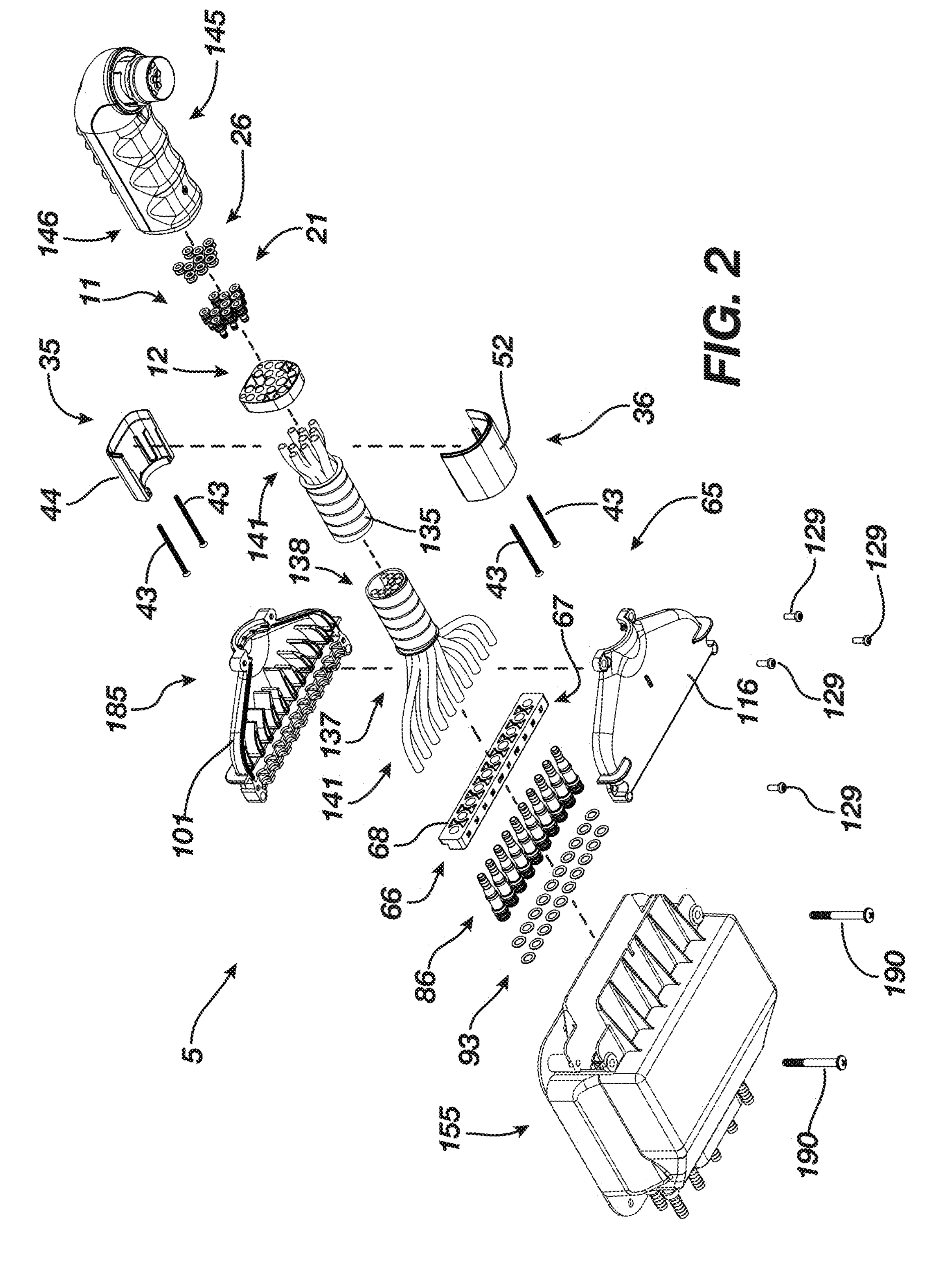
FIG. 2 is an exploded bottom isometric view illustrating various aspects of the fluid line connector arrangement.
Figure 3:
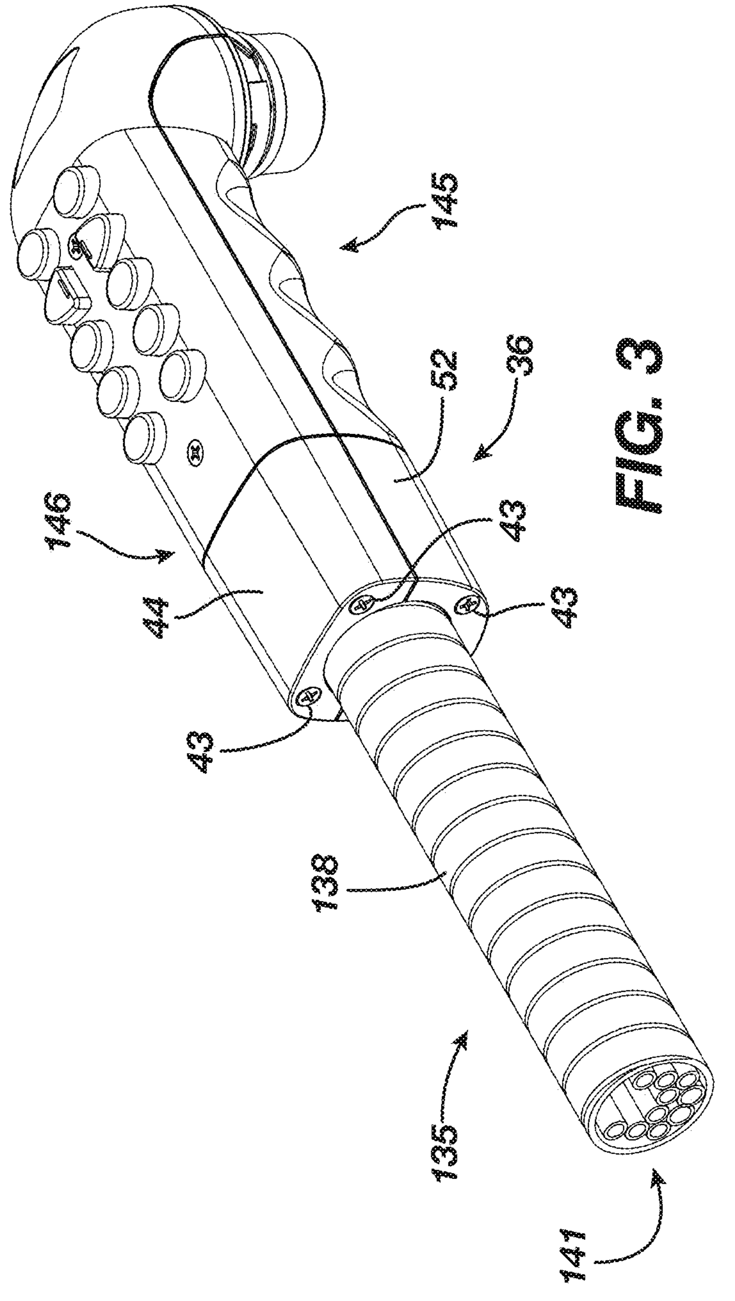
FIG. 3 is a top rear end isometric view illustrating a first connector assembly of the fluid line connector arrangement as deployed in use to efficiently connect and secure a plurality of fluid line fittings to the exemplary suitable hand-held beverage dispenser.
Figure 4:
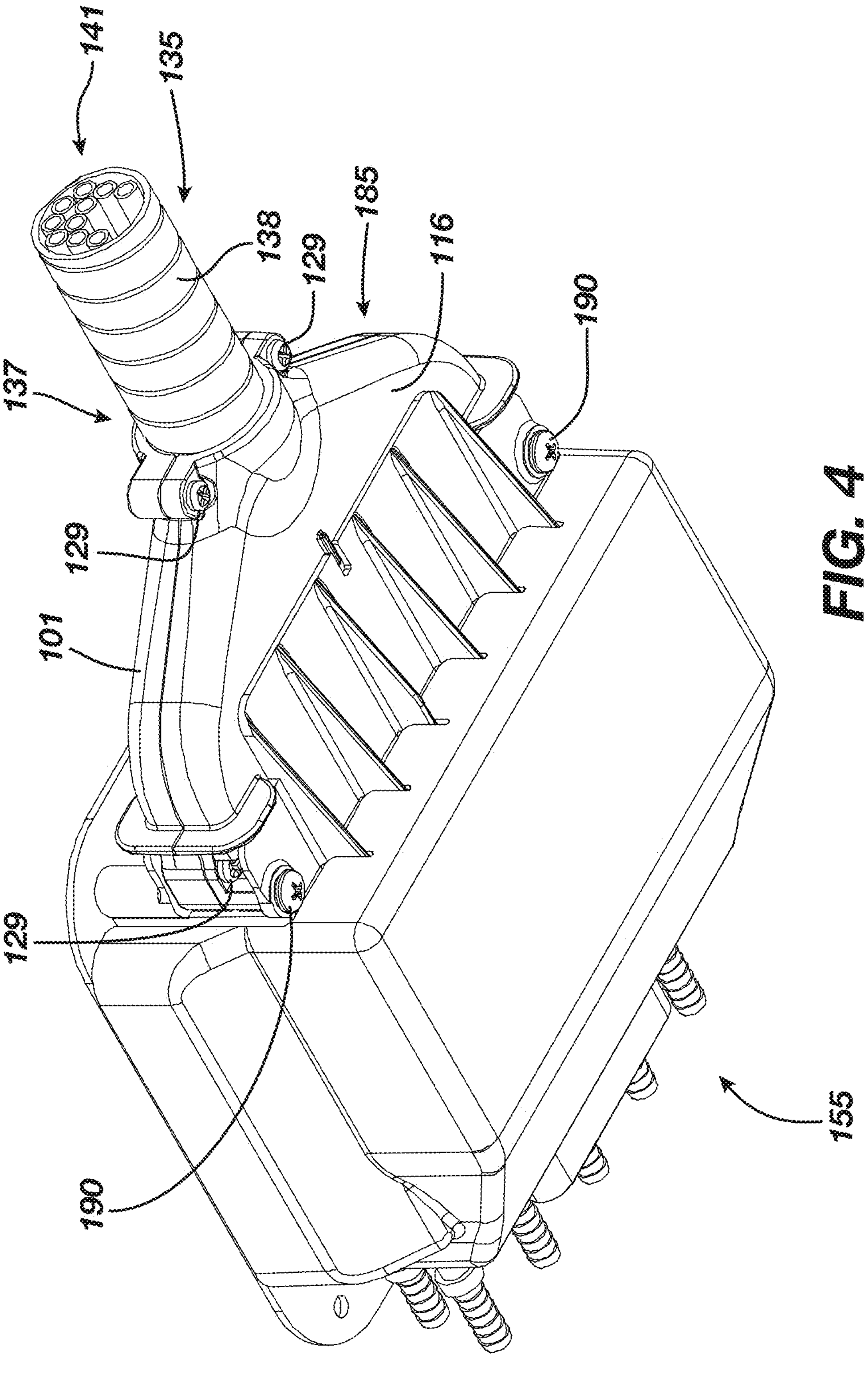
FIG. 4 is a bottom rear end isometric view illustrating a second connector assembly of the fluid line connector arrangement as deployed in use to efficiently connect and secure a plurality of fluid line fittings to the exemplary suitable beverage fluid source.
Figure 5:
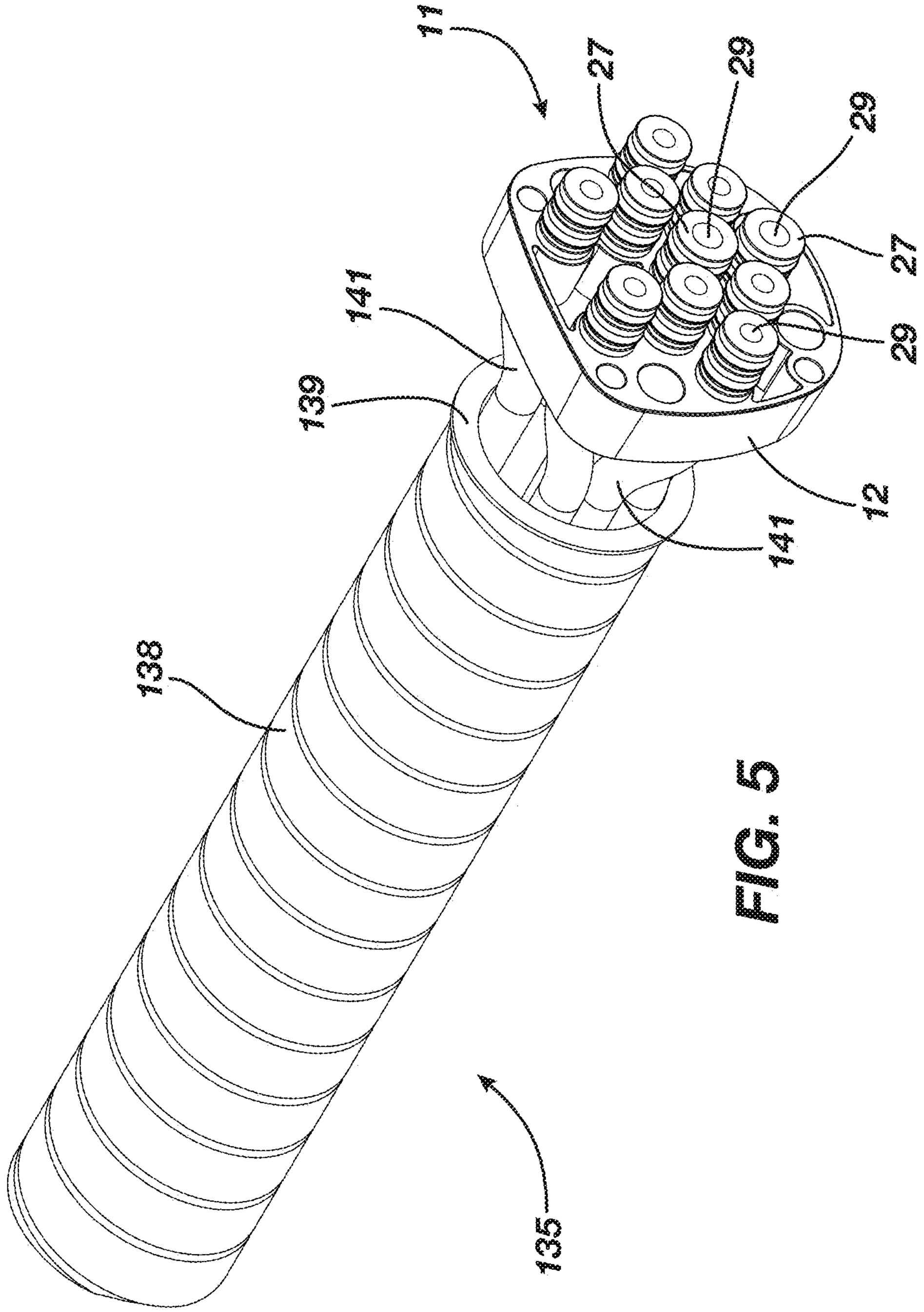
FIG. 5 is a top front end isometric view illustrating integration of a header subassembly of the first connector assembly with and at a first end of a suitable sheathed fluid line assembly of the fluid line connector arrangement.
Figure 6:
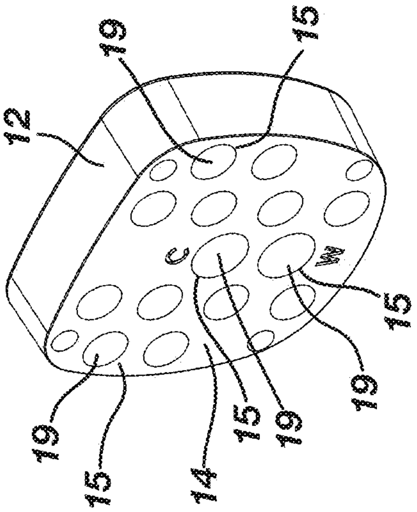
FIGS. 6-10 illustrate a header plate of the header subassembly of the first connector assembly, where.
Figure 7:
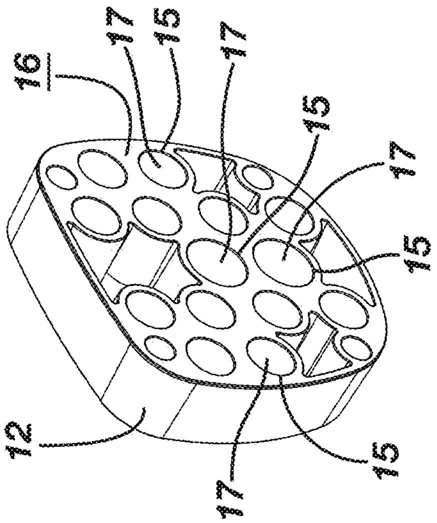
Figure 8:
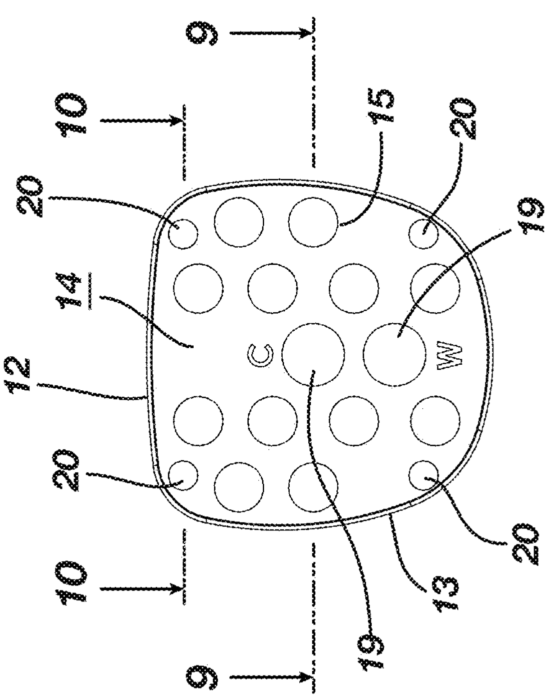
Figure 9:
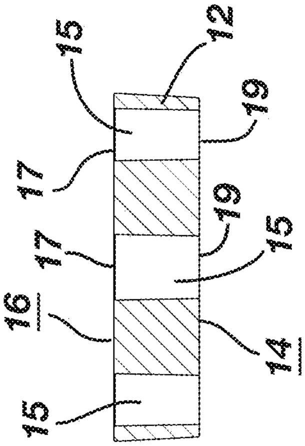
Figure 10:
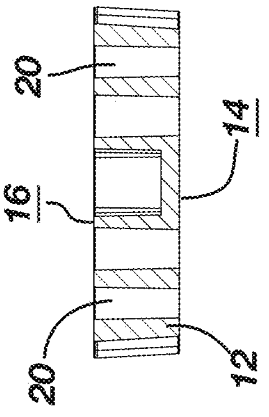
Figure 11:
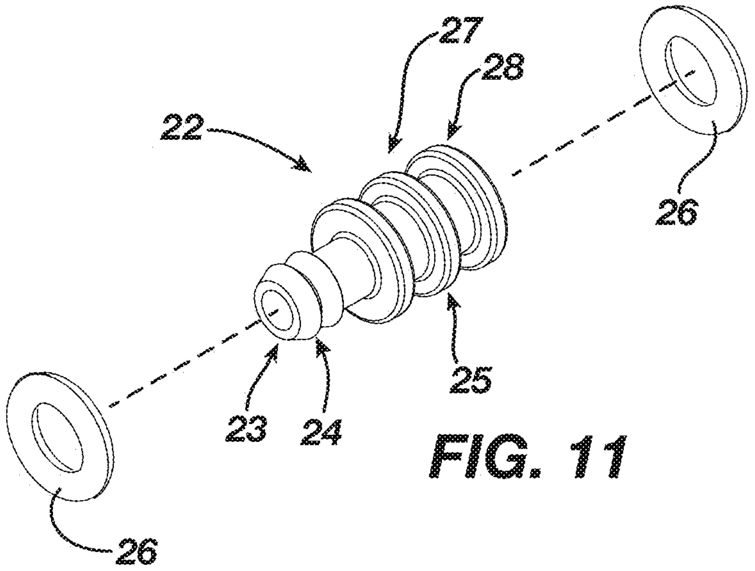
FIGS. 11-13 illustrate an exemplary barbed quick connect fitting of the header subassembly of the first connector assembly, where.
Figure 12:
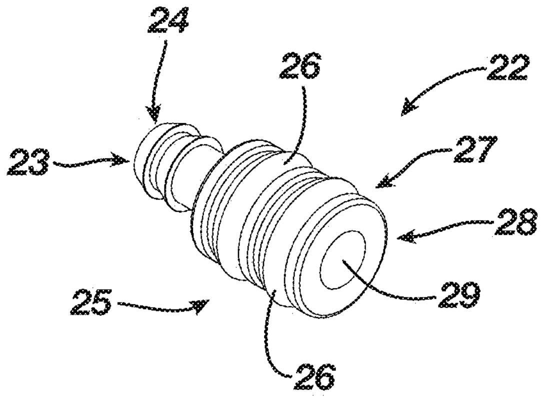
Figure 13:
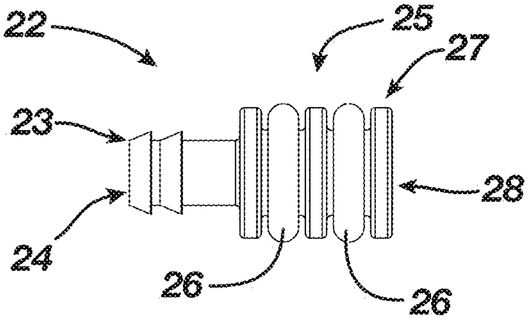
Figure 14B:
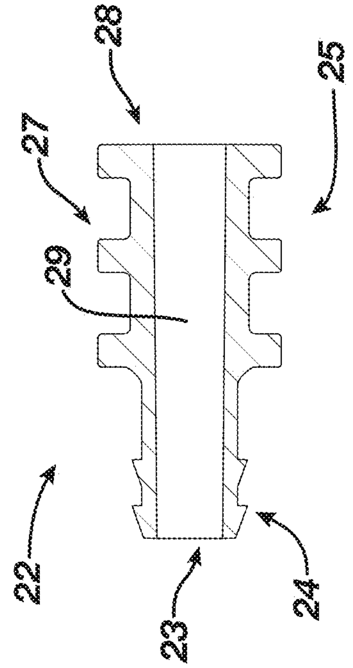
FIGS. 14A-14B and FIGS. 15A-15B comparatively illustrate various aspects of a generally cylindrical body of the exemplary barbed quick connect fitting for the first connector assembly and an alternatively adapted cylindrical body, respectively, where.
Figure 15B:
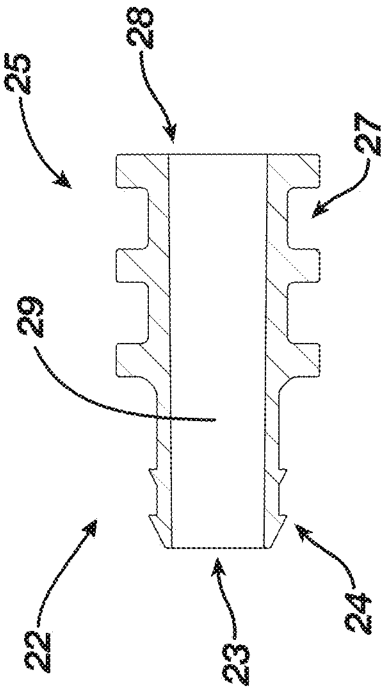
Figure 14A:
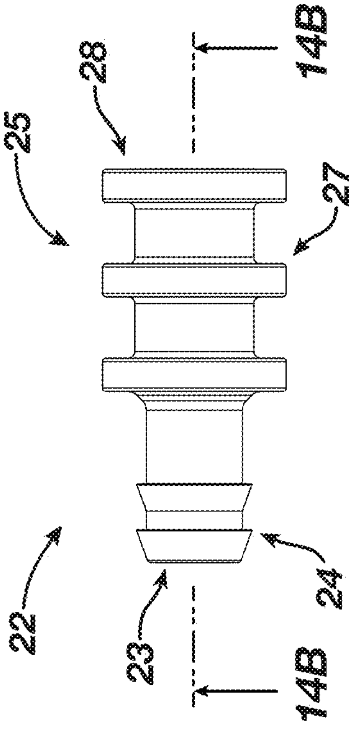
Figure 15A:
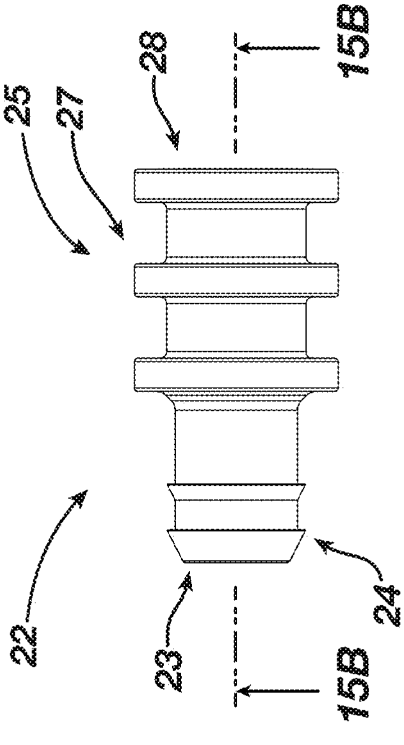
Figures 16A, 16B:
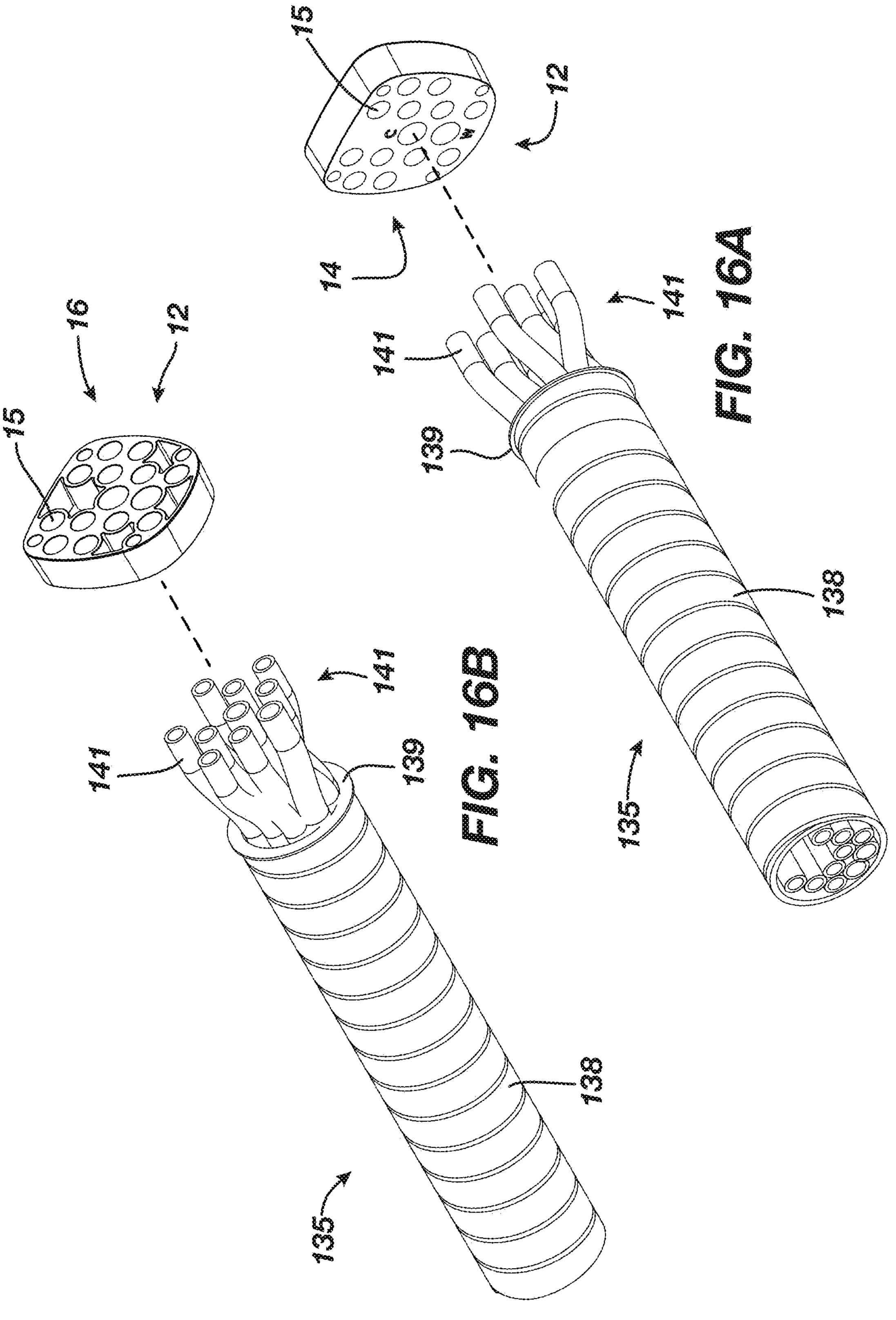
FIGS. 16A-16B illustrate a first stage in the assembly, and concurrent integration with the first end of the sheathed fluid line assembly, of the header subassembly of the first connector assembly, where.
Figures 17A, 18A:
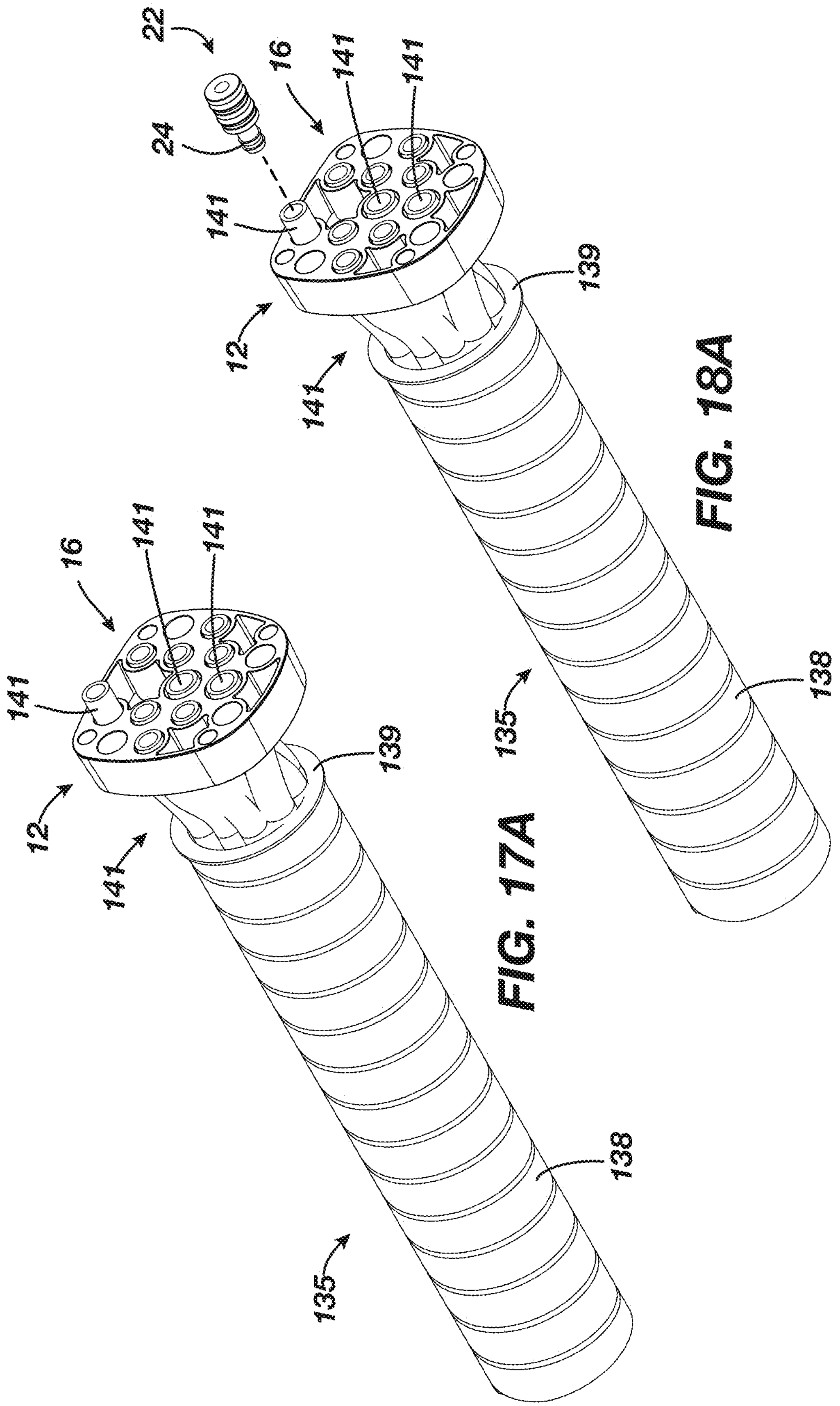
FIGS. 17A-17B illustrate a second stage in the assembly, and concurrent integration with the first end of the sheathed fluid line assembly, of the header subassembly of the first connector assembly, where.
FIGS. 18A-18B illustrate a third stage in the assembly, and concurrent integration with the first end of the sheathed fluid line assembly, of the header subassembly of the first connector assembly, where.
Figure 17B:
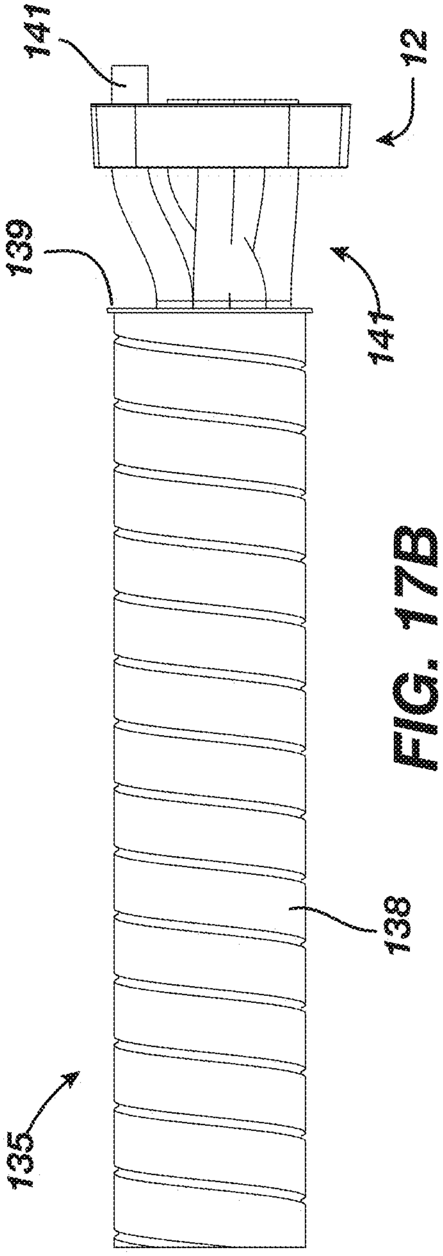
Figure 18B:
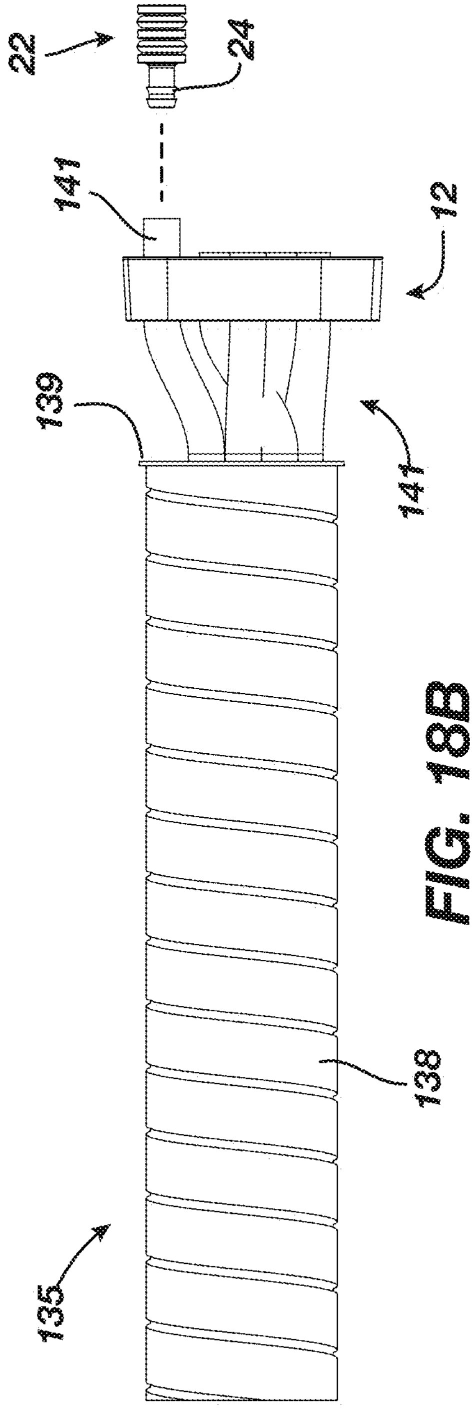
Figure 20A:
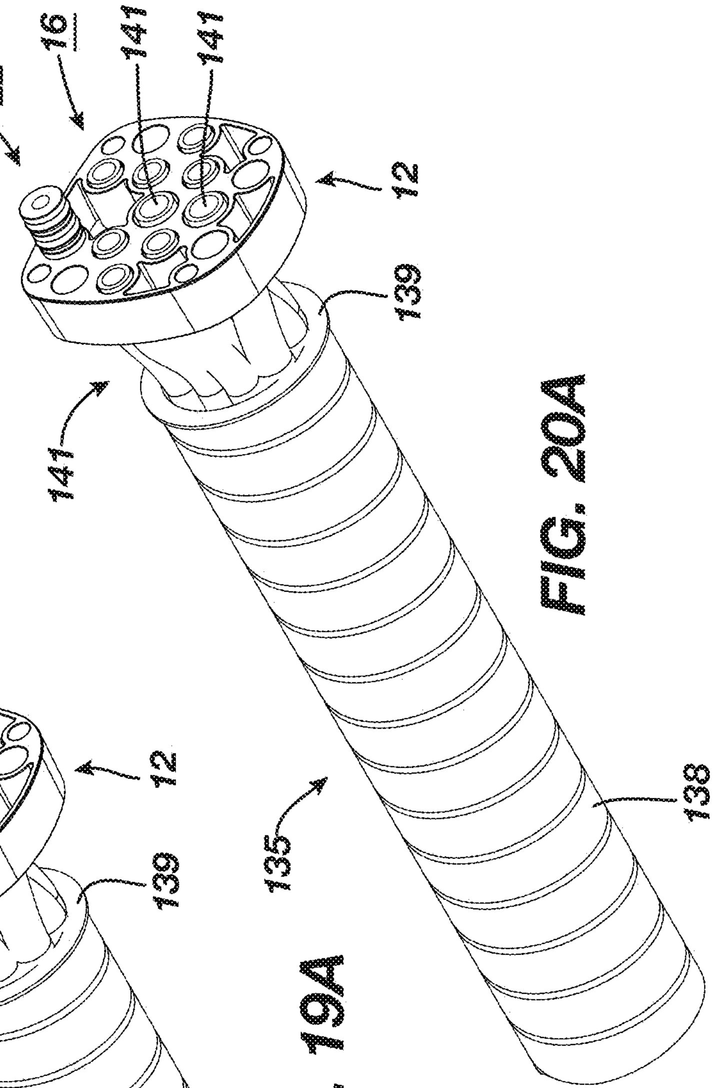
FIGS. 20A-20B illustrate a fifth stage in the assembly, and concurrent integration with the first end of the sheathed fluid line assembly, of the header subassembly of the first connector assembly, where.
Figure 19A:
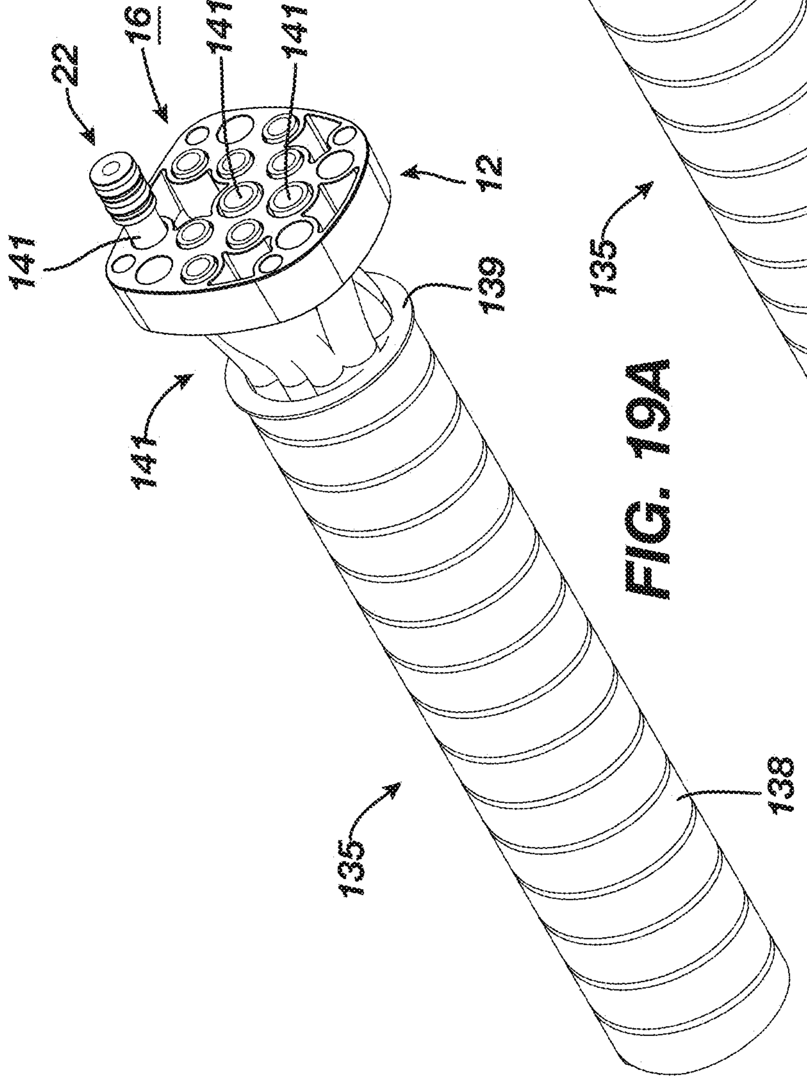
FIGS. 19A-19B illustrate a fourth stage in the assembly, and concurrent integration with the first end of the sheathed fluid line assembly, of the header subassembly of the first connector assembly, where.
Figure 19B:
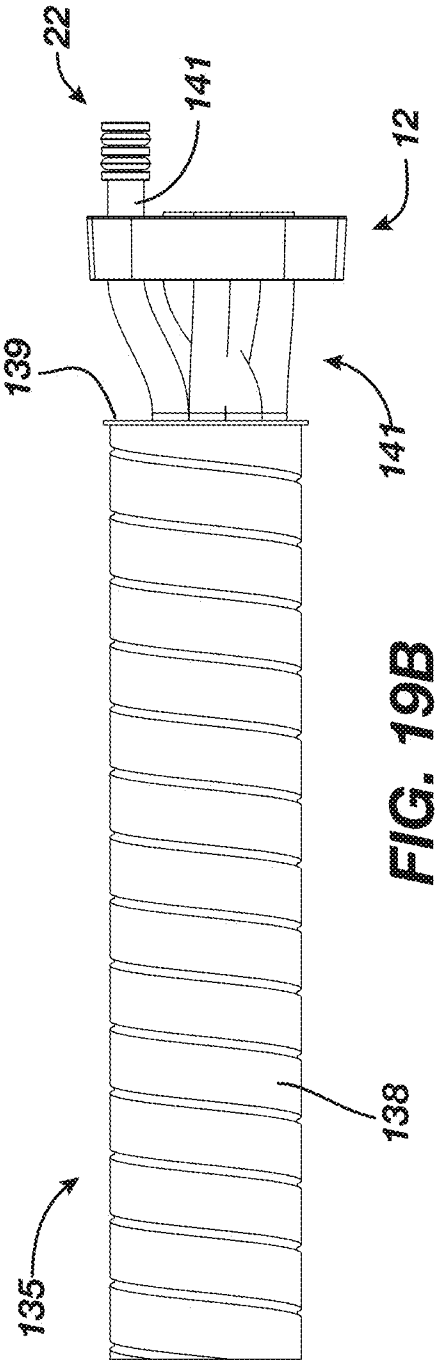
Figure 20B:
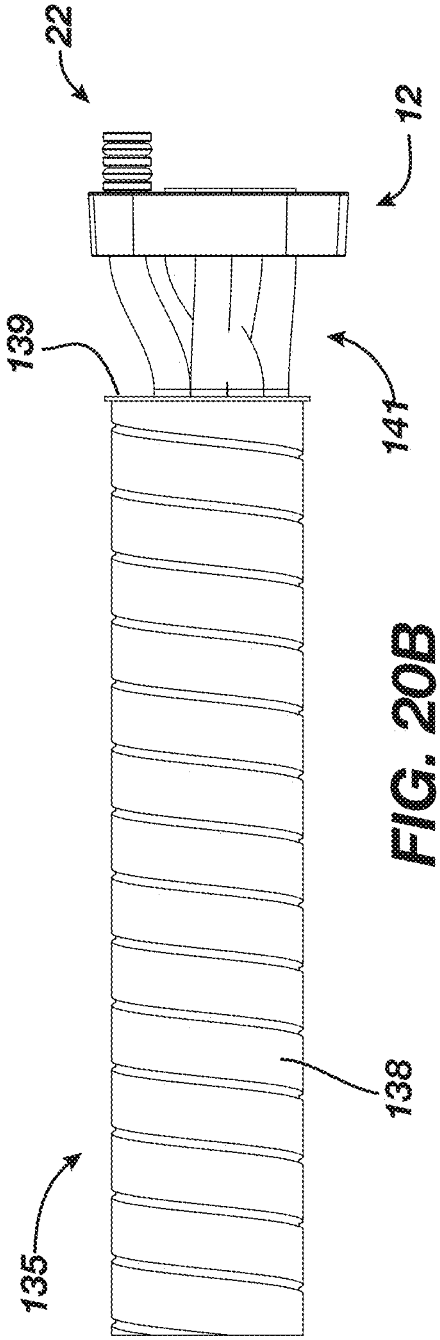
Figure 21:
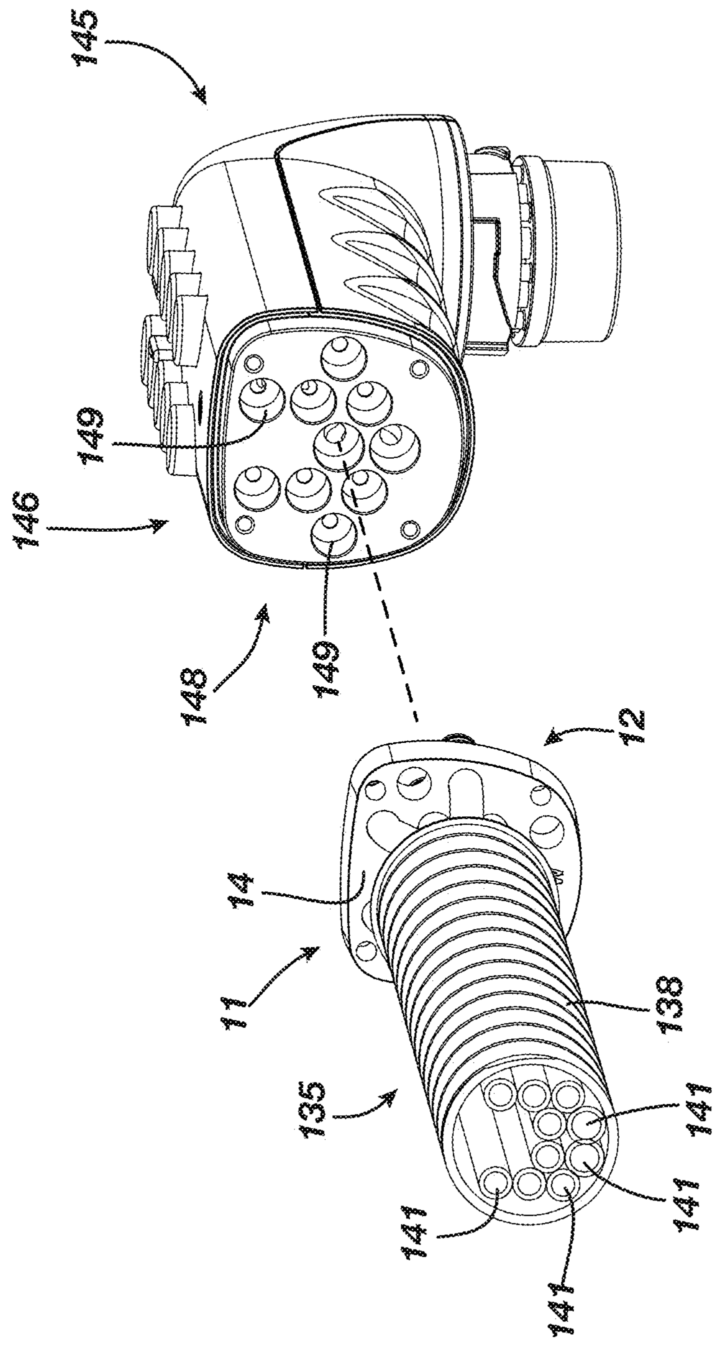
FIG. 21 is a partially exploded rear end isometric view illustrating connection of the header subassembly of the first connector assembly in operable position with the exemplary suitable hand-held beverage dispenser.
Figure 23:
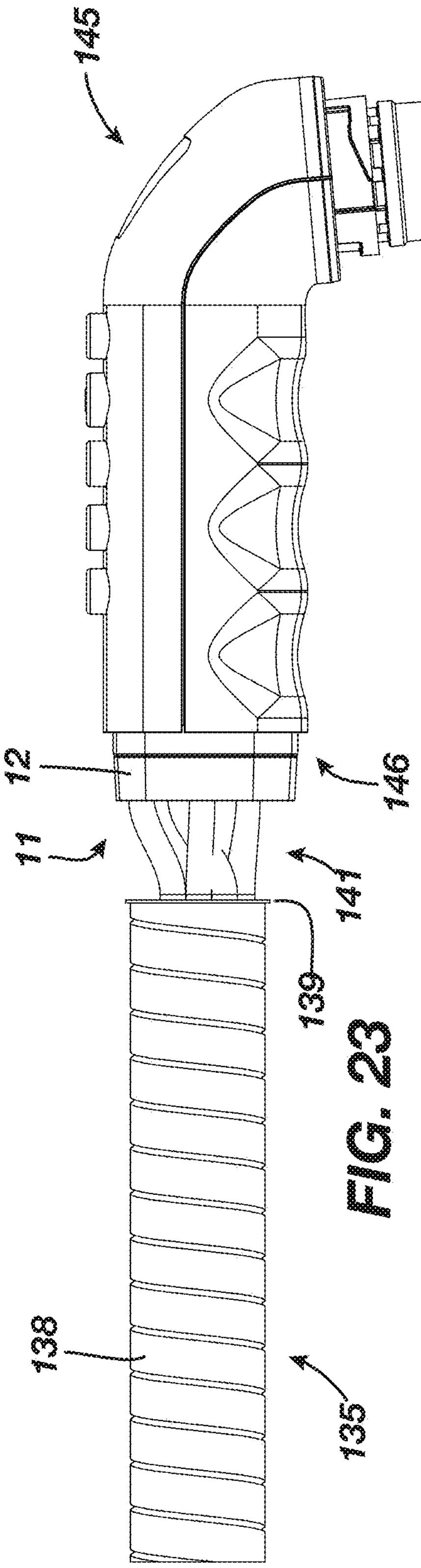
FIGS. 22-23 illustrate the header subassembly of the first connector assembly as operably connected with the exemplary suitable hand-held beverage dispenser, where.
Figure 22:
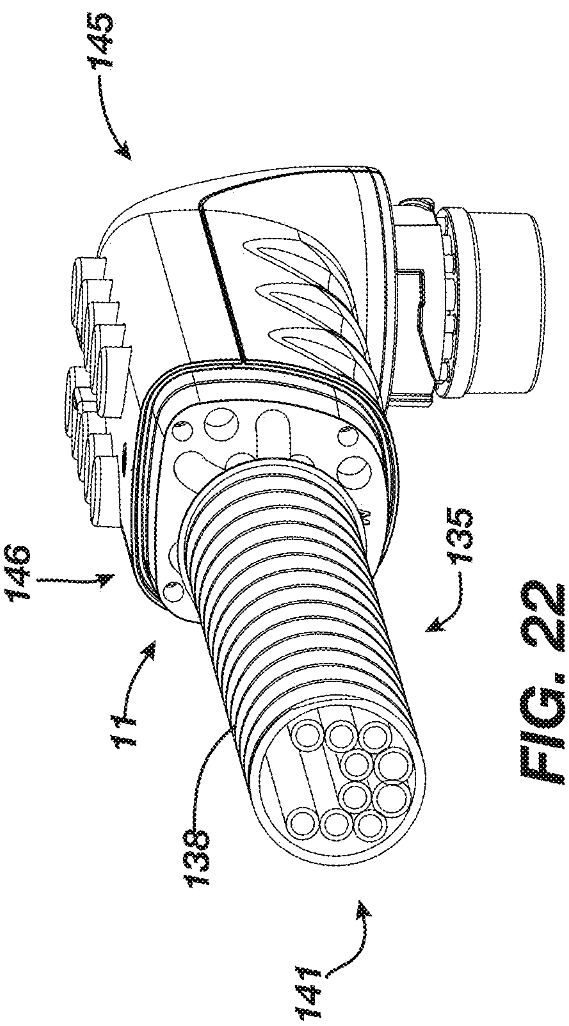
Figure 24:
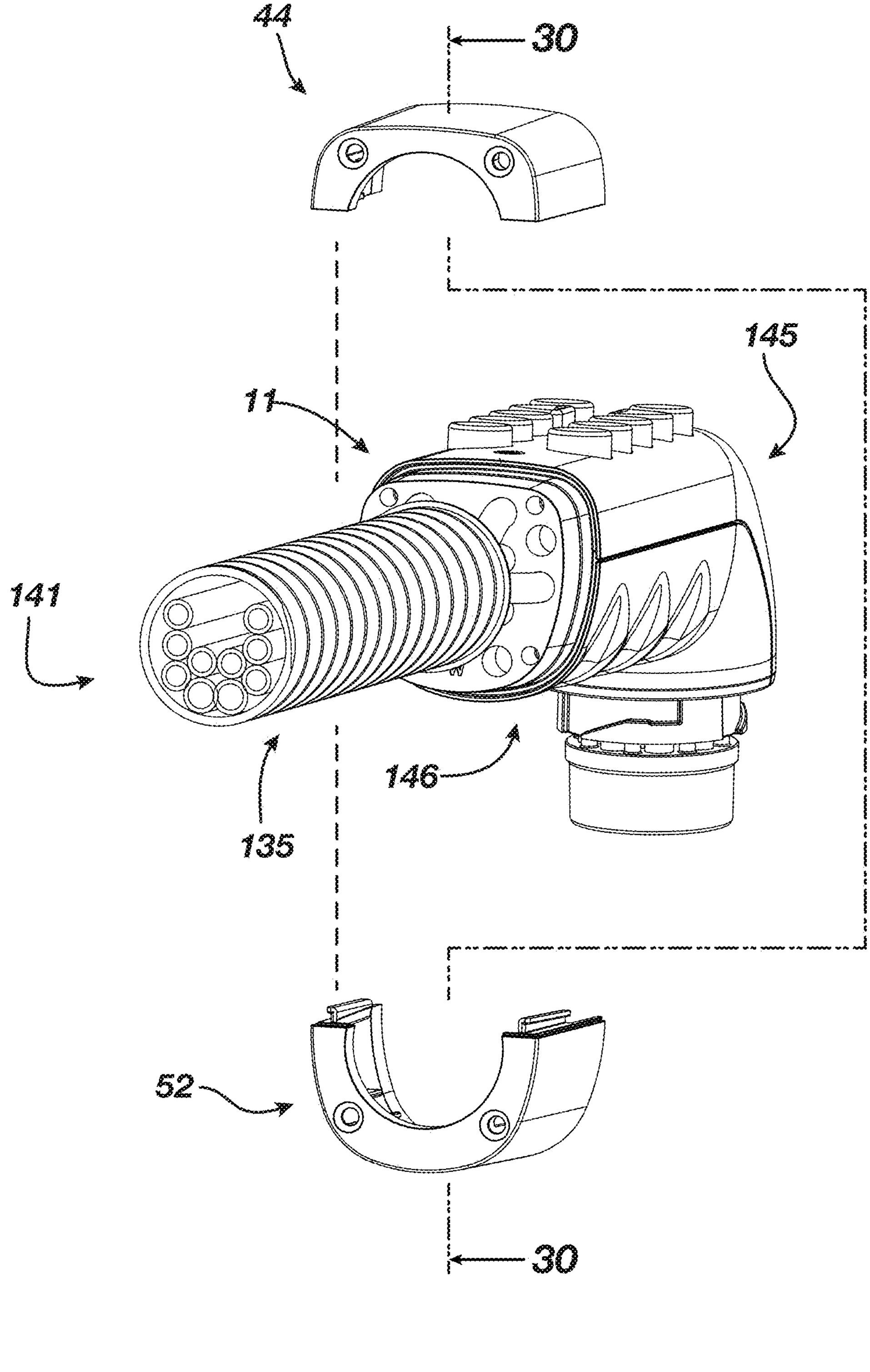
FIG. 24 is a demonstrative partially exploded rear end isometric view illustrating operable positioning of an enclosure subassembly of the first connector assembly with the header subassembly of the first connector assembly, as the header subassembly is operably connected with the exemplary suitable hand-held beverage dispenser.
Figure 26A:
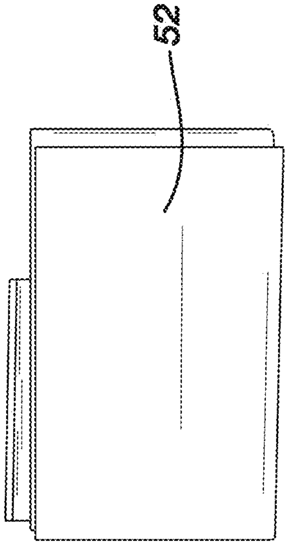
FIGS. 26A-26B illustrate a second housing member of the enclosure subassembly of the first connector assembly, where.
Figure 26B:
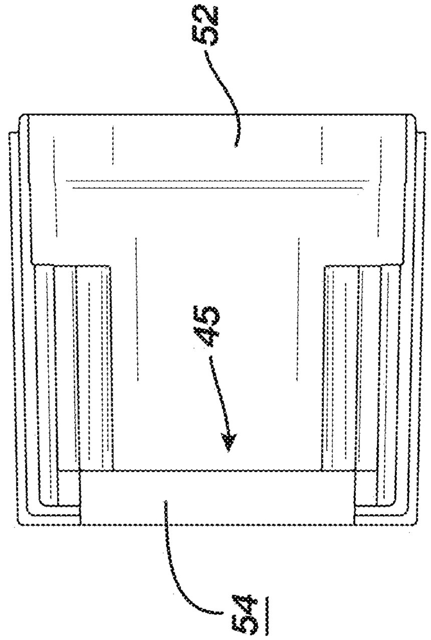
Figure 25A:
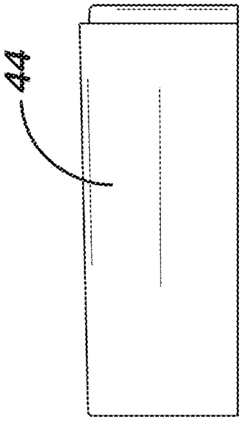
FIGS. 25A-25B illustrate a first housing member of the enclosure subassembly of the first connector assembly, where.
Figure 25B:
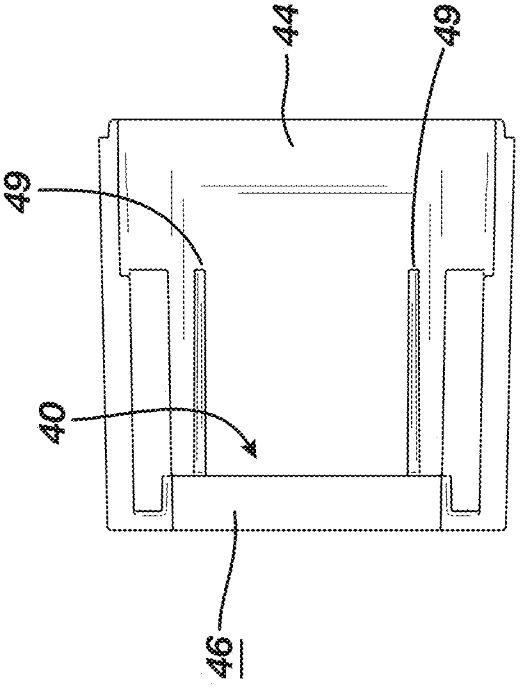
Figure 27A:
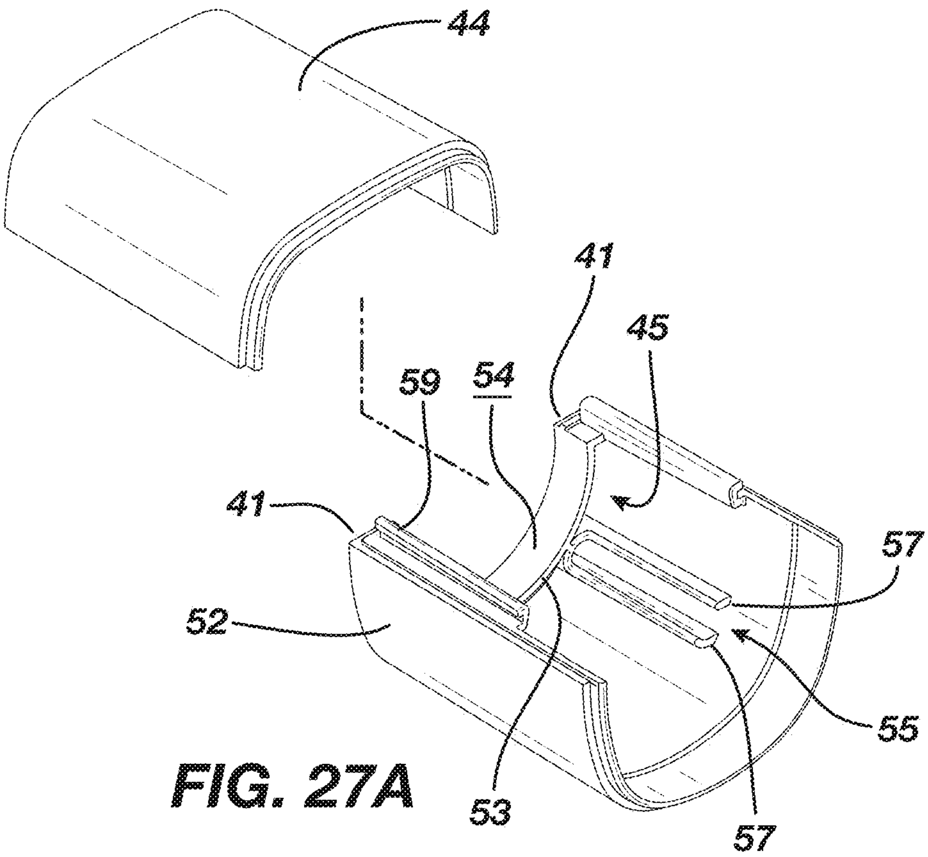
FIGS. 27A-27C are exploded views illustrating various aspects of the first and second housing members of the enclosure subassembly of the first connector assembly, where.
Figure 28A:
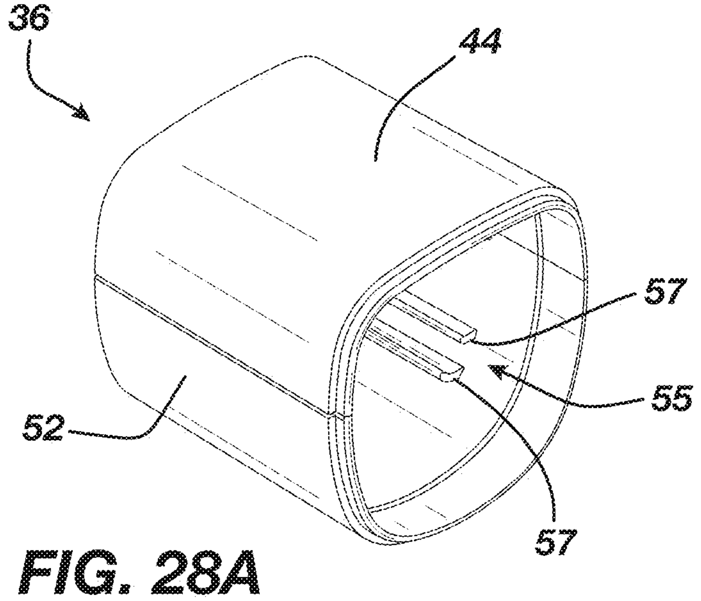
FIGS. 28A-28E illustrate various aspects of the first and second housing members as connected one to the other in formation of the enclosure subassembly of the first connector assembly, where.
Figure 27B:
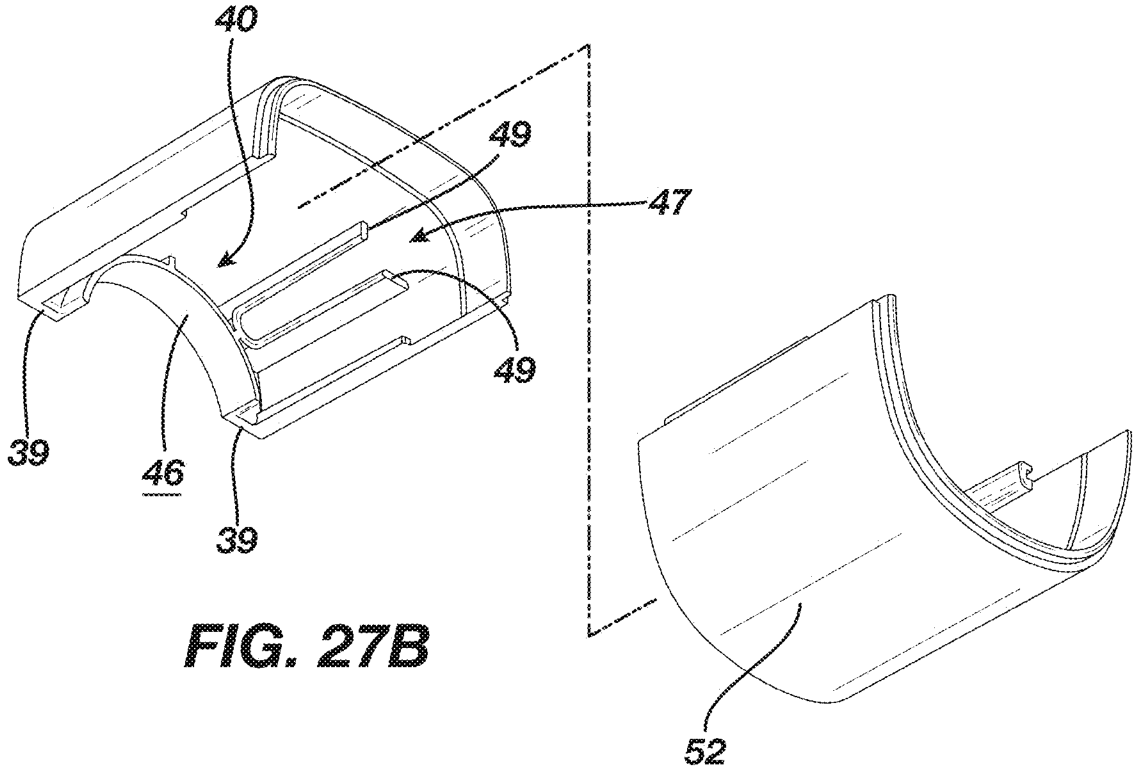
Figure 28B:
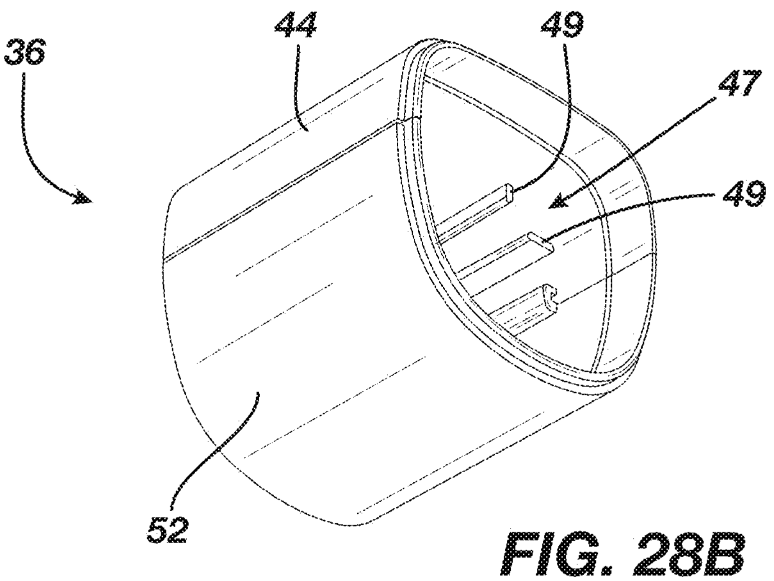
Figure 28D:
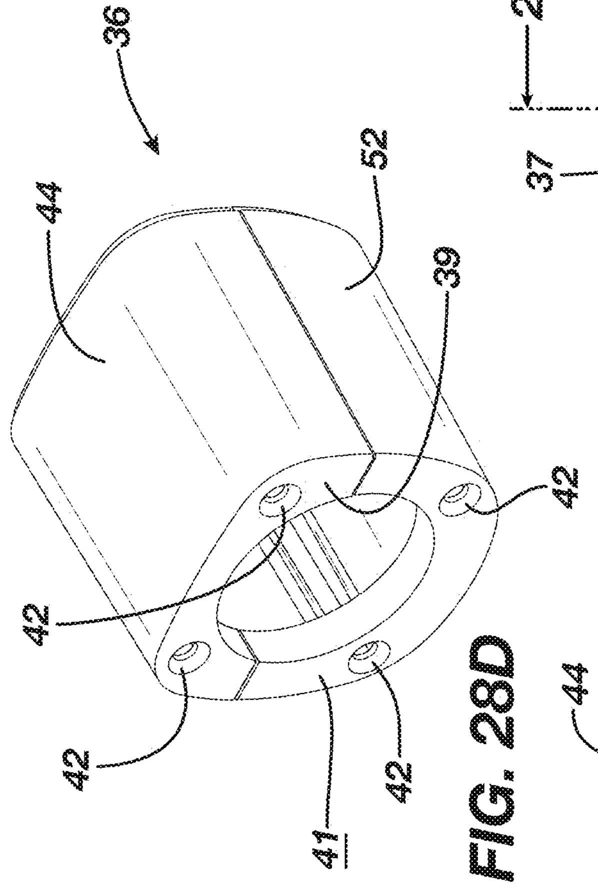
Figure 28E:
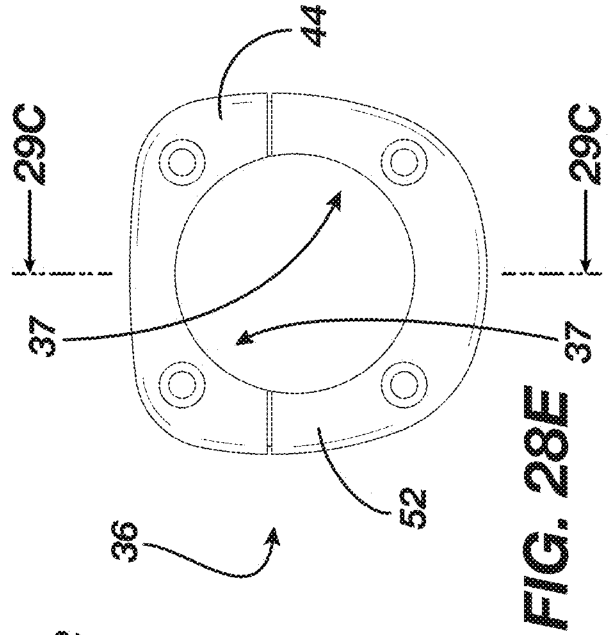
Figure 28C:
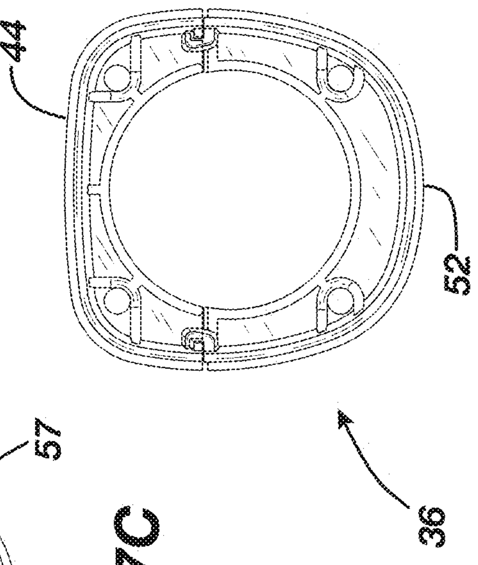
Figure 27C:
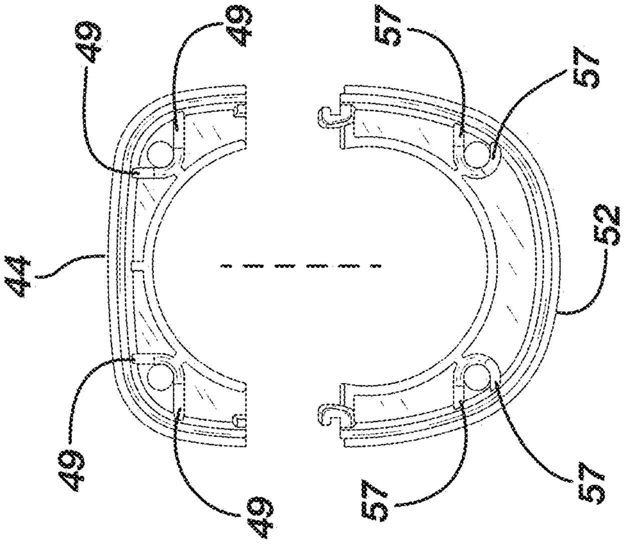
Figure 29A:
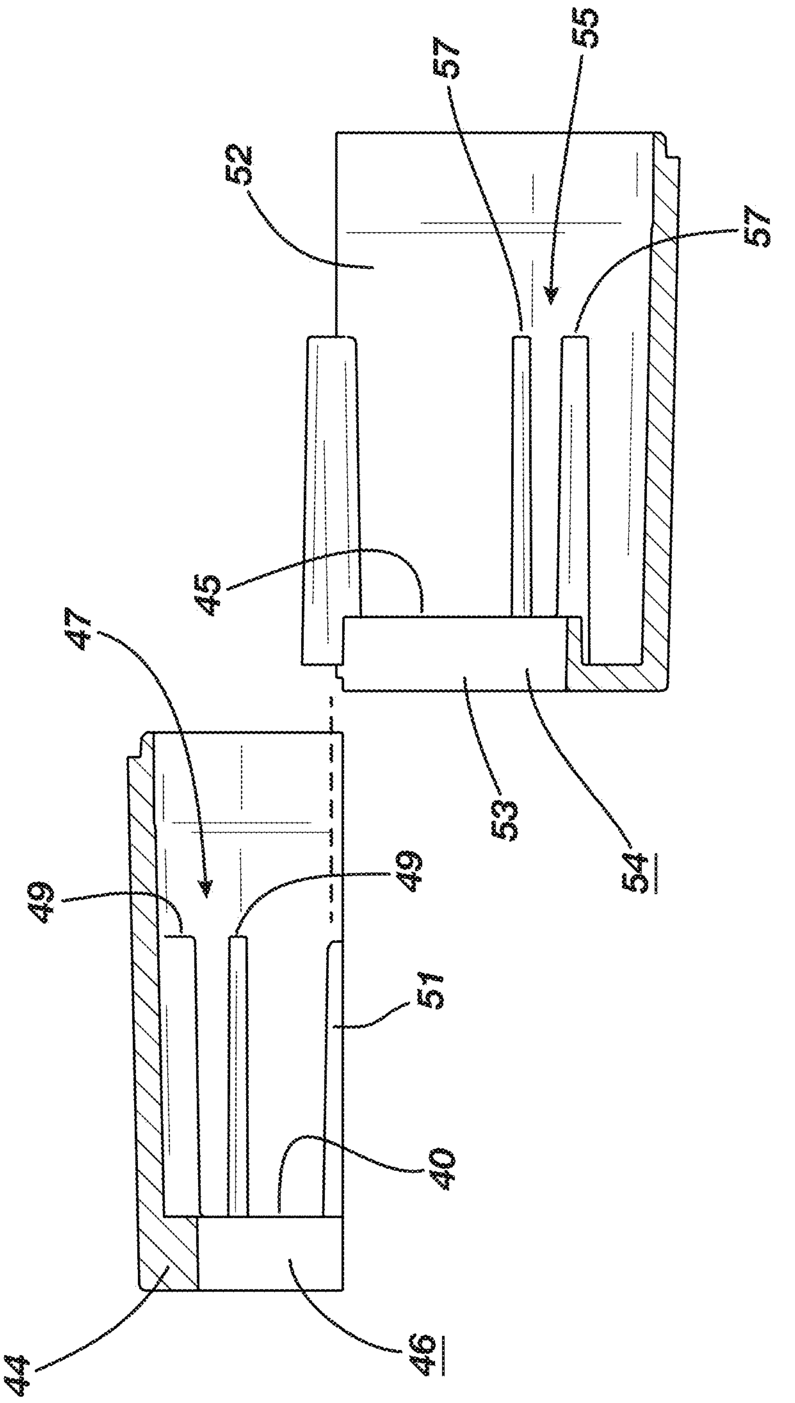
FIGS. 29A-29C illustrate interconnection of the first and second housing members of the enclosure subassembly of the first connector assembly, where.
Figure 29B:
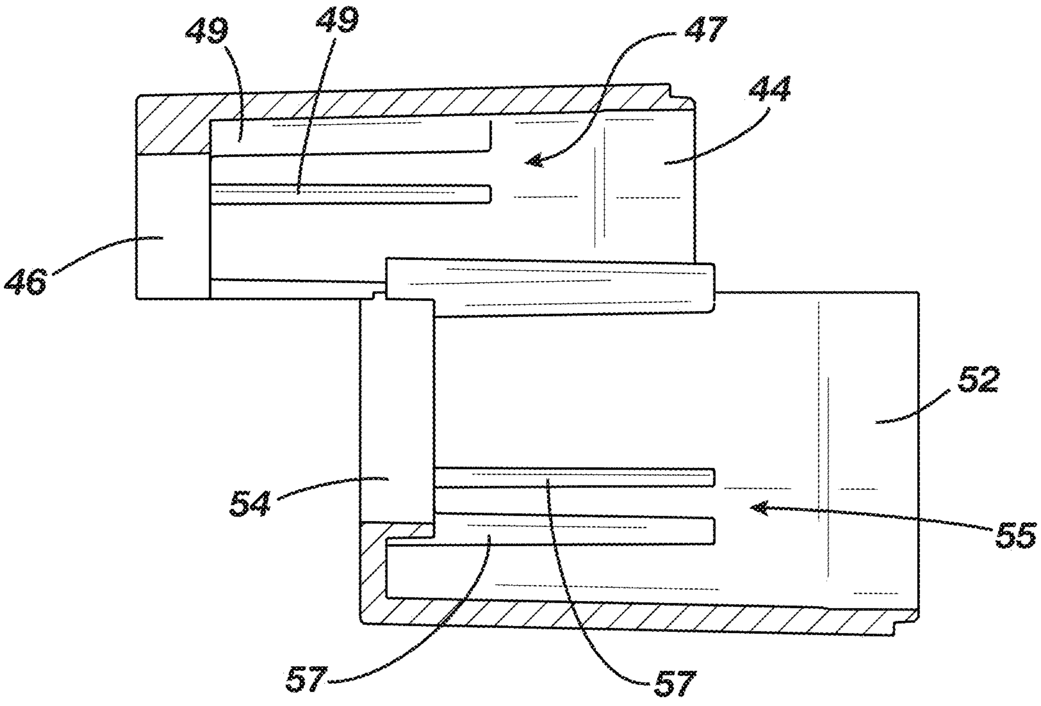
Figure 29C:
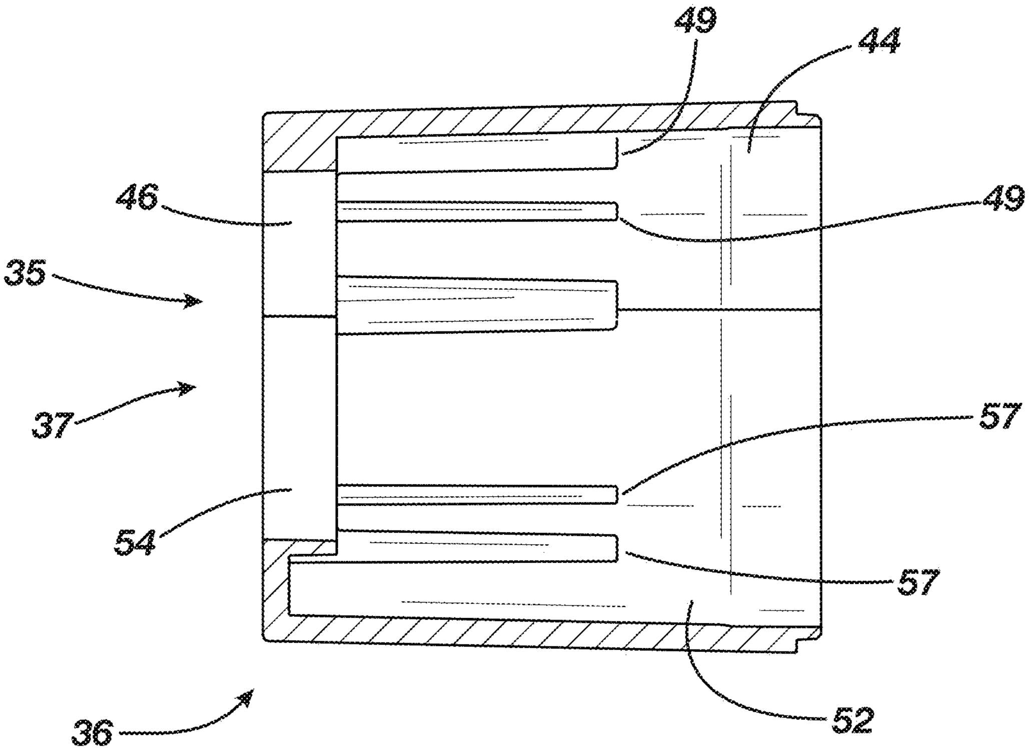
Figure 30:
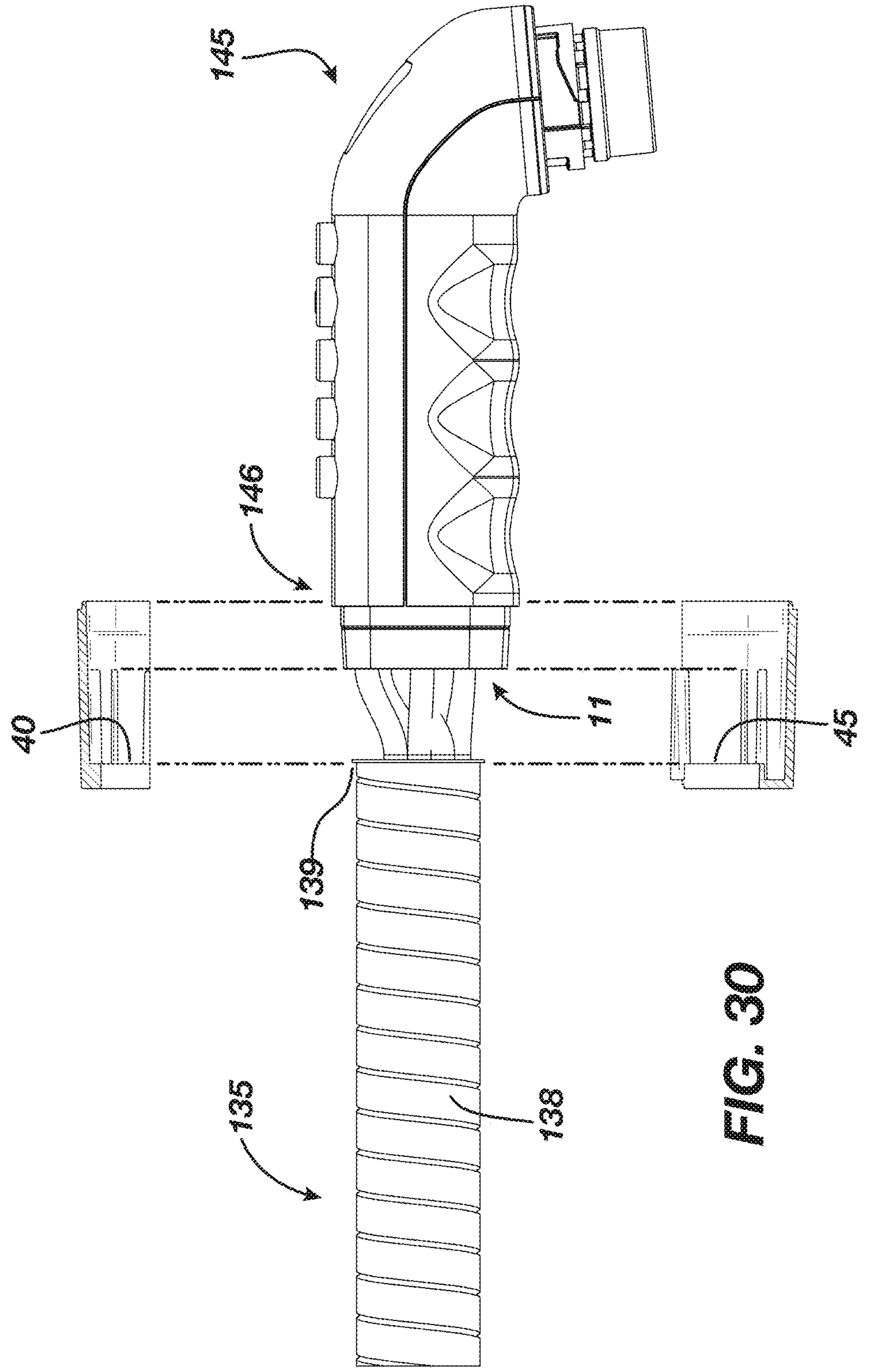
FIG. 30 is a demonstrative partial cross-sectional elevational view taken along lines 30-30 of FIG. 24 illustrating various details of the operable positioning of the enclosure subassembly of the first connector assembly with the header subassembly thereof, as the header subassembly is operably connected with the exemplary suitable hand-held beverage dispenser.
Figure 31A:
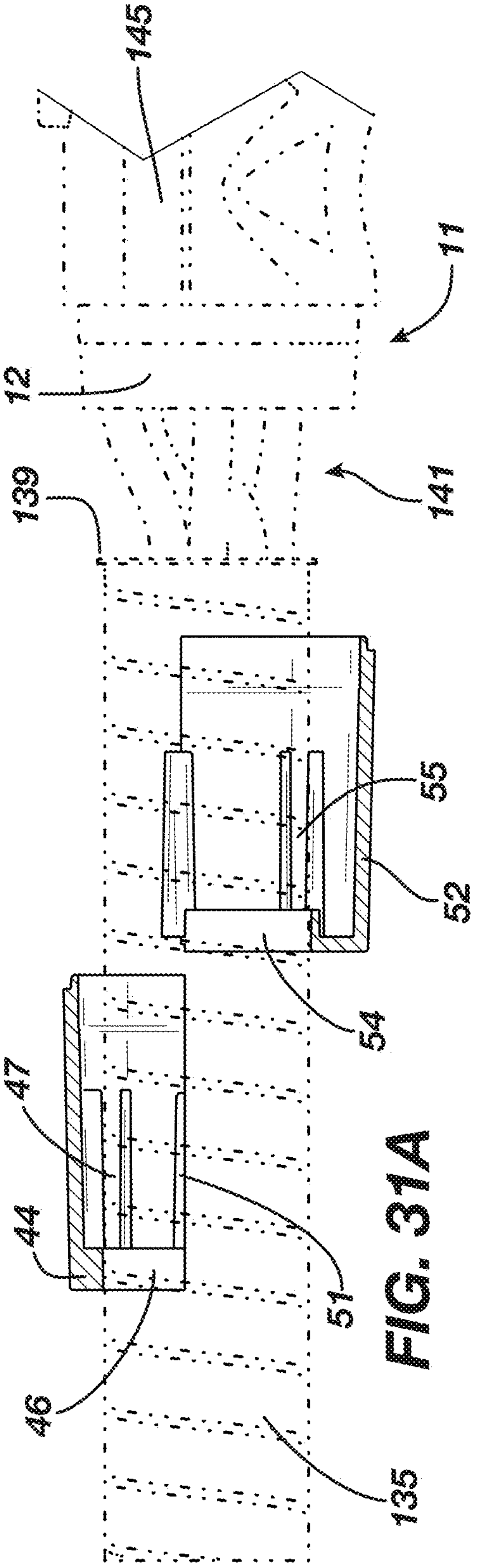
FIGS. 31A-31D illustrate application of the enclosure subassembly of the first connector assembly about the first end of the suitable sheathed fluid line assembly and into operable position with the header subassembly, as the header subassembly is operably connected with the exemplary suitable hand-held beverage dispenser, where the first end of the suitable sheathed fluid line assembly and the exemplary suitable hand-held beverage dispenser are for clarity shown in phantom lines.
Figure 31B:
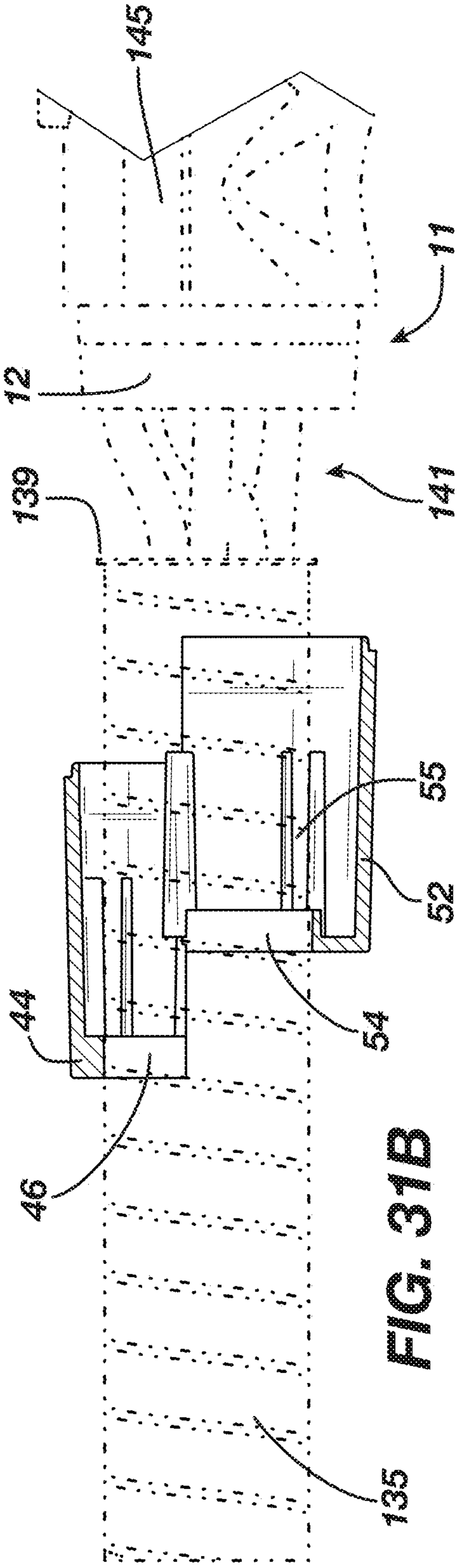
Figure 31C:
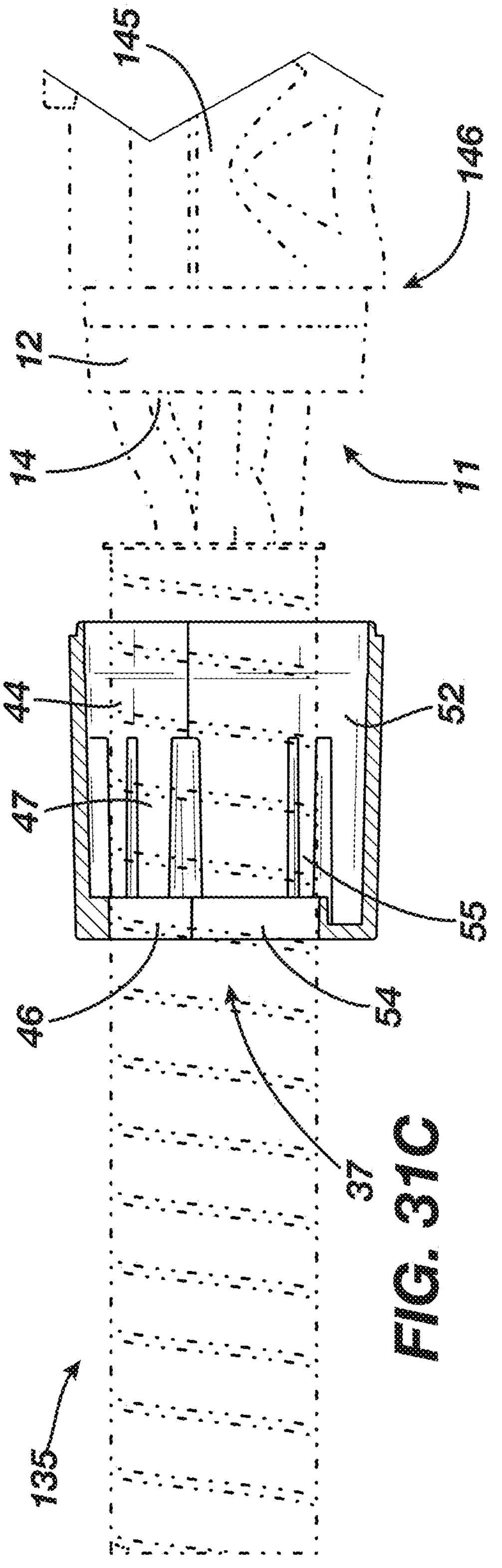
Figure 31D:
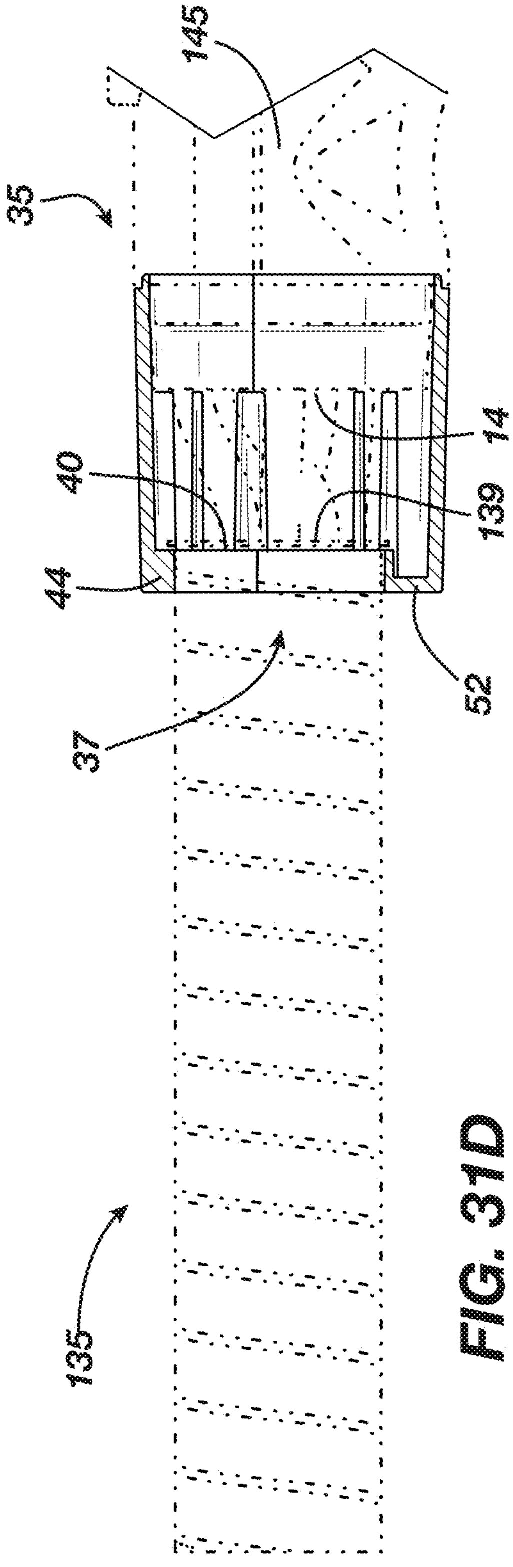
Figure 32:
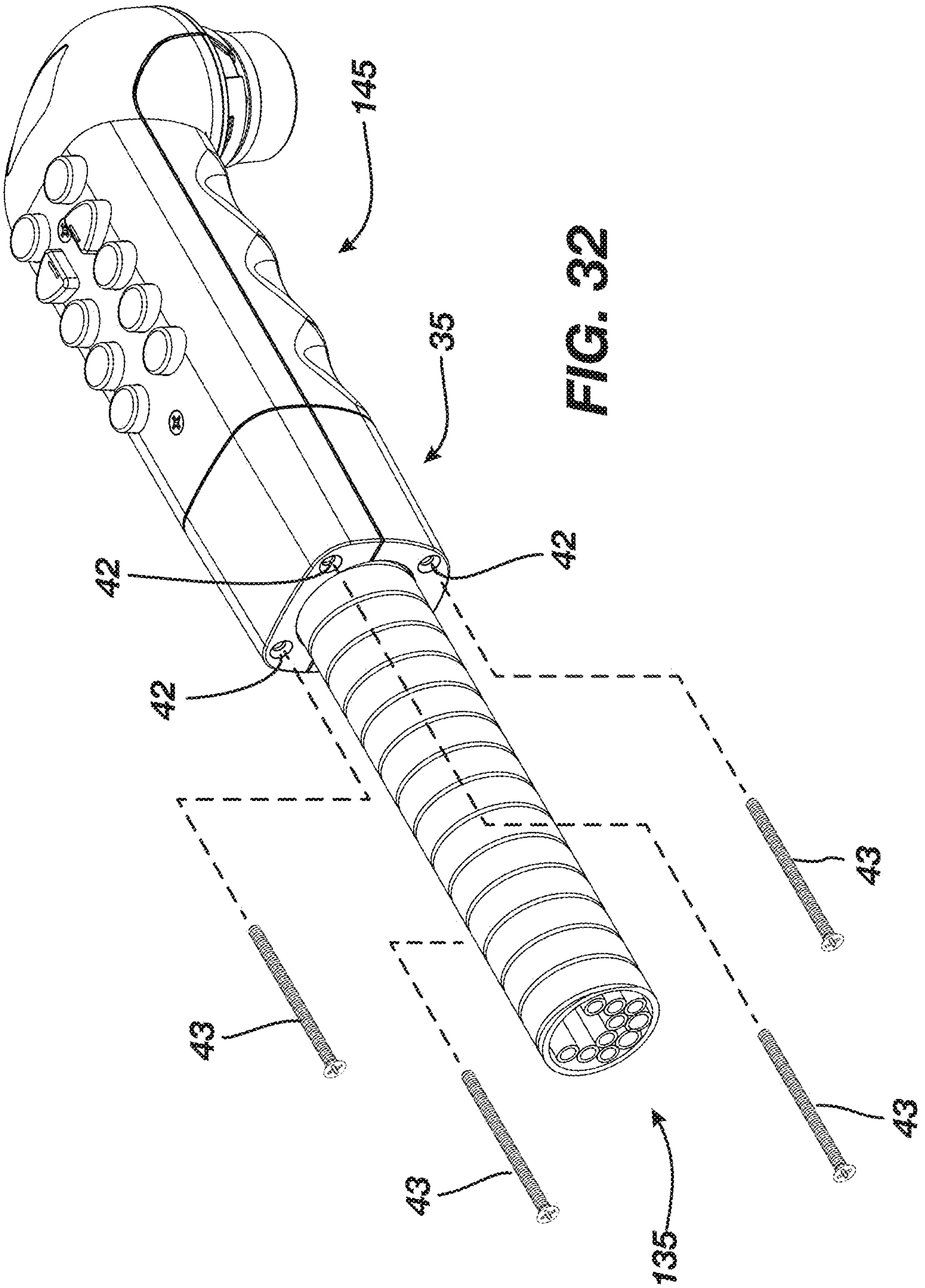
FIG. 32 is a partially exploded top rear end isometric view illustrating securement of the first connector assembly operably in place for use of the fluid line connector arrangement.
Figure 33A:
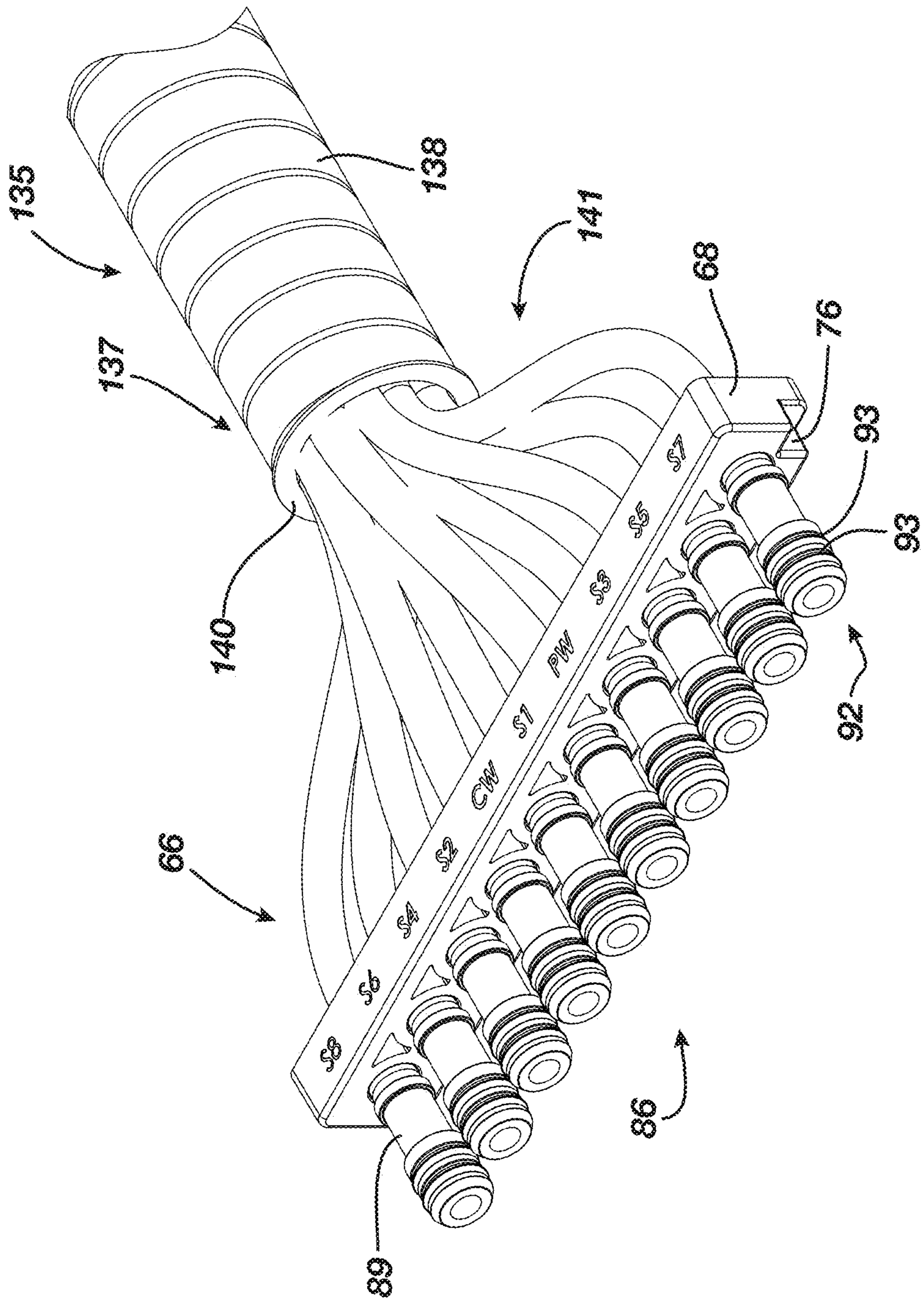
FIGS. 33A-33B illustrate integration of a header subassembly of the second connector assembly with and at a second end of the suitable sheathed fluid line assembly of the fluid line connector arrangement, where.
Figure 33B:
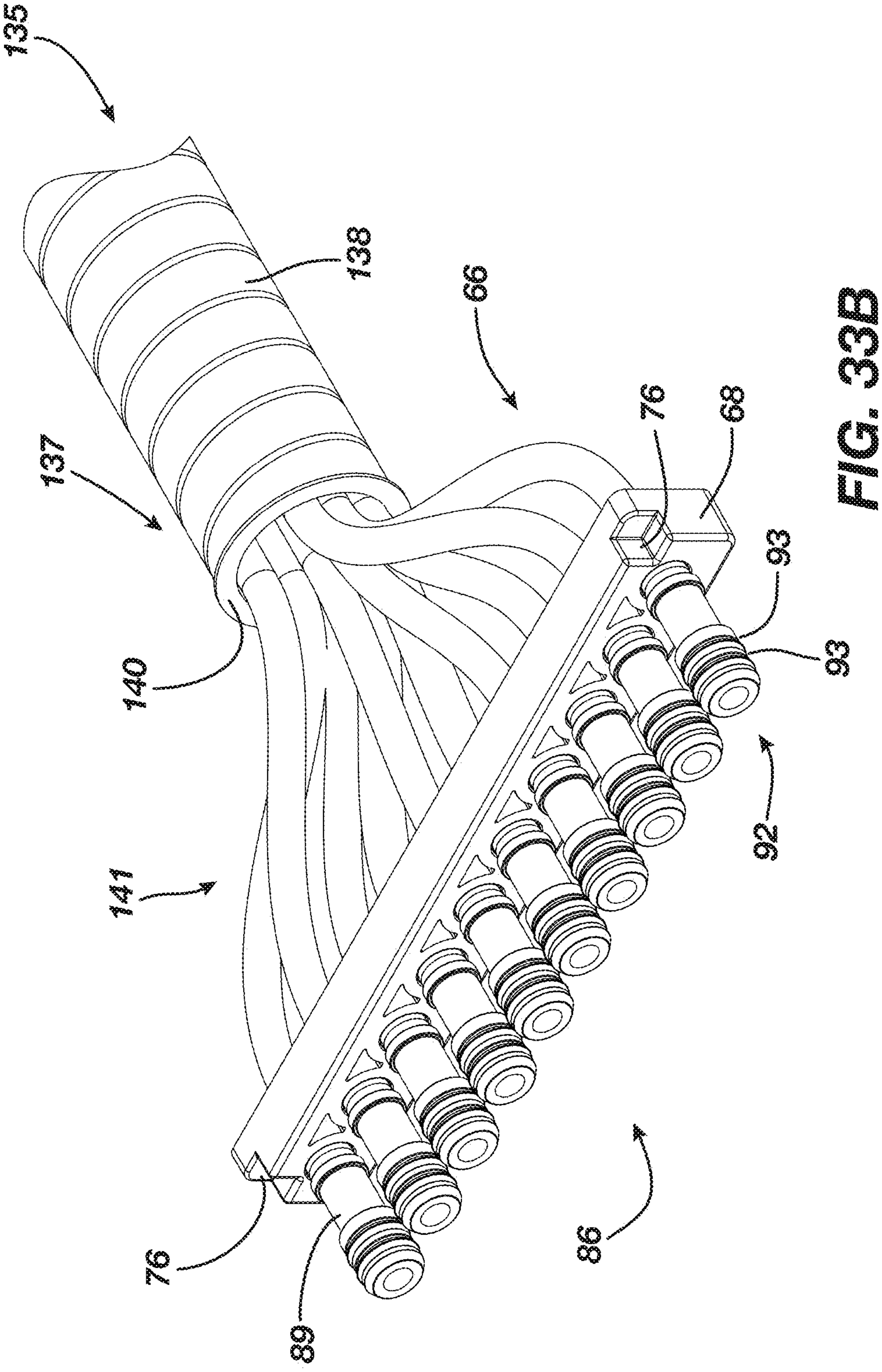
Figures 34, 35, 36, 37, 38, 39:
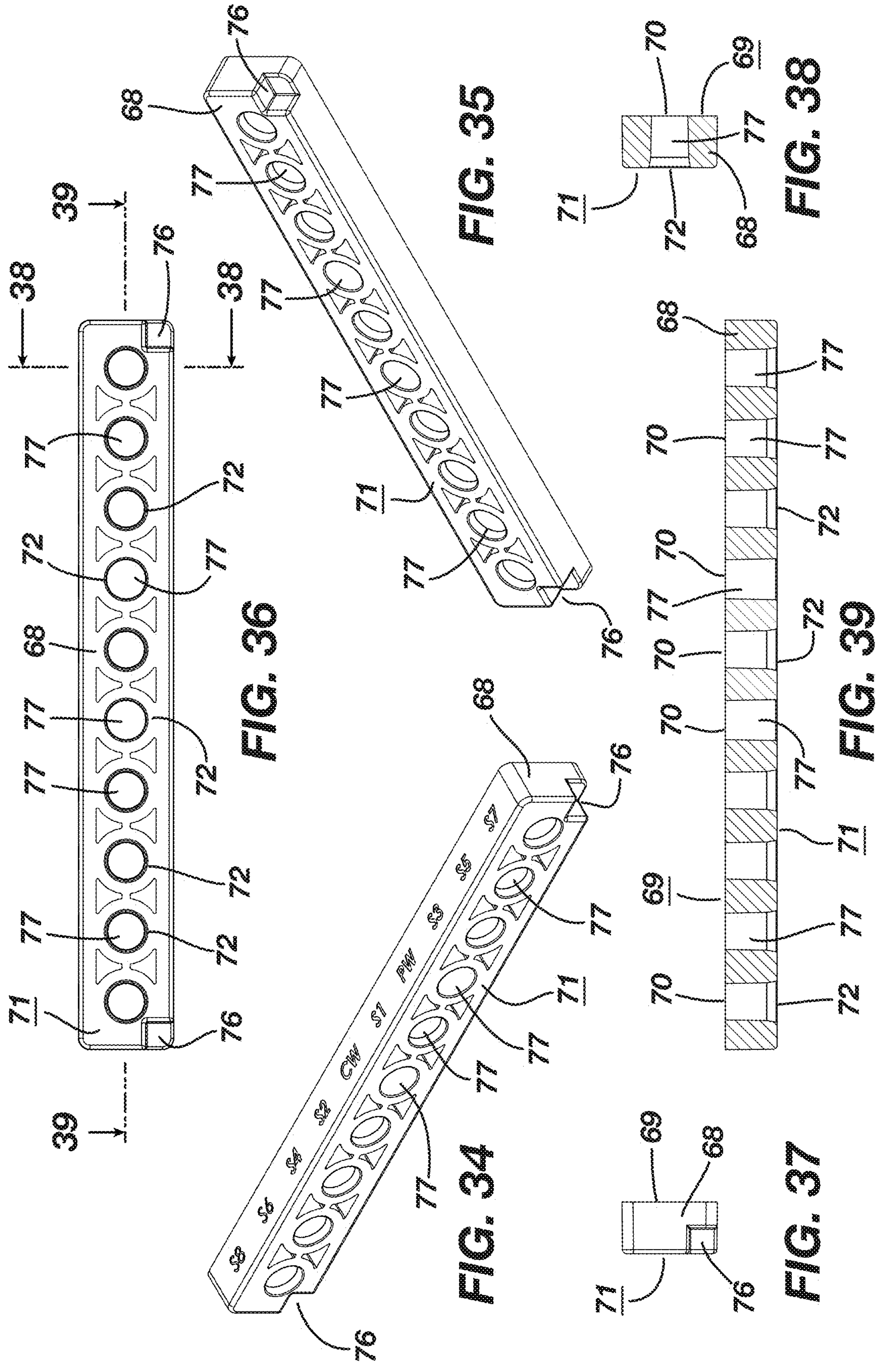
FIGS. 34-39 illustrate a header bar of the header subassembly of the second connector assembly, where.
Figure 40:
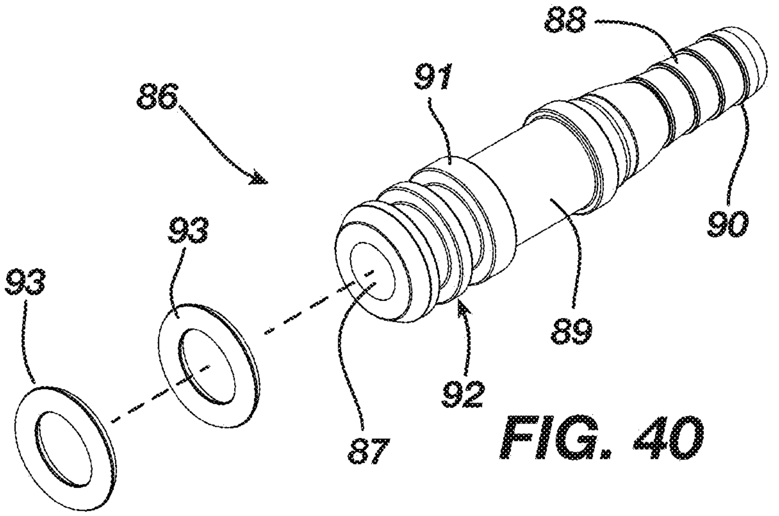
FIGS. 40-42 illustrate an exemplary barbed quick connect fitting of the header subassembly of the second connector assembly, where.
Figure 41:
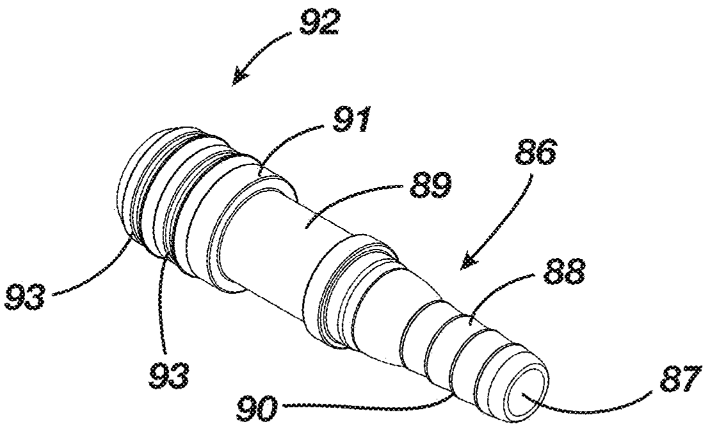
Figure 42:
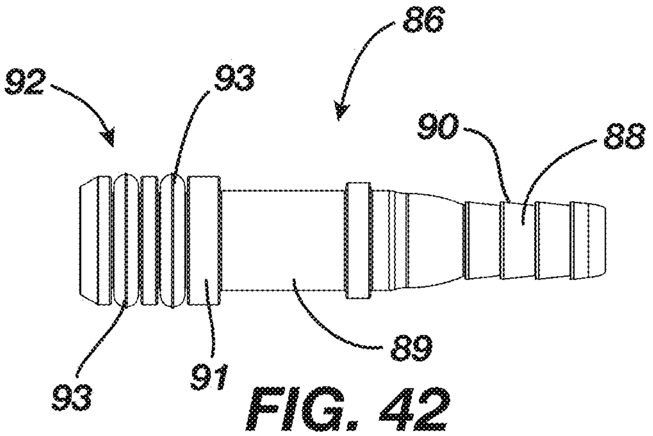
Figure 43:
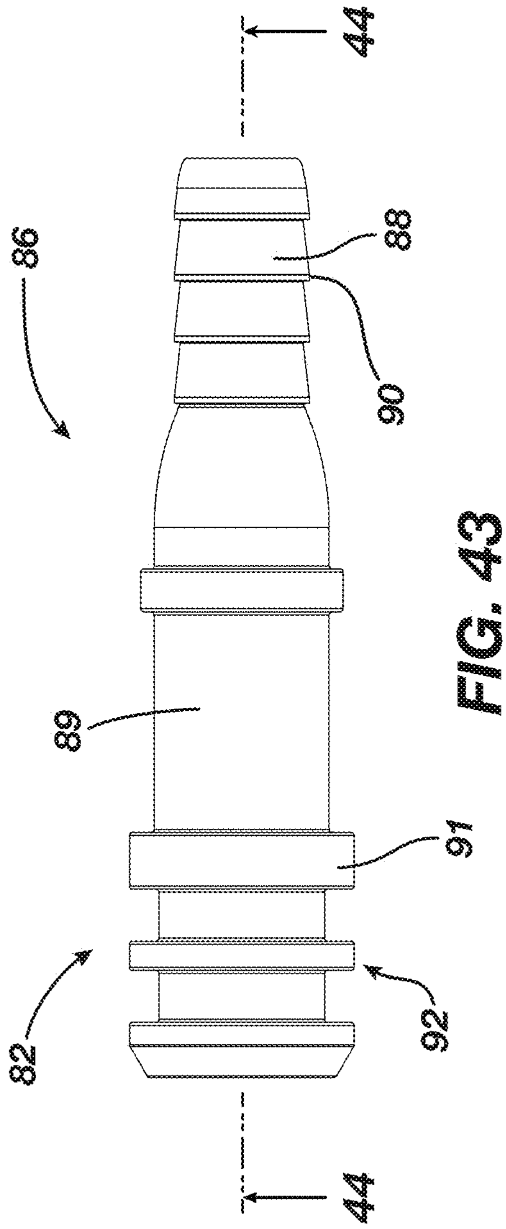
FIGS. 43-44 illustrate a generally cylindrical body of the exemplary barbed quick connect fitting for the second connector assembly, where.
Figure 44:
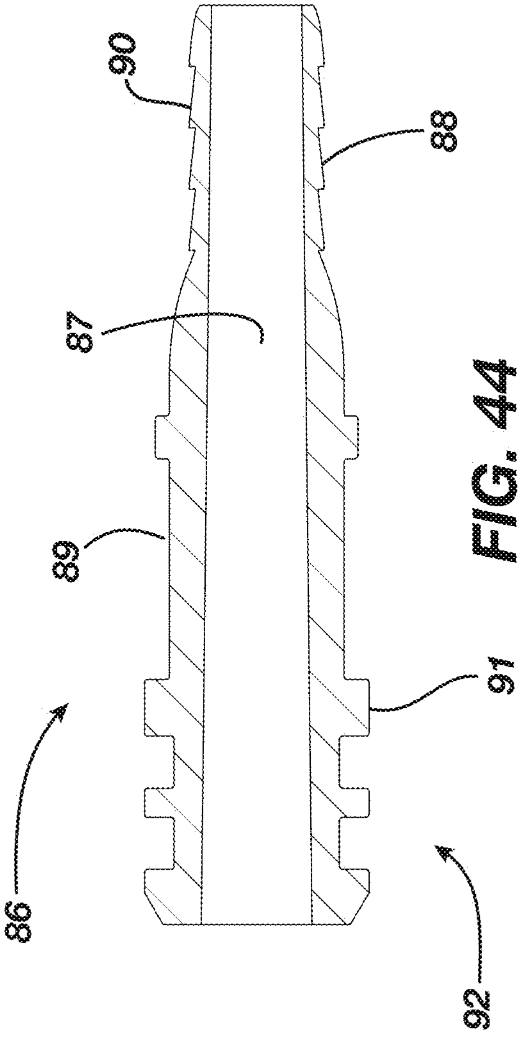
Figure 45A:
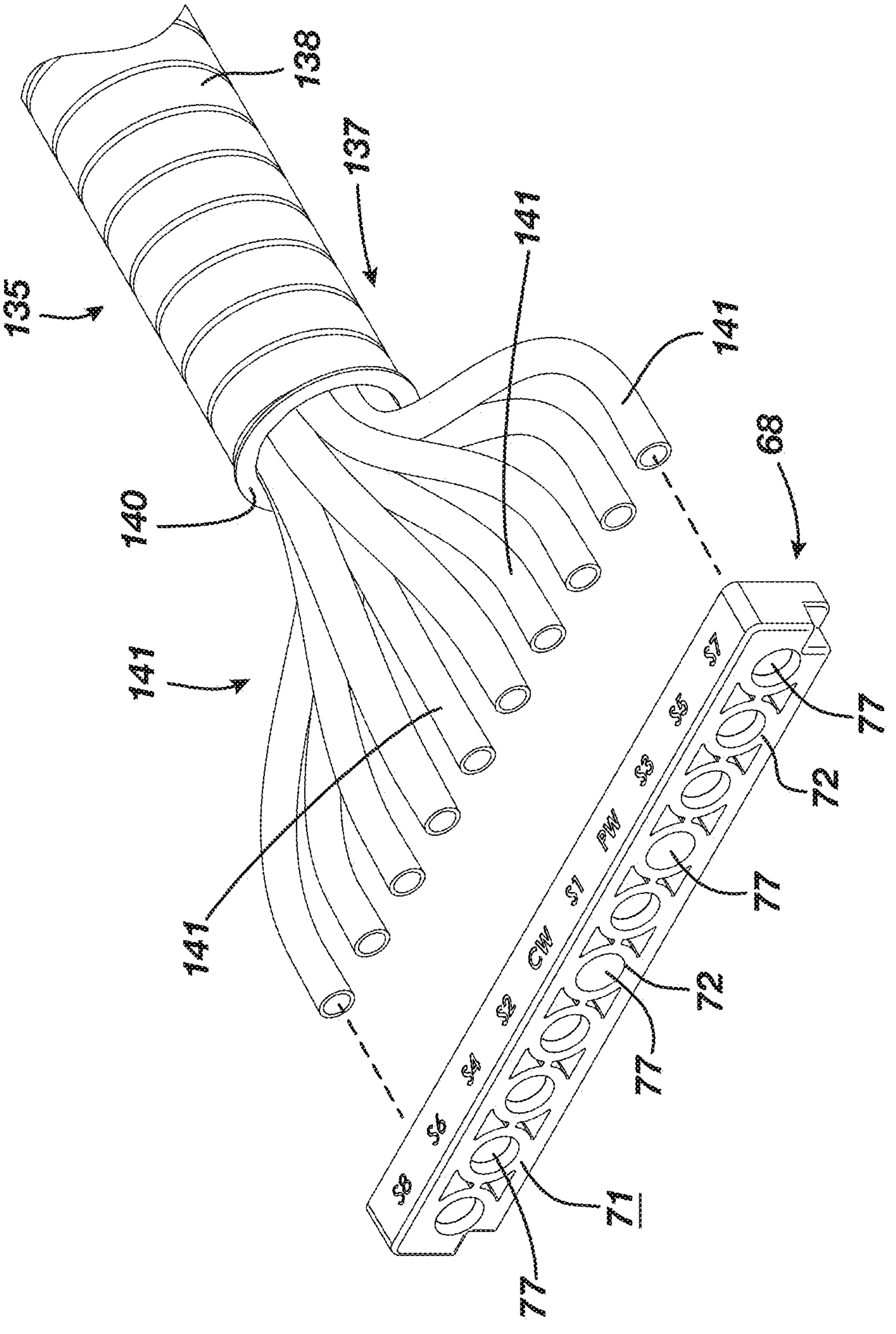
FIGS. 45A-45B illustrate a first stage in the assembly, and concurrent integration with the second end of the sheathed fluid line assembly, of the header subassembly of the second connector assembly, where.
Figure 45B:
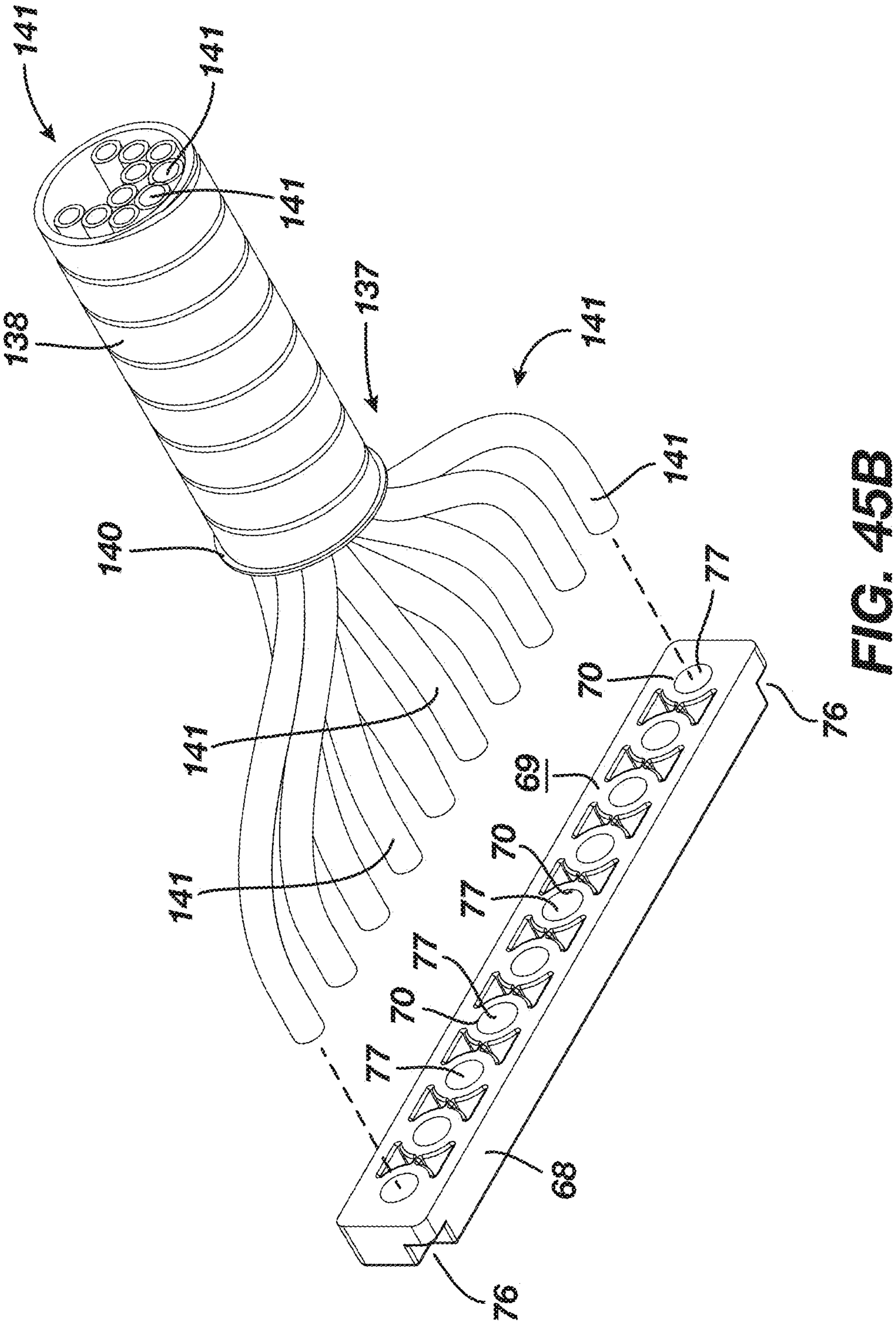
Figure 46A:
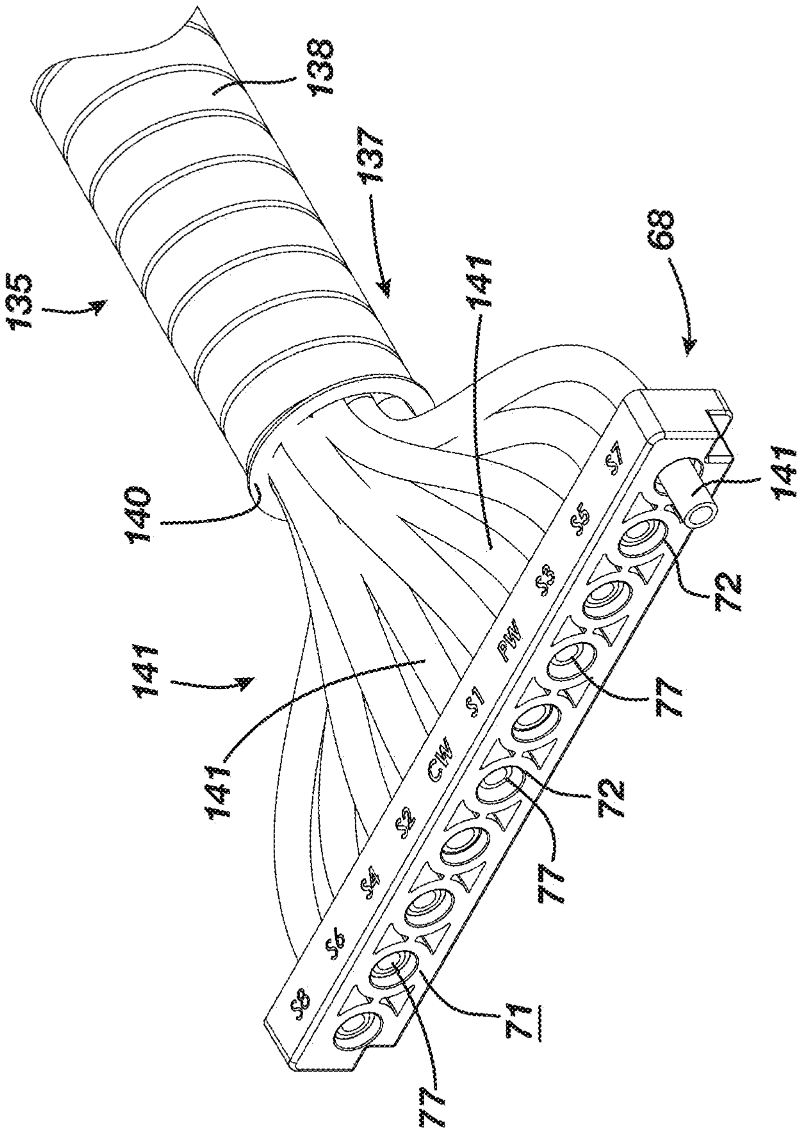
FIGS. 46A-46B illustrate a second stage in the assembly, and concurrent integration with the second end of the sheathed fluid line assembly, of the header subassembly of the second connector assembly, where.
Figure 46B:
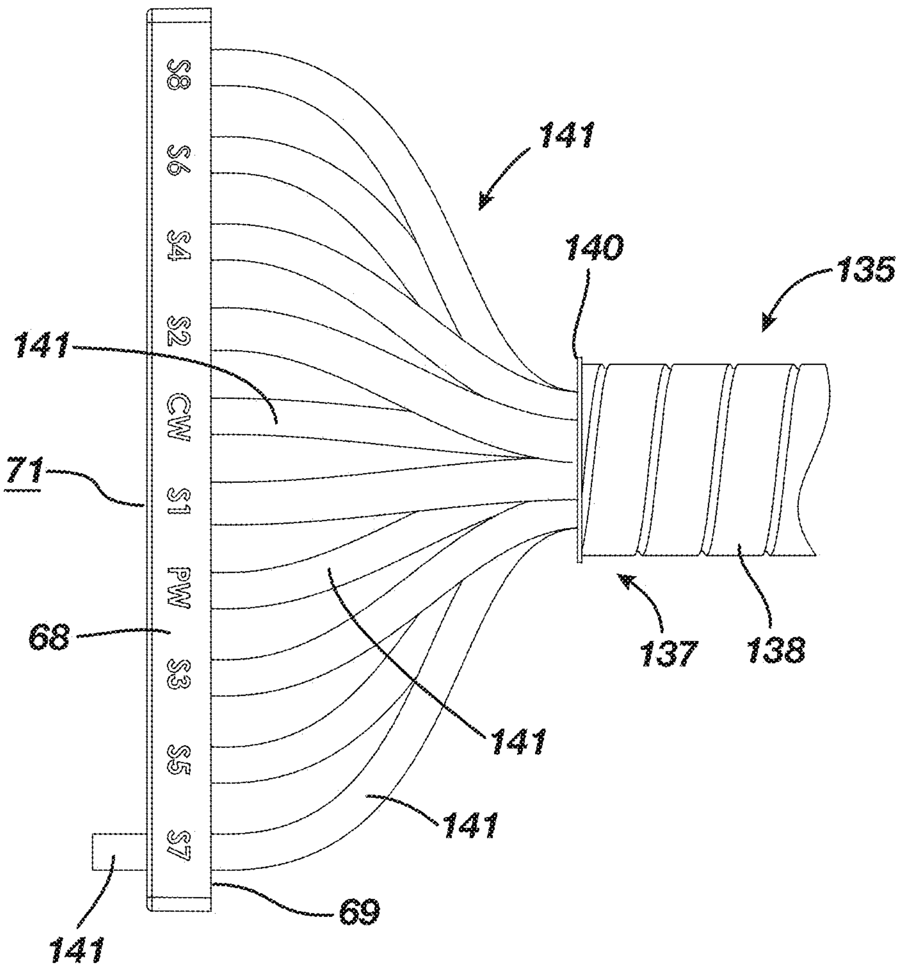
Figure 47A:
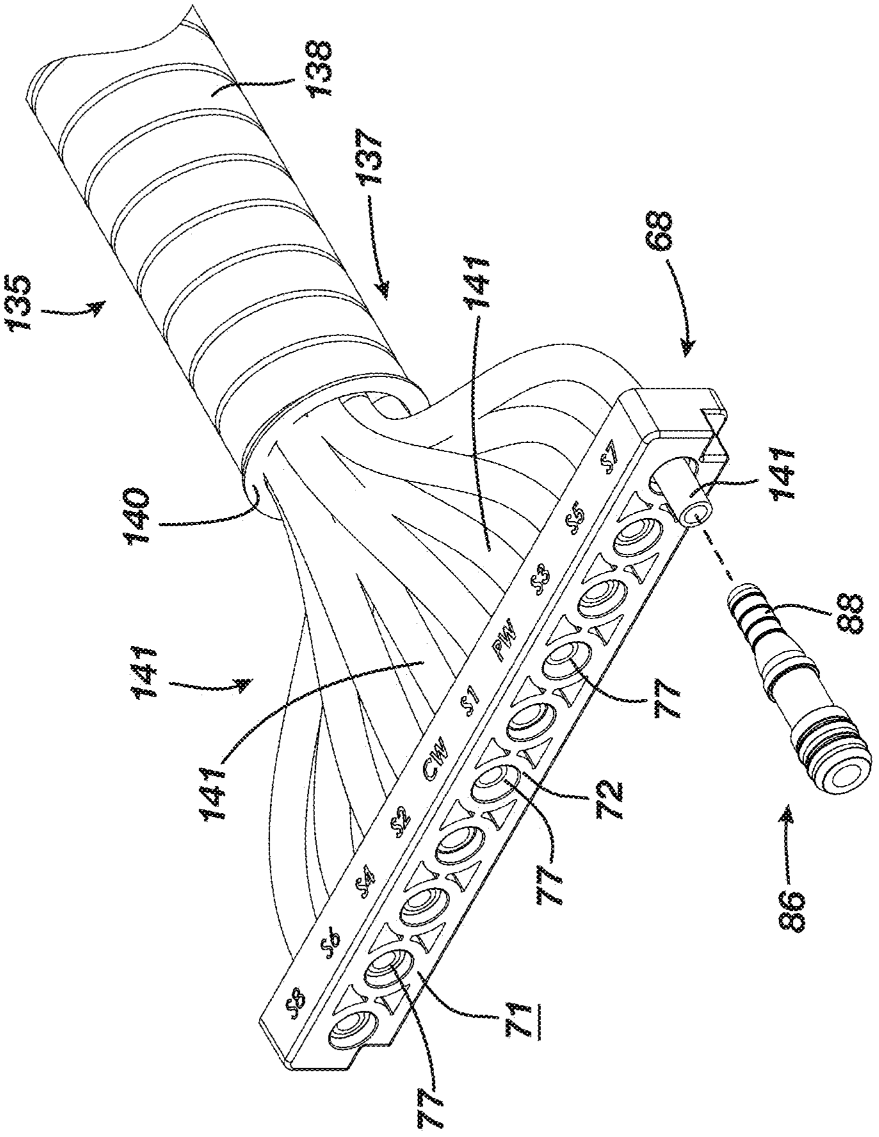
FIGS. 47A-47B illustrate a third stage in the assembly, and concurrent integration with the second end of the sheathed fluid line assembly, of the header subassembly of the second connector assembly, where.
Figure 47B:
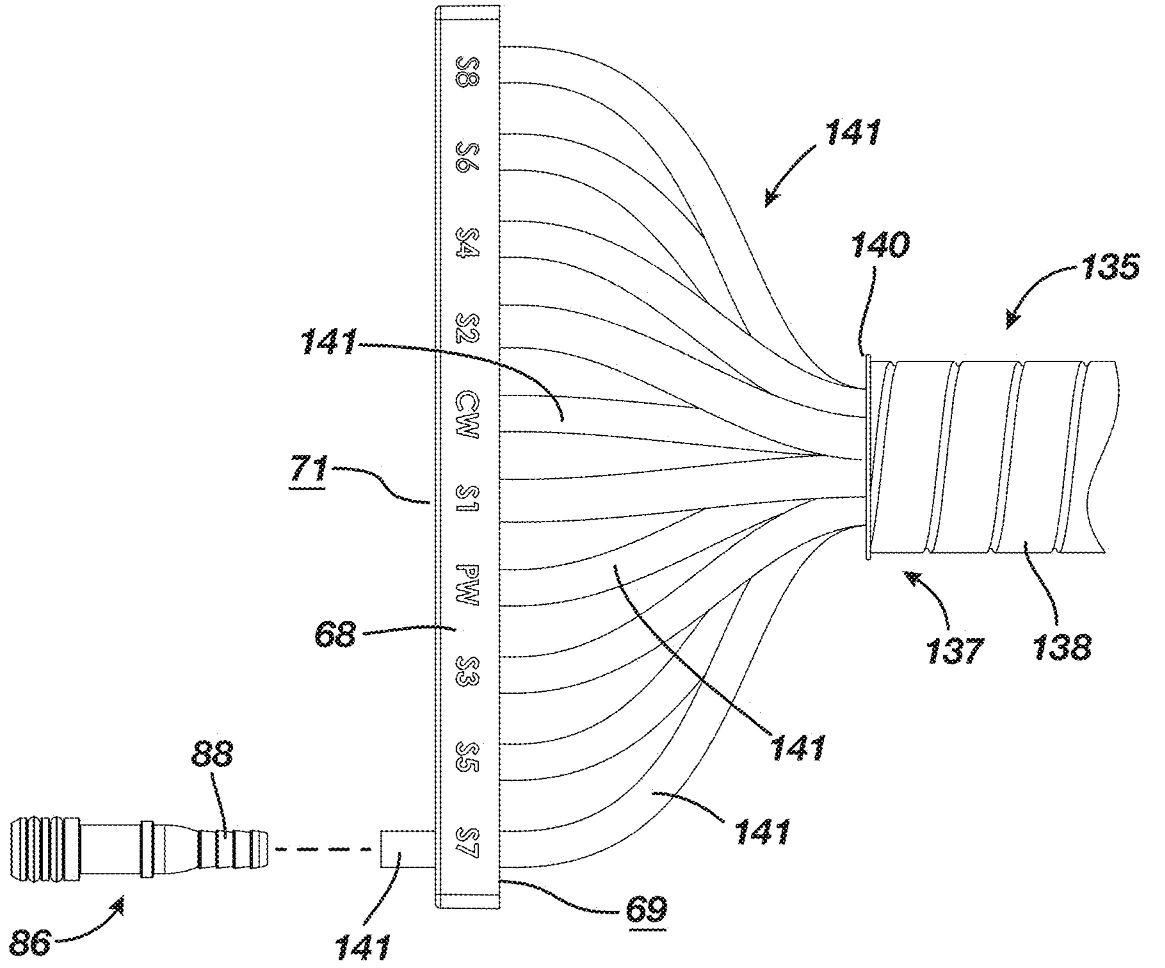
Figure 48A:
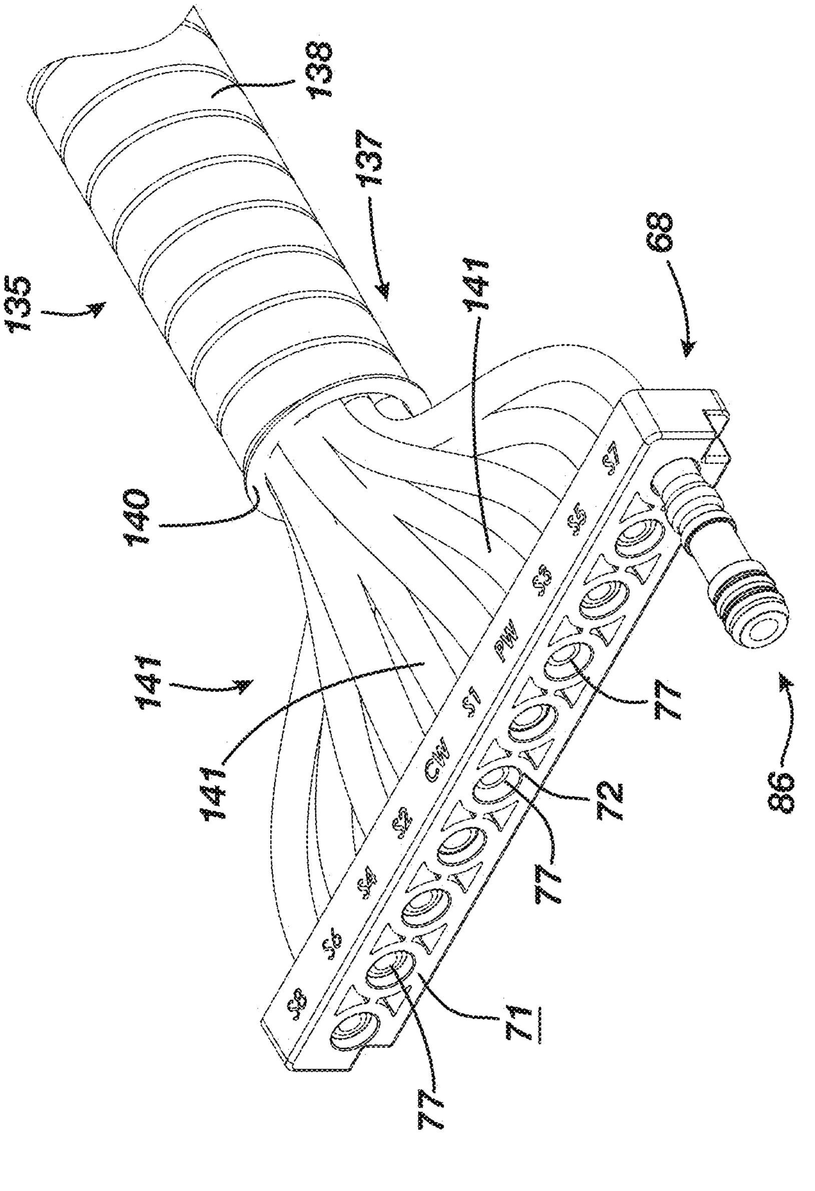
FIGS. 48A-48B illustrate a fourth stage in the assembly, and concurrent integration with the second end of the sheathed fluid line assembly, of the header subassembly of the second connector assembly, where.
Figure 48B:
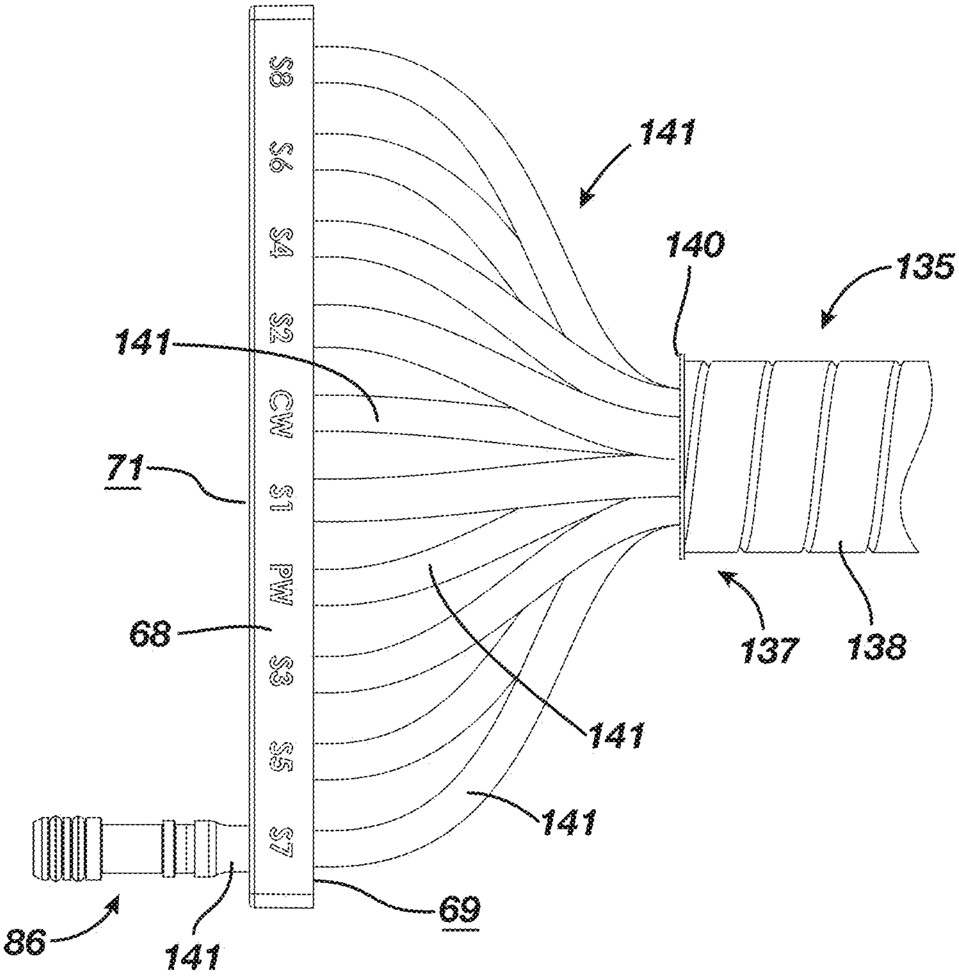
Figure 49A:
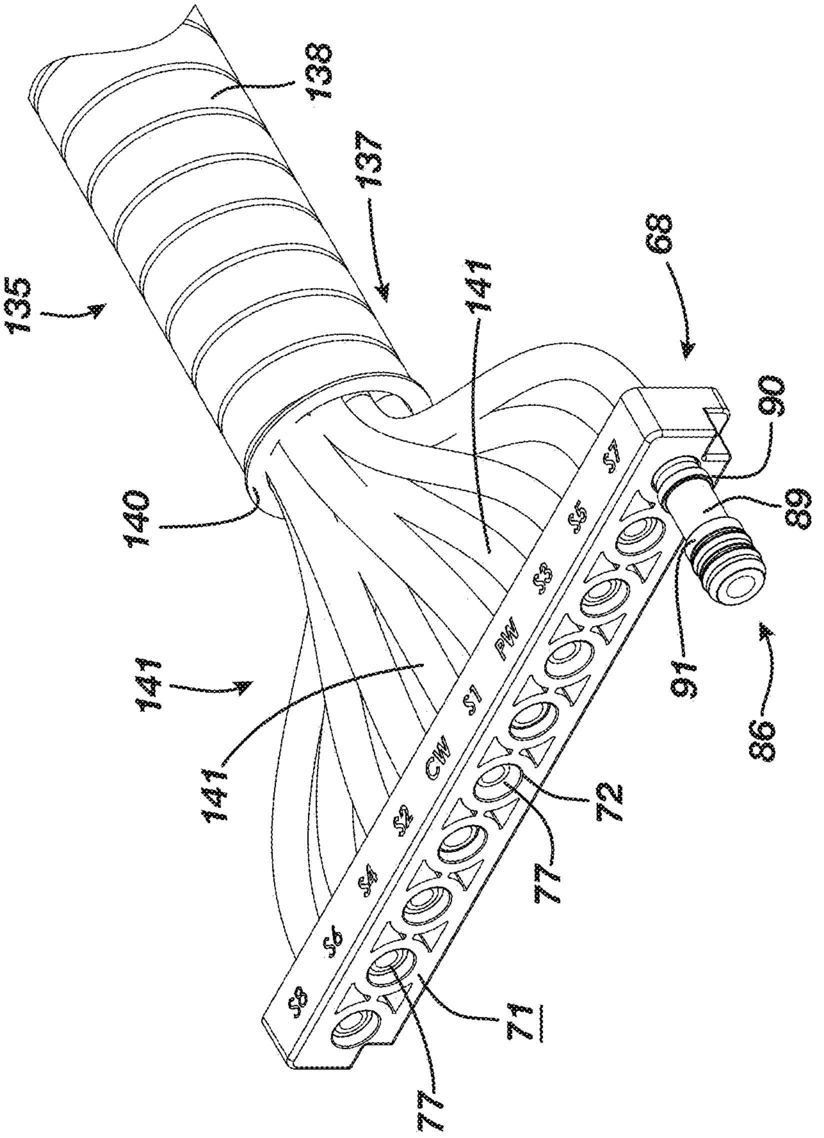
FIGS. 49A-49B illustrate a fifth stage in the assembly, and concurrent integration with the second end of the sheathed fluid line assembly, of the header subassembly of the second connector assembly, where.
Figure 49B:
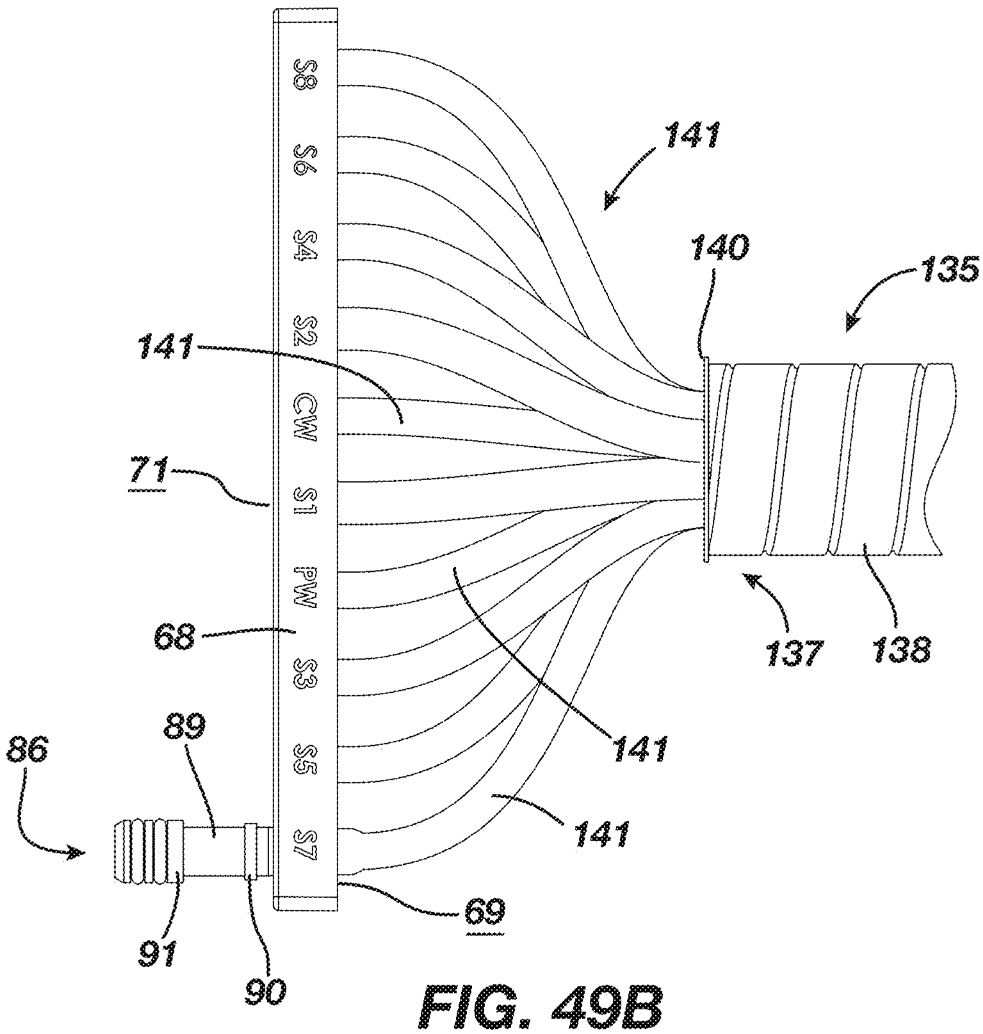
Figure 50:
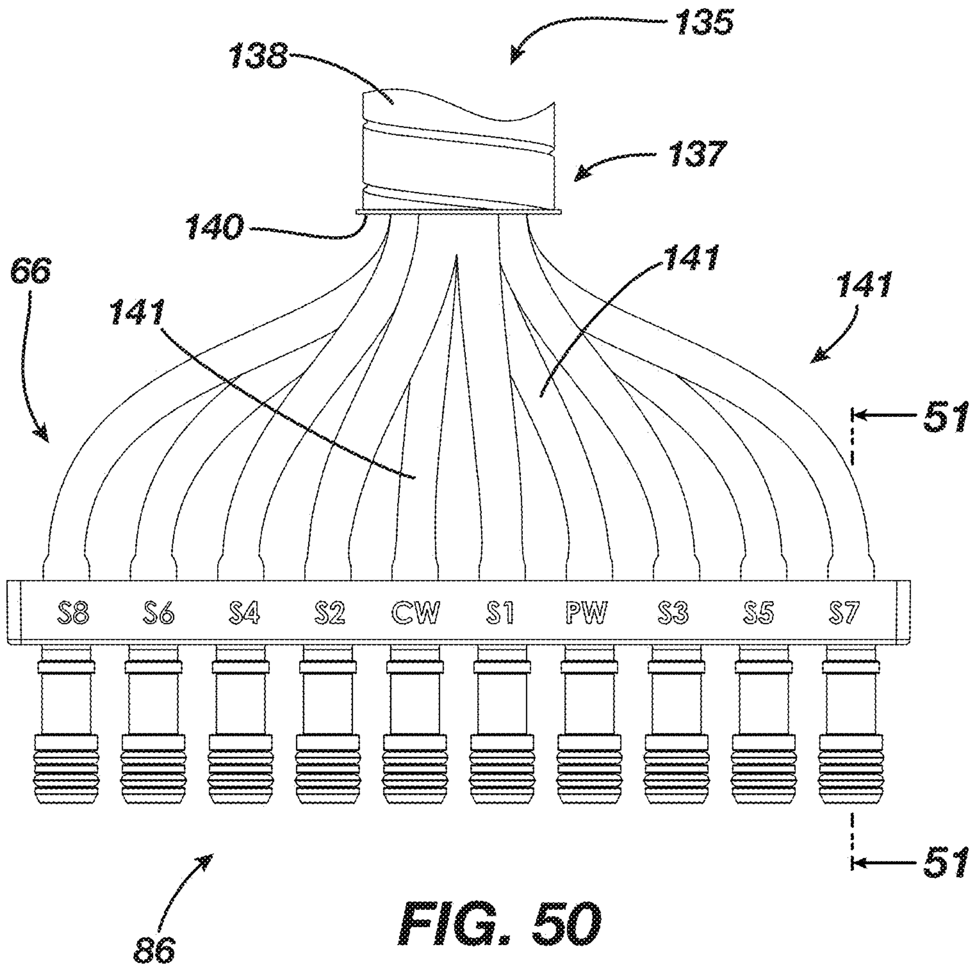
FIG. 50 is a top plan view illustrating the header subassembly of the second connector assembly, as fully integrated with and at the second end of the suitable sheathed fluid line assembly of the fluid line connector arrangement.
Figure 51:
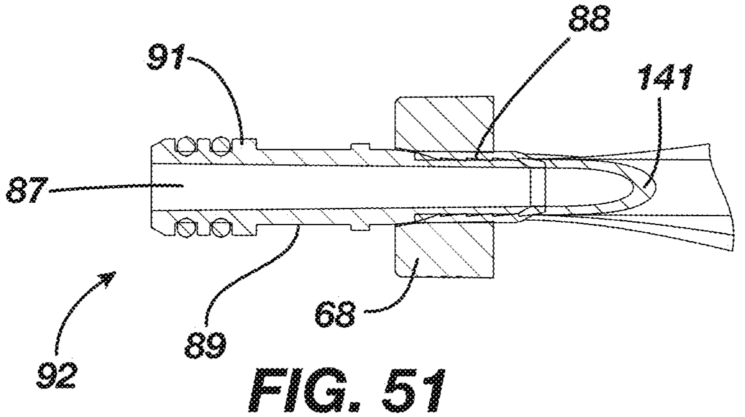
FIG. 51 is a cross-sectional elevational view taken along lines 51-51 of FIG. 50.
Figure 52:
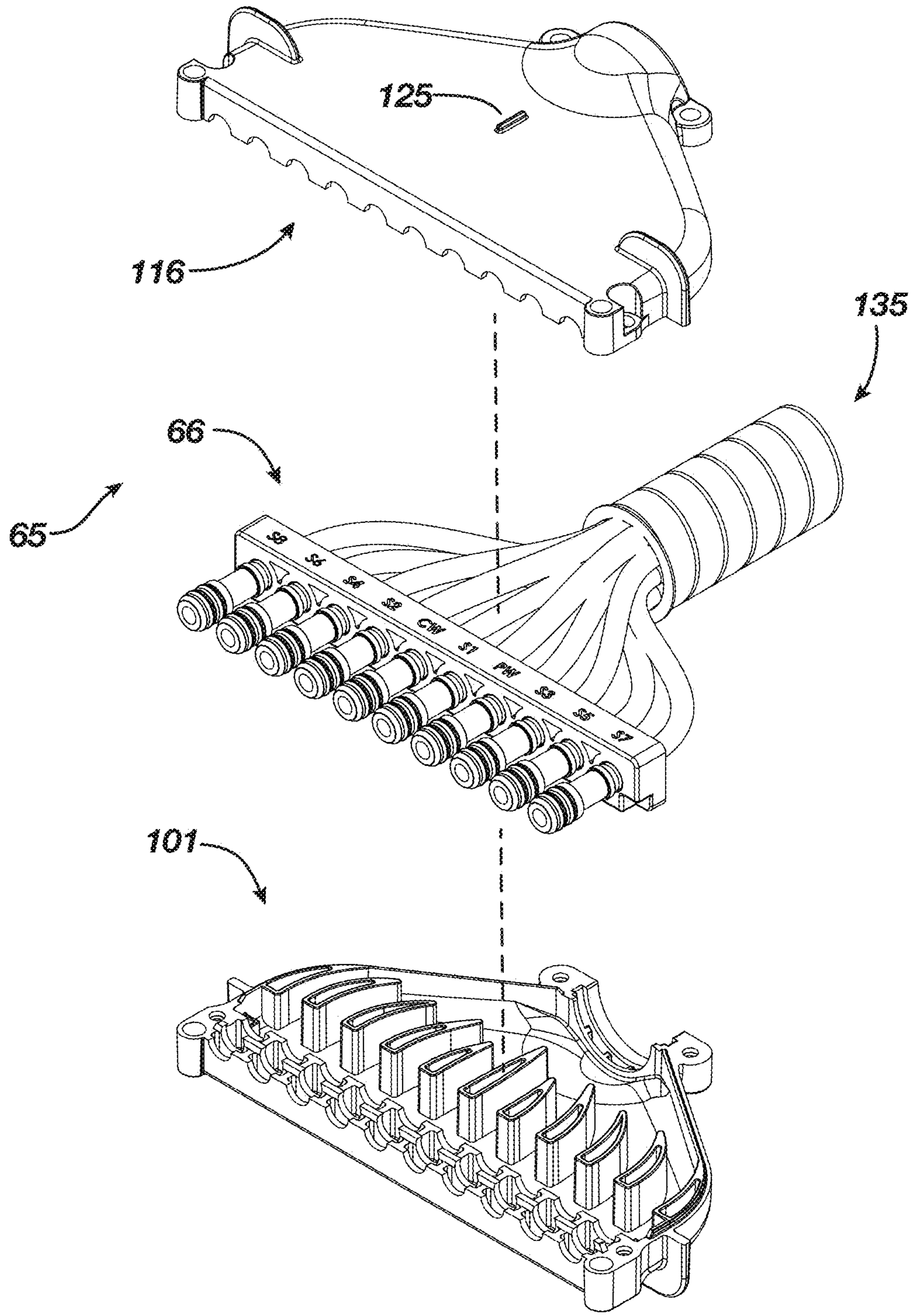
FIG. 52 is a partially exploded top front end isometric view illustrating the header subassembly of the second connector assembly with a first housing member and second housing member of an enclosure subassembly of the second connector assembly.
Figure 53A:
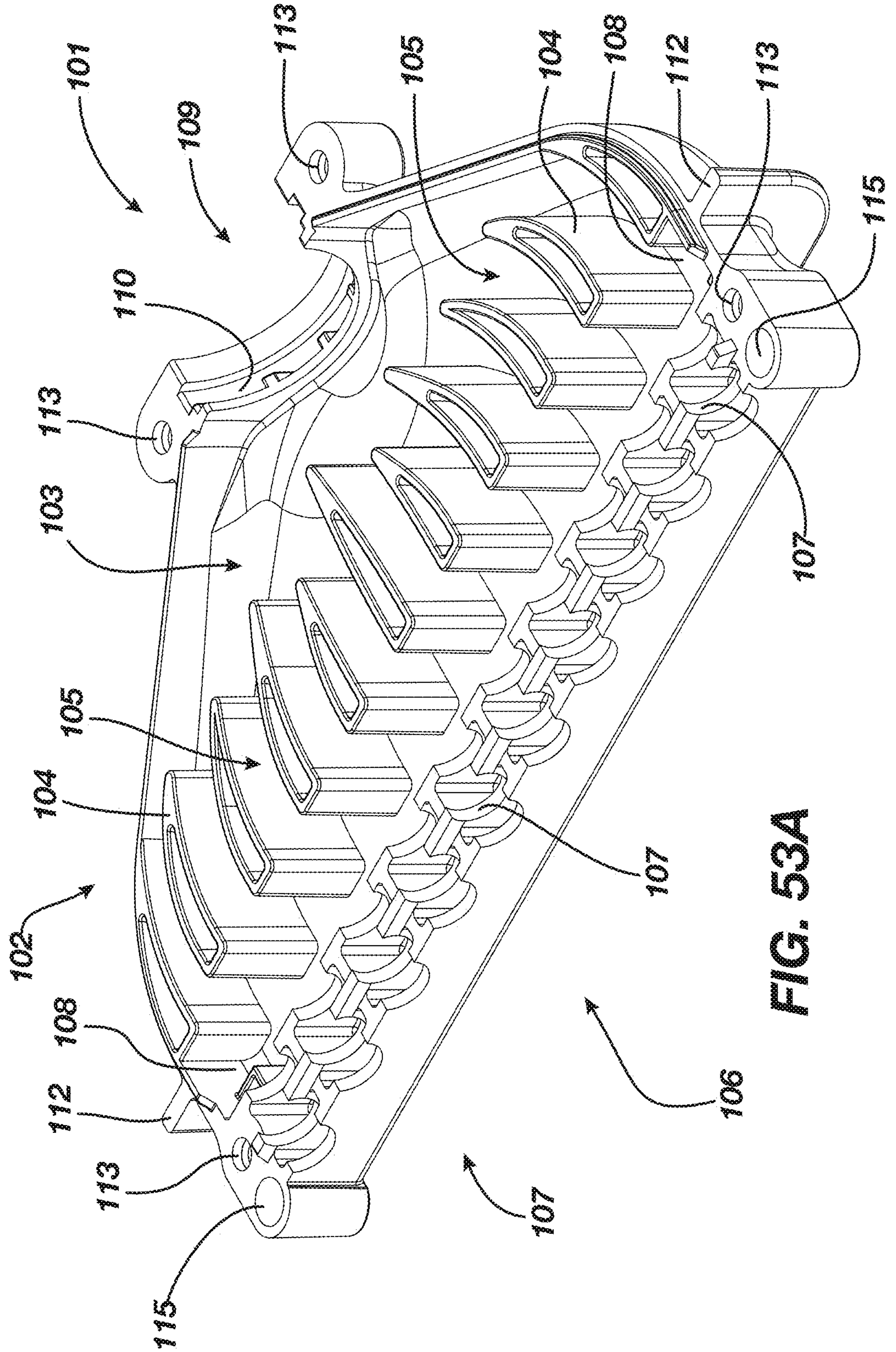
FIGS. 53A-53B illustrate various aspects of the internal features of the enclosure subassembly of the second connector assembly, as embodied in the first housing member of the enclosure subassembly, and where.
Figure 53B:
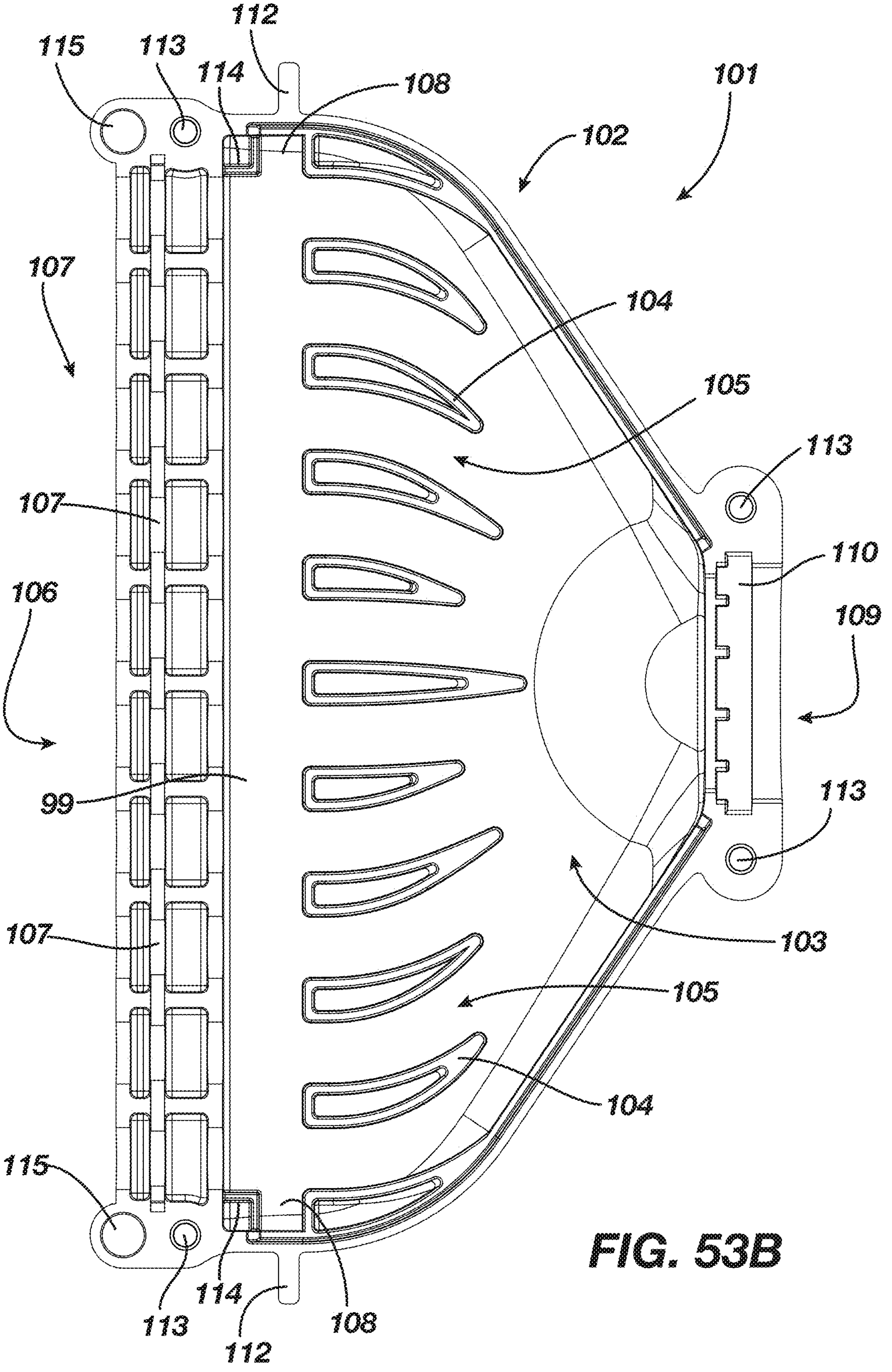
Figure 54A:
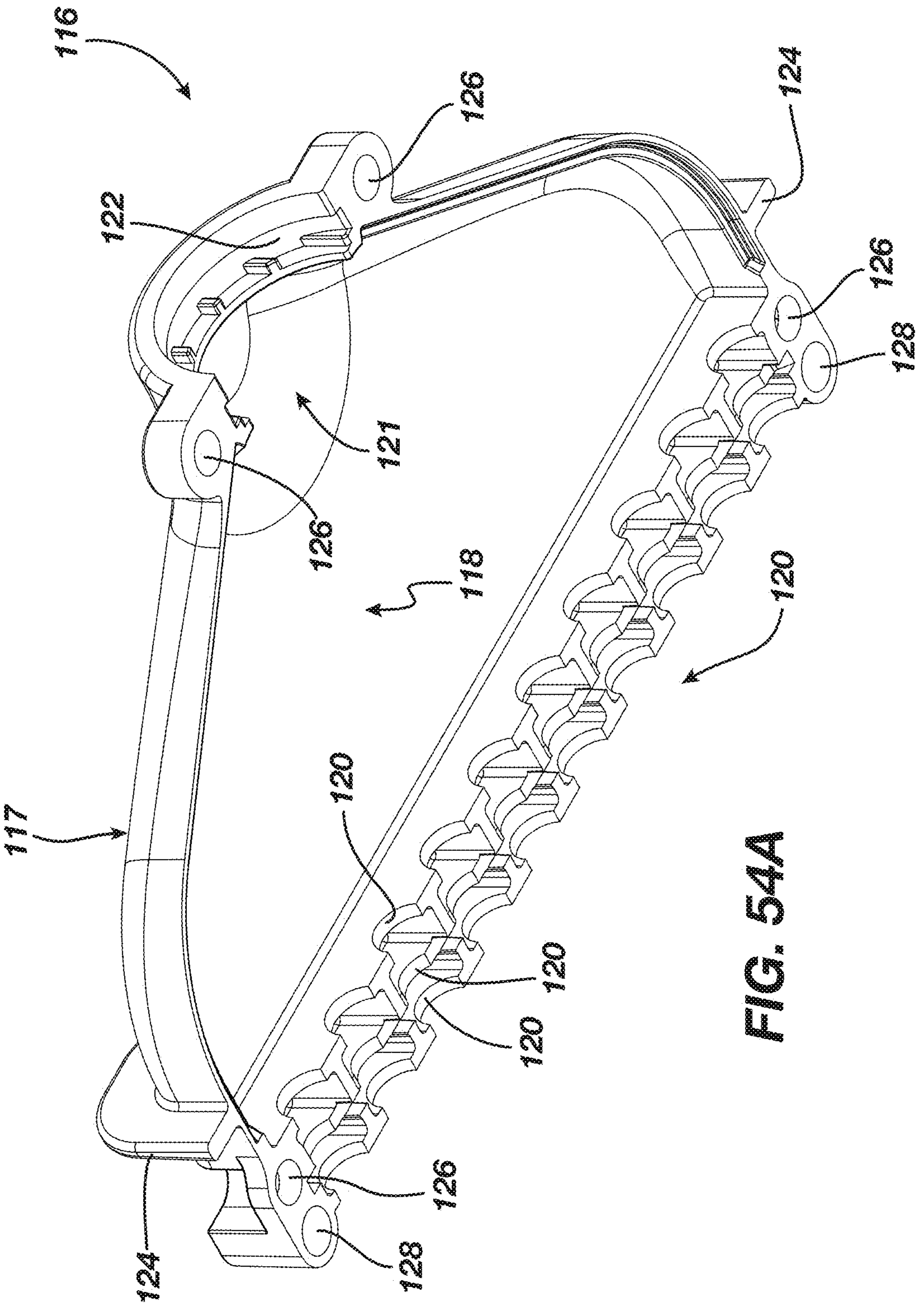
FIGS. 54A-54B illustrate various aspects of the internal features of the enclosure subassembly of the second connector assembly, as embodied in the second housing member of the enclosure subassembly, and where.
Figure 54B:
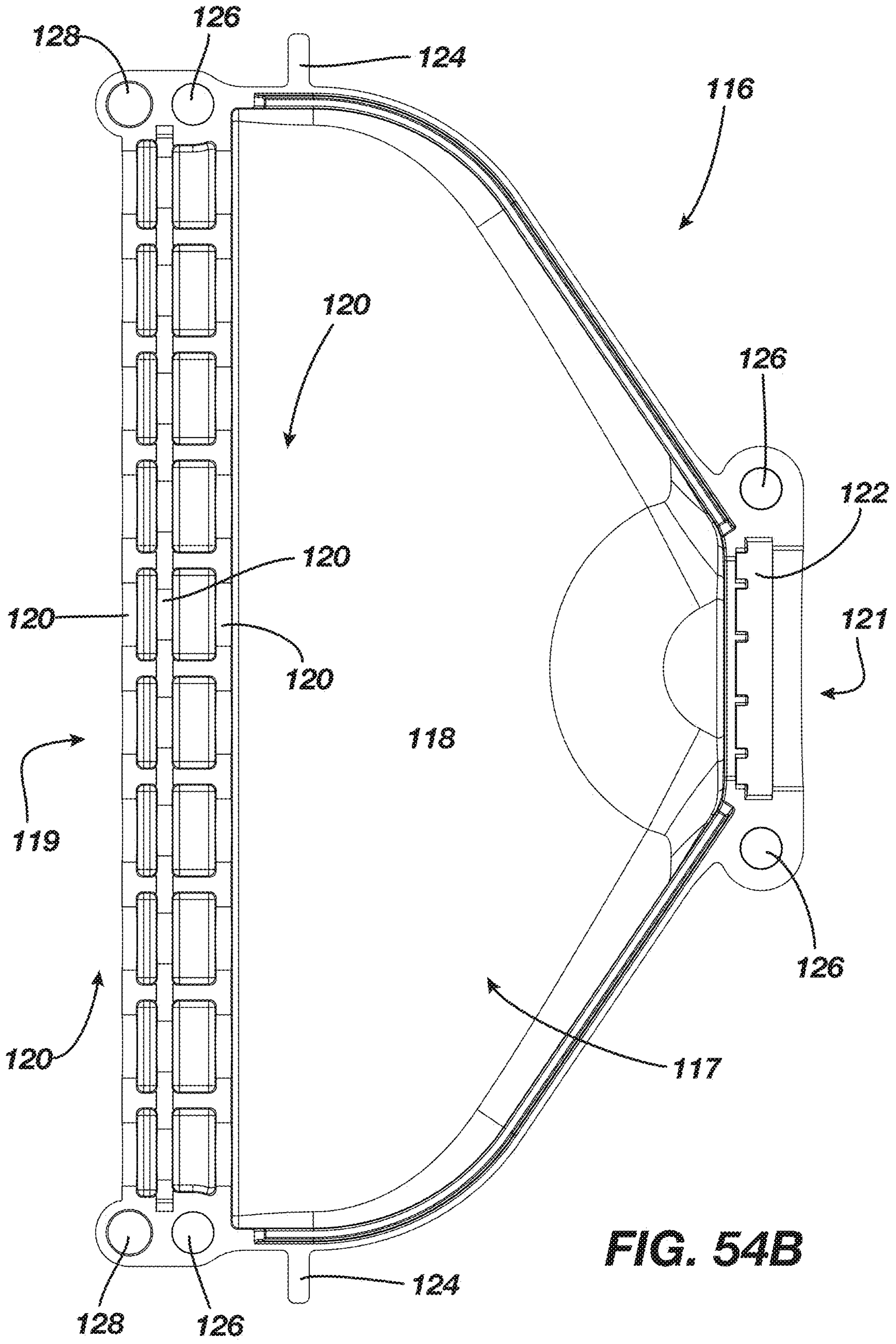
Figure 55A:
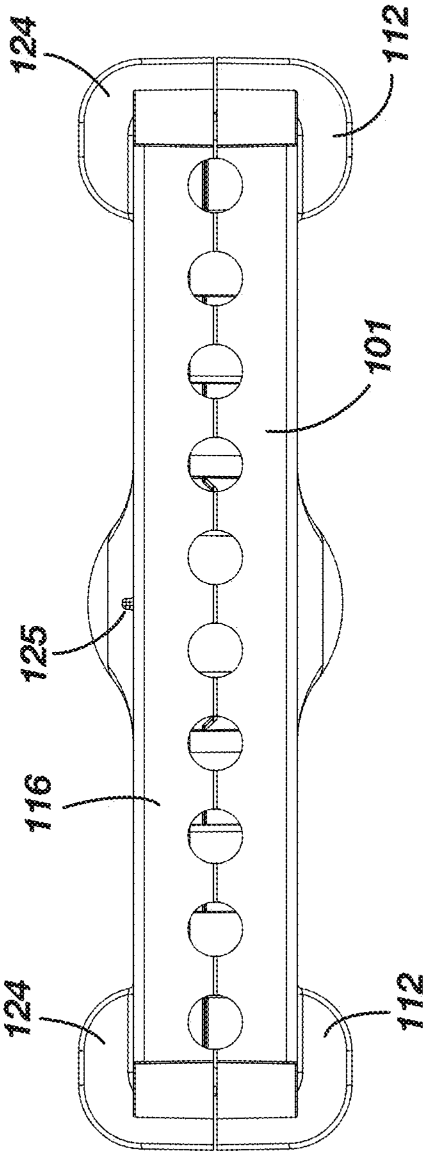
FIGS. 55A-55D illustrate various aspects of the cooperative adaptation of the first housing member and the second housing member of the enclosure subassembly of the second connector assembly, where.
Figure 55B:
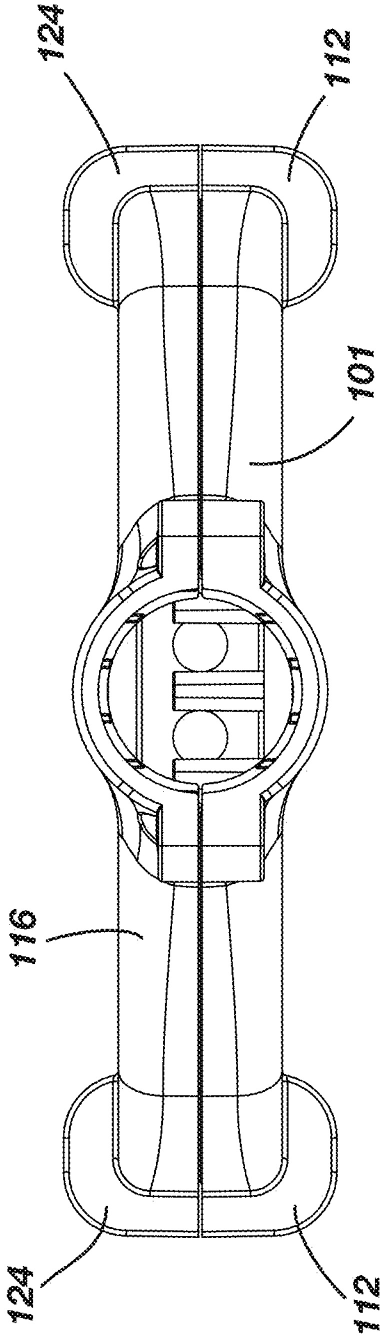
Figure 55C:
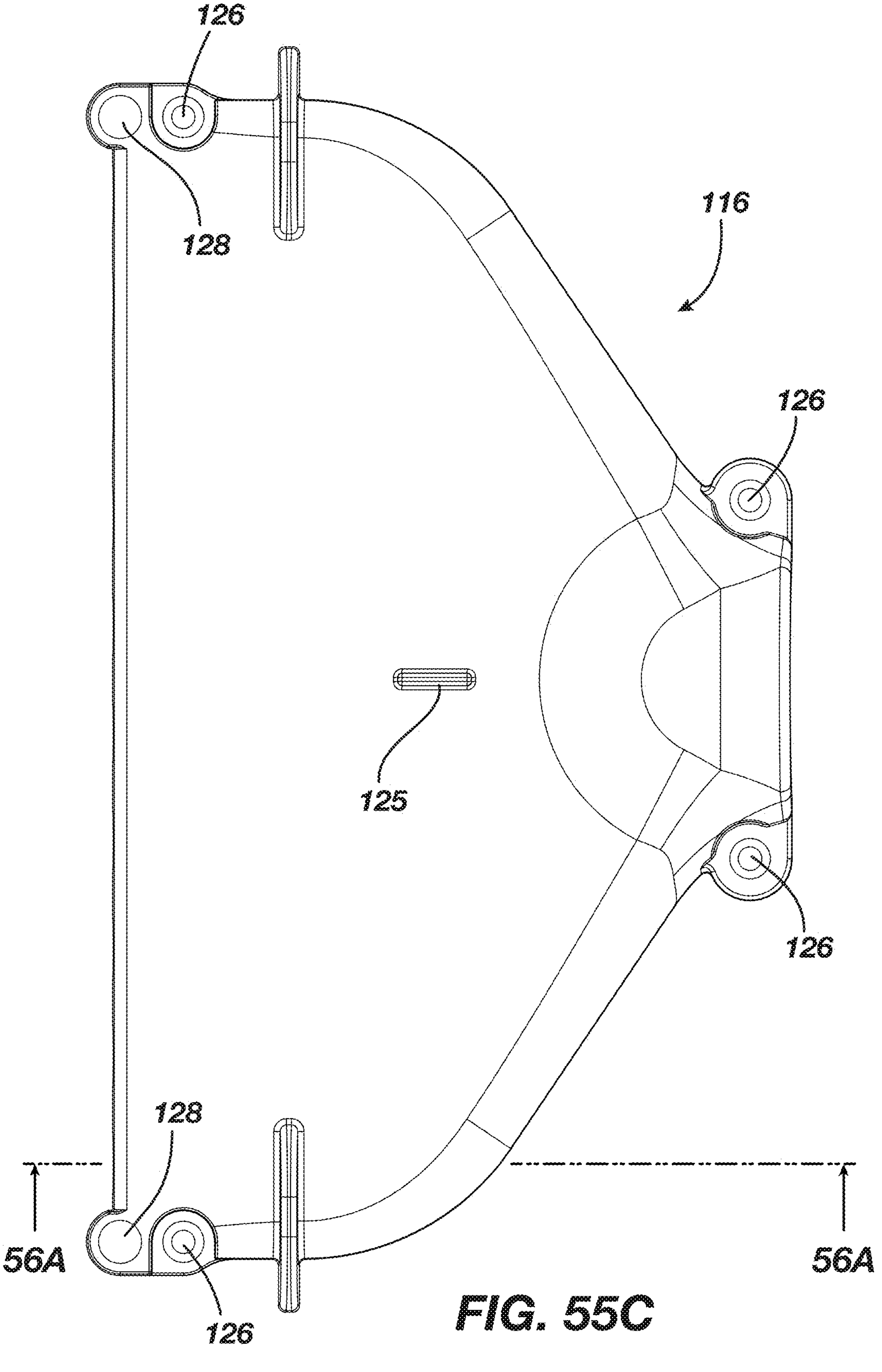
Figure 56A:
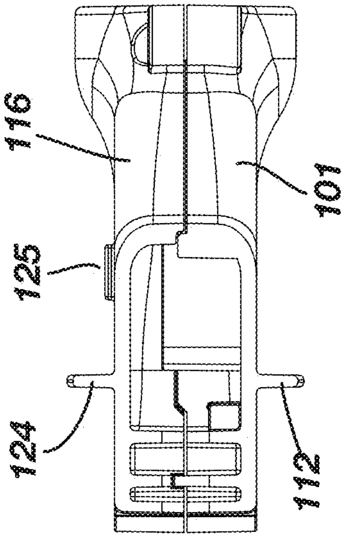
FIGS. 56A-56B illustrate various aspects of the cooperative adaptation of the first housing member and the second housing member of the enclosure subassembly of the second connector assembly, where.
Figure 55D:
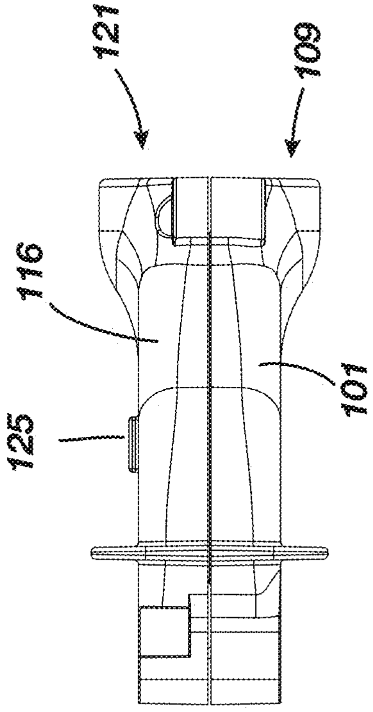
Figure 56B:
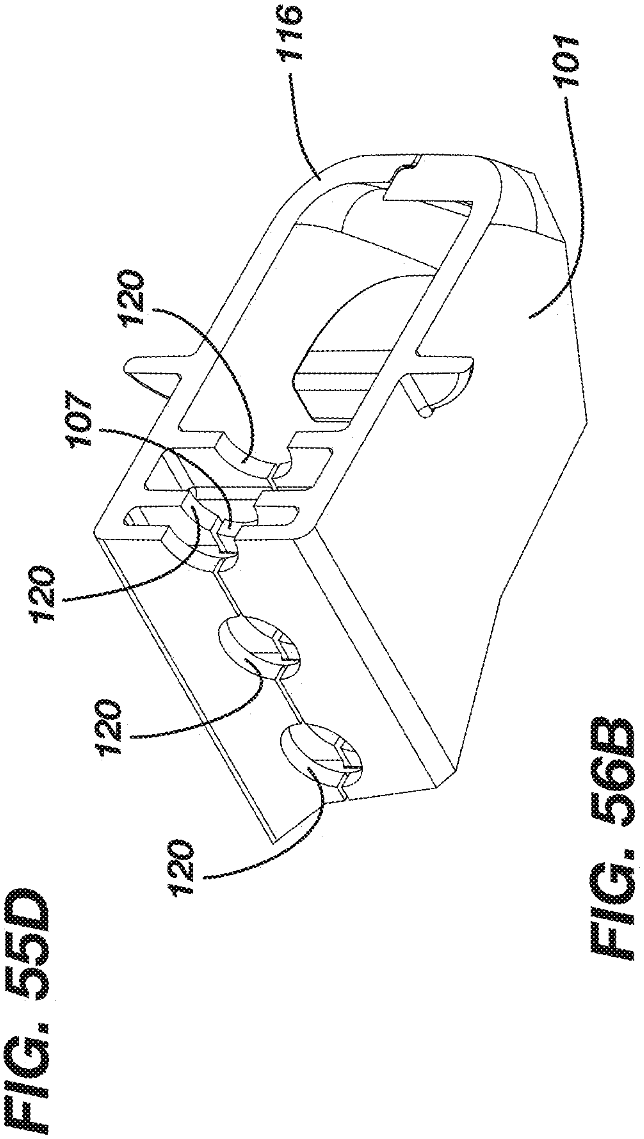
Figure 57:
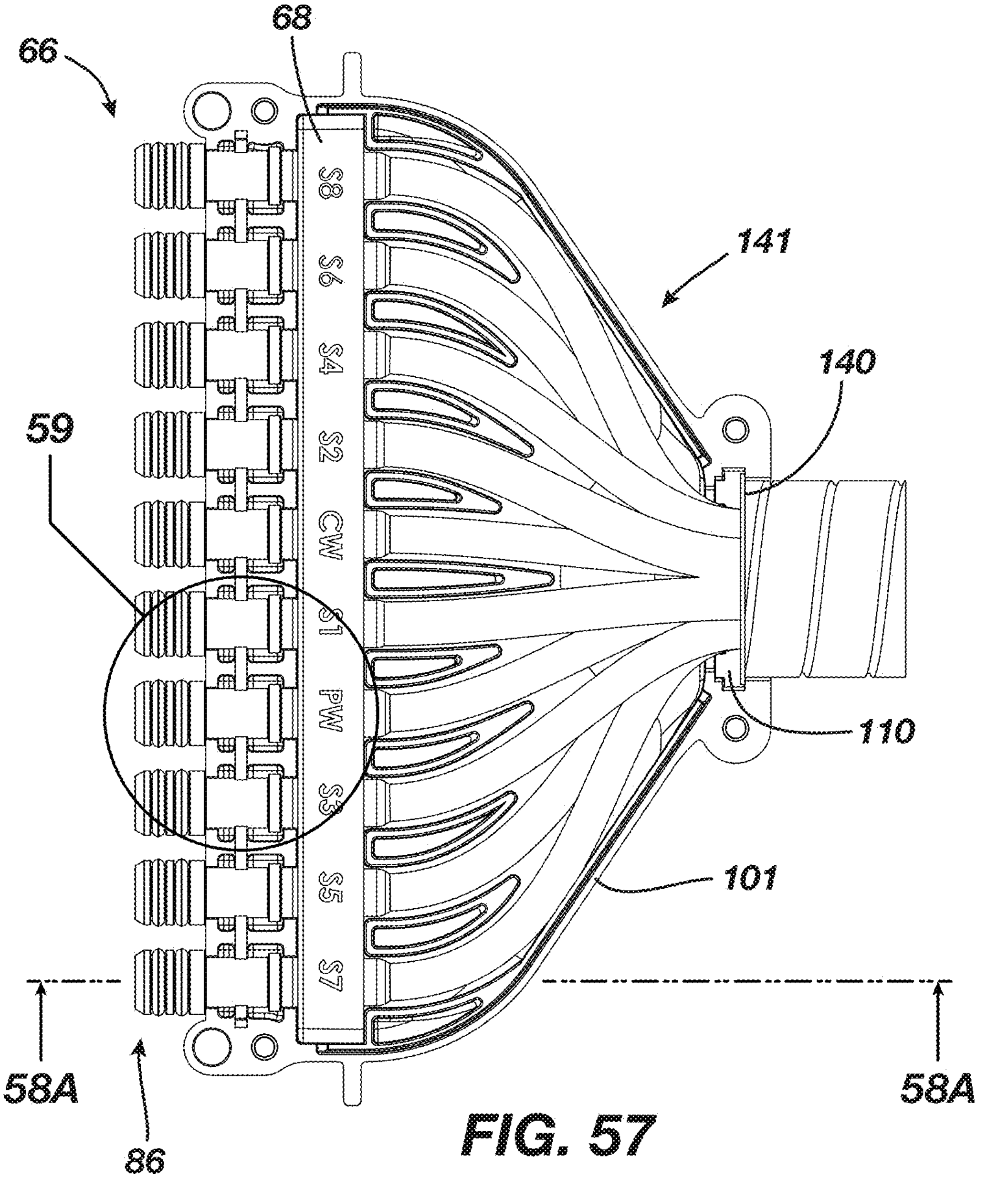
FIG. 57 is a top plan view illustrating a first stage in implementation of the second connector assembly wherein the header subassembly of the second connector assembly is positioned in place with the first housing member of the enclosure subassembly of the second connector assembly.
Figure 58A:
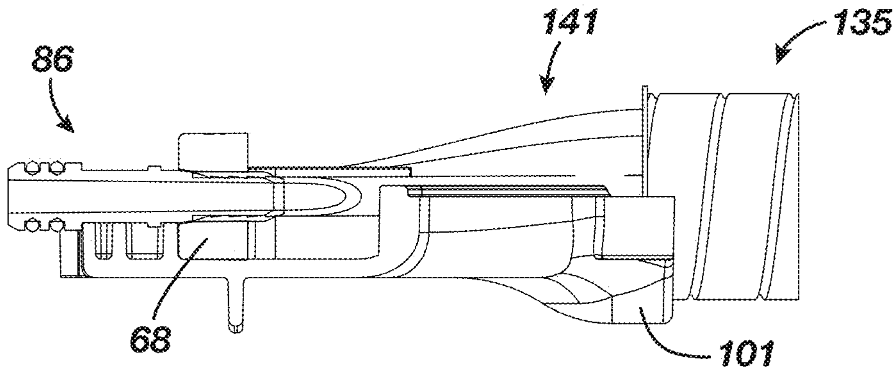
FIGS. 58A-58B illustrate various aspects of the integration of the header subassembly and the enclosure subassembly of the second connector assembly, where.
Figure 58B:
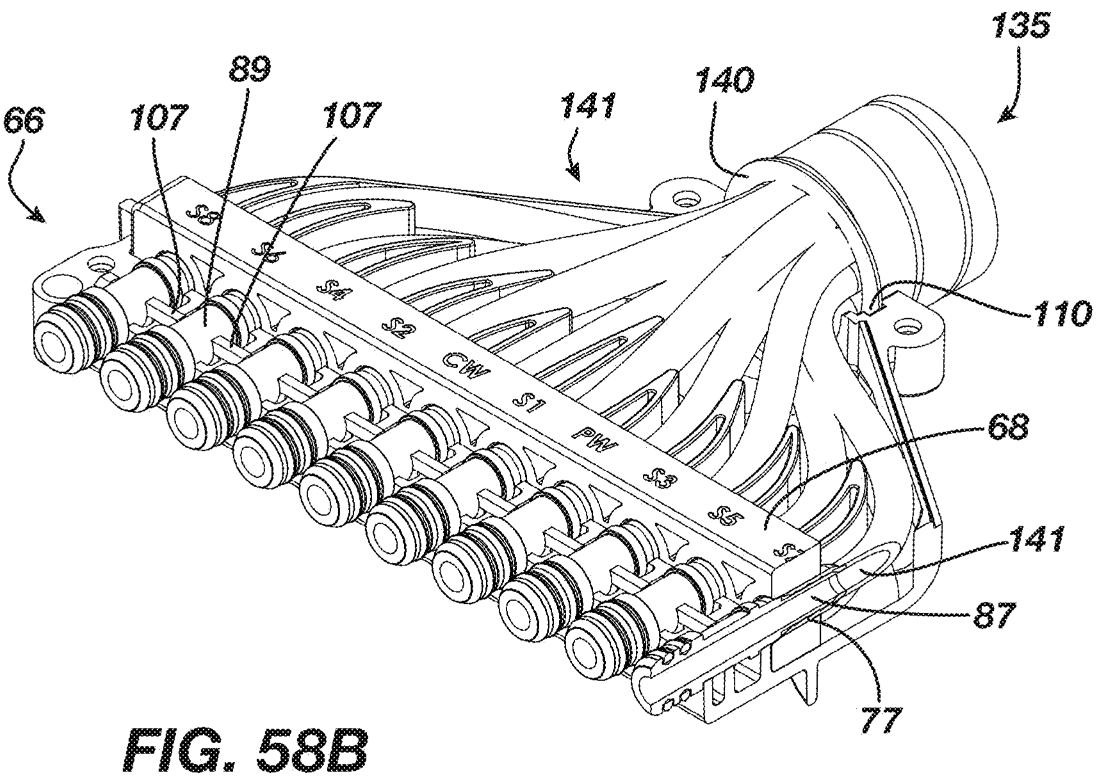
Figure 59:
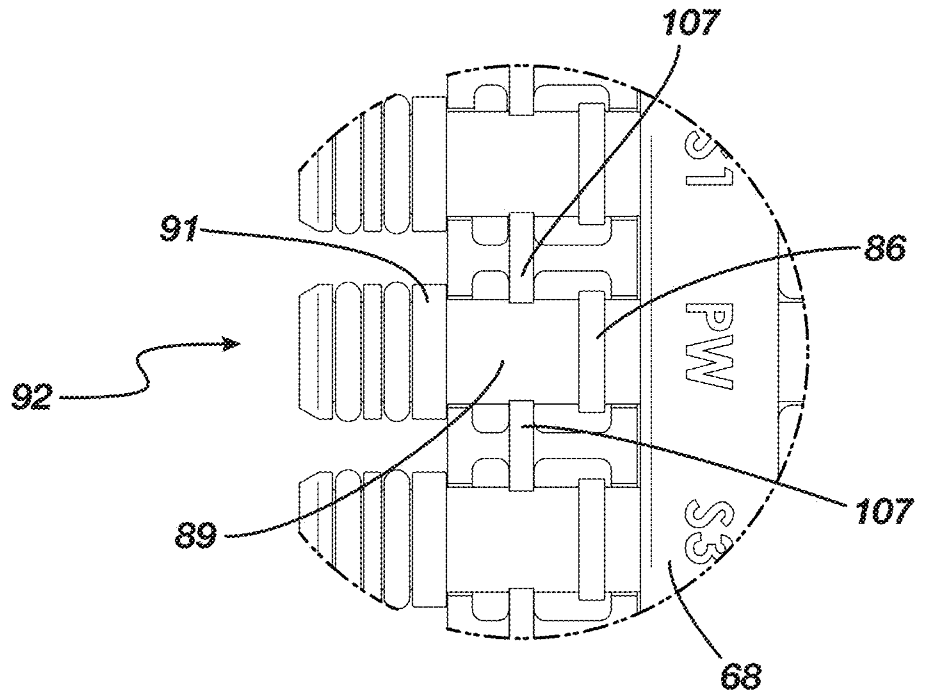
FIG. 59 is a detail view taken from FIG. 57 illustrating various aspects of the integration of the header subassembly and the enclosure subassembly of the second connector assembly.
Figure 69:
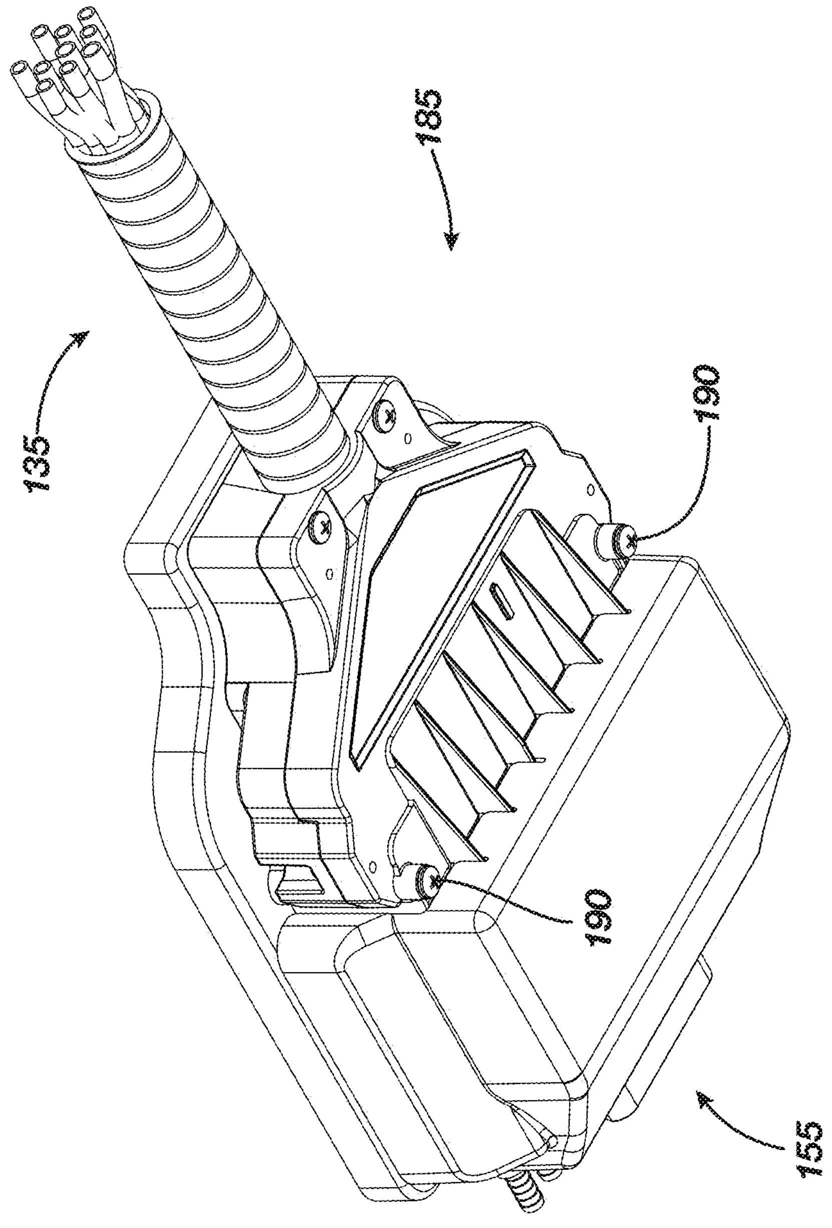

Flow control assemblies suitable for supplying flow regulated pressurized fluids to hand-held beverage dispensers are readily commercially available. The widely available flow control assemblies supply flow regulated pressurized fluids for hand-held beverage dispensers through individual fluid lines-one fluid line for each beverage product, diluent, or any other fluid to be supplied to the hand-held beverage dispensers. In particular with reference to FIGS. 1-69, individual fluid lines 141 from a flow control assembly 155 are typically collected within an elongate tubular sheath 138, which conducts the fluid lines 141 to the point of use of the hand-held beverage dispenser 5. At the distal end 139 of the sheath 138, at the point of use of the hand-held beverage dispenser 5, each fluid line 141 from the flow control assembly 155 is terminated with a connector sized, shaped and otherwise adapted to provide a fluid-tight interface between each fluid line 141 and a corresponding one of the fluid inlets 148 disposed at the rear end 146 of the handle body 145 of the hand-held beverage dispenser 5. As generally implemented, however, a separate provision must be made for fixing the individual connectors in place within each respective corresponding inlet 148.

As will be appreciated by those of ordinary skill in the relevant arts, hand-held beverage dispensers are capable of receiving fluids from a multiplicity of fluid lines. Additionally, those of ordinary skill in the relevant arts will also appreciate that the rear end 146 of the handle body 145 of the hand-held beverage dispenser 5 affords limited space for arranging the provided fluid inlets 148. To be sure, limiting the size of the hand-held beverage dispenser 5 remains an important objective notwithstanding the desire to implement additional functionality. In any case, making the required connections under the current state of the art is often tedious. What is more, however, in service installation where, due to unusual routing or shortage of spare fluid line assemblies, or any other reason, the hand-held beverage dispenser 5 must be replaced independently of an otherwise previously attached the fluid line assembly, this tedious task must be repeated any time a different hand-held beverage dispenser 5 is to be used at the service station, as may well be required during use for beverage service, for example in the event of a malfunctioning hand-held beverage dispenser 5, in addition to routine removal for deep cleaning or other maintenance.

A novel and inventive connector assembly 11 for efficiently connecting a plurality of fluid line fittings 21 to a hand-held beverage dispenser 5 is shown and described. As shown in the figures the connector assembly 11 generally comprises a specially formed header plate 12 and cooperatively adapted clamshell housing assembly 36 constructed or otherwise formed of an upper housing member 44 and a lower housing member 52, as will be better understood further herein. As also will be better understood further herein, the connector assembly 11 is adapted to simultaneously secure a multiplicity of individual fluid lines 141 from a flow control assembly 155 in fluid communication with the fluid inlets 148 of a hand-held beverage dispenser 5. The invention of the connector assembly 11 contemplates a simple "plug-in" type connection of an otherwise typical fluid line assembly 135 to an otherwise typical hand-held beverage dispenser 5. In particular, the connector assembly 11 provides substantially simultaneous "plug-in" type connection of each of a multiplicity of barbed quick connect fittings 22, or similarly capable fittings or like connectors, to a multiplicity of fluid inlets 148 conventionally located at the rear end 146 of the handle body 145 of the hand-held beverage dispenser 5, thereby substantially simultaneously placing each of a corresponding multiplicity of individual fluid lines 141 running through the fluid line assembly 135 in fluid communication with the fluid inlets 148 of the hand-held beverage dispenser 5. Additionally, however, the invention of the connector assembly 11 contemplates a simple securement through which each of the individual barbed quick connect fittings 22 or like connectors, is substantially simultaneously fixed securely in place within each respective corresponding fluid inlet 148 of the hand-held beverage dispenser 5. To this end, as will be better understood further herein, the connector assembly 11 further inventively includes a clamshell housing assembly 36.

A typical barbed quick connect fitting 22 as is well known by those of ordinary skill in the relevant arts for conventional use in terminating and connecting such fluid lines 141 is particularly shown in the FIGS. 11-15B. The typically used barbed quick connect fitting 22 comprises a generally cylindrical body 25 having a male barbed connector 24 at a first end 23 thereof. As will be better understood further herein, each male barbed connector 24 is sized for connection with the distal ends of the individual fluid lines 141 from the flow control assembly 155. The typical barbed quick connect fitting 22 also has a male quick connector 27 at a second end 28 thereof. Additionally, however, a provision is made for, and the male quick connector 27 also includes, one or more circumferential seals, such as O-rings 26 or like seals. As will also be better understood further herein, each male quick connector 27 is sized for insertion within fluid inlet ports 149 about the fluid inlets 148 at the rear end 146 of the handle body 145 of a hand-held beverage dispenser 5, as represented by the exemplary hand-held beverage dispenser 5, as particularly shown in Figure and otherwise herein previously described in detail. In any case, an open flow path 29 is longitudinally provided from the first end 23 to the second end 28 through the cylindrical body 25.

Referring to FIGS. 6-10, the specially formed header plate 12 comprises a preferably generally planar rear face 14, which in use of the connector assembly 11 faces away from the rear end 146 of the handle body 145, and a preferably generally planar front face 16 facing the rear end 146 of the handle body 145, which in use of the connector assembly 11 faces the rear end 146 of the handle body 145. A multiplicity of specially formed tapered connector holes 15 are formed or otherwise provided through the header plate 12, each of which comprises a first circular opening 19 at the rear face 14 of the header plate 12 and a second circular opening 17 at the front face 16 of the header plate 12. The first circular opening 19 and the second circular opening 17 are concentrically formed about the longitudinal axis through the connector hole 15, and the first circular opening 19 has a diameter operably less than the diameter of the second circular opening 17, as will be better understood further herein. Additionally, the header plate 12 comprises a plurality of clearance holes corresponding to a plurality of tapped or otherwise threaded holes 20 provided at the rear end 146 of the handle body 145 of a hand-held beverage dispenser 5. As will be better understood further herein, each of the clearance holes 20 through the header plate 12 is sized for free passage of the major threads of machine screws or the equivalent part of implemented mounting hardware.

As previously generally described in the previously presented detailed description of the exemplary hand-held beverage dispenser 5, a multiplicity of individual fluid lines 141 conduct various beverage fluids from a flow control assembly 155 to the hand-held beverage dispenser 5 for mixing and dispensing as desired. The multiplicity of fluid lines 141 is conventionally contained within an elongate tubular sheath 138 to form a sheathed fluid line assembly 135. The distal end from the flow control assembly 155 of each individual fluid line 141 protrudes a short distance from the distal end 139 of the elongate tubular sheath 138. In use of the present invention, the male barbed connector 24 of a barbed quick connect fitting 22 must be connected in fluid communication to the accessible distal end of each individual fluid line 141. In implementation of the connector assembly 11 of the present invention the previously described header plate 12 is interposed between the distal end 139 of the sheath 138 of the fluid line assembly 135 and the distal end of each individual fluid line 141 as the barbed quick connect fittings 22 are connected to the fluid lines 141.

To begin connection of the barbed quick connect fittings 22 to the distal ends of the individual fluid lines 141, the header plate 12 is first oriented with the rear face 14 of the header plate 12 facing the individual fluid lines 141 protruding from the distal end 139 of the sheath 138, as shown in FIGS. 16A-32. The distal end of a selected one of the individual fluid lines 141 is then inserted through the first circular opening 19 to a tapered connector hole 15 at the rear face 14 of the header plate 12, and through the tapered connector hole 15 to project from the second circular opening 17 of the tapered connector hole 15 at the front face 16 of the header plate 12. The male barbed connector 24 of a barbed quick connect fitting 22 is then inserted into the distal end of the selected one of the individual fluid lines 141, leaving substantially only the male quick connector 27 of the connected barbed quick connect fitting 22 to project from the distal end of the selected one of the individual fluid lines 141. The male barbed connector 24 of connected barbed quick connect fitting 22 is then forced through the second circular opening 17 into the tapered connector hole 15, allowing the individual fluid line to retreat as necessary. As previously noted, each tapered connector hole 15 operatively decreases in diameter from the front face 16 to the rear face 14 of the header plate 12, such that the distal end of the selected one of the individual fluid lines 141 is securely clamped about the male barbed connector 24, and each are frictionally secured within the tapered connector hole 15. This process, which may be conducted in parallel, is applied for each of the individual fluid lines 141.

With the header plate 12 affixed to the distal ends of the individual fluid lines 141, the male quick connector 27 of each of the multiplicity of dependently supported and arranged barbed quick connect fittings 22 is simultaneously inserted into a corresponding one of the previously described fluid inlet ports 149 at the rear end 146 of the handle body 145 of the hand-held beverage dispenser 5. At this juncture, all of the individual fluid lines 141 are in fluid communication with a corresponding one of the fluid inlets 148 to the handle body 145, but are not secured in place. To this end, the connector assembly 11 of the present invention comprises the previously noted clamshell housing assembly 36, which is cooperatively adapted with the header plate 12 to simultaneously affix each inserted male quick connector 27 securely in place within the corresponding fluid inlet port 149.

Mating together of the upper housing member 44 and the lower housing member 52 of the clamshell housing assembly 36 cooperatively forms a rear wall 37 implementing a generally cylindrical fluid line retainer 35. As will be better understood further herein, a first clamping member 40 formed at the rear end 39 of the upper housing member 44 implements part of the cylindrical fluid 87 line retainer 35, and a second clamping member 45 formed at the rear end 41 of the lower housing member 52 implements the remaining part the cylindrical fluid line retainer 35. As implemented in accordance with the preferred embodiment of the present invention, the cylindrical fluid line retainer 35 is sized, shaped and otherwise adapted to clamp about the circumference of the distal end 139 of the sheath 138 of the fluid line assembly 135.

To this end, the first clamping member 40 formed in the rear end 39 of the upper housing member 44 has a sufficient wall thickness and is otherwise adapted to produce a first clamping face 46 for engaging a first fraction of the circumference about the distal end 139 of the sheath 138 of the fluid line assembly 135. Likewise, the second clamping member 45 formed in the rear end 41 of the lower housing member 52 has a sufficient wall thickness and is otherwise adapted to produce a second clamping face 54 for engaging a remaining second fraction of the circumference about the distal end 139 of the sheath 138 of the fluid line assembly 135. As will in light of this exemplary description be appreciated by those of ordinary skill in the relevant arts, the vertical location of the fluid line assembly 135 through the cooperatively formed rear wall of clamshell housing assembly 36, with respect to the junction of the mated together upper housing member 44 and lower housing member 52, will determine what part of the fluid line assembly retainer is formed in the upper housing member 44 and what remaining part of the cylindrical fluid line retainer 35 is formed in the lower housing member 52.

In addition to implementing the cylindrical fluid line retainer 35, as heretofore described, the cooperatively formed clamshell housing assembly 36 also implements means for securing the header plate 12, and thus each male quick connector 27, operably in place adjacent the rear end 146 of the handle body 145 of the hand-held beverage dispenser 5. Specifically, a plurality of upper and lower header plate retention members 47 and 55 is formed or otherwise provided partially along a respective one of the interior corners of the upper and lower housing members 44 and 52. As shown in the FIGS. 27A-29C, each upper and lower header plate retention member 47 and 55 may be formed respectively as an elongate driver body 49 or 57 extending from the interior side of the rear wall 37 of clamshell housing assembly 36 to a planar face formed at the front end of the upper and lower header plate retention members 47 and 55. As will be better understood further herein, the planar face of each upper and lower header plate retention members 47 and 55 is most preferably located at a single established distance from the rear wall 37 of the clamshell housing assembly 36, and is otherwise adapted to operably engage the rear face 14 of the specially formed header plate 12 in use of the connector assembly 11. Each upper and lower header plate retention member 47 and 55 comprises a clearance hole 42 running longitudinally through the driver body 49 or 57 from the rear face of the cooperatively formed rear wall 37 of the clamshell housing assembly 36 and through the planar face at the front end of the upper and lower header plate retention members 47 and 55. Like the clearance holes 20 through the specially formed header plate 12 as heretofore described, each clearance hole 42 provided through the upper and lower header plate retention members 47 and 55 is sized for free passage of the major threads of the machine screws 43 or the equivalent part of the implemented mounting hardware.

Referring now to FIGS. 33A-69, the connector assembly 185, which specially forms a multi-fitting plug compatible with a multi-port receptacle formed by the flow control assembly 155, is shown to comprise an enclosure subassembly 65 including a first housing member 101 and a second housing member 116 and a header subassembly 66 including a header bar 68. The header bar 68 is configured to secure proximal ends of the multiplicity of individual fluid lines 141 extending from the proximal end 137 of the sheath 138 of the fluid line assembly 135 with a typical barbed quick connect fitting 86 in a splayed arrangement that facilitates capture of the proximal ends of the individual fluids lines 141 and the barbed quick connect fittings 86 by the enclosure subassembly 65.

A typical barbed quick connect fitting 86 as is well known by those of ordinary skill in the relevant arts for conventional use in terminating and connecting such fluid lines 141 is particularly shown in the FIGS. 40-44. The typically used barbed quick connect fitting 86 comprises a generally cylindrical body 89 having a male barbed connector 88 at a first end 90 thereof. As will be better understood further herein, each male barbed connector 88 is sized for connection with the proximal ends of the individual fluid lines 141. The typical barbed quick connect fitting 86 also has a male quick connector 92 at a second end 91 thereof. Additionally, however, a provision is made for, and the male quick connector 92 also includes, one or more circumferential seals, such as O-rings 93 or like seals. As will also be better understood further herein, each male quick connector 92 is sized for insertion within fluid outlet ports 166 of the flow control assembly 155 shown in FIGS. 65A-65B, as represented by the exemplary flow control assembly 155. In any case, an open flow path 87 is longitudinally provided from the first end 90 to the second end 91 through the cylindrical body 89.

As shown in the figures with particular reference to FIGS. 34-39, the specially formed header bar 68 comprises a preferably generally planar rear face 69, which in use of the connector assembly 185 faces away from the fluid outlet ports 166 of the flow control assembly 155, and a preferably generally planar front face 71 facing the fluid outlet ports 166 of the flow control assembly 155, which in use of the connector assembly 185 faces the fluid outlet ports 166 of the flow control assembly 155. A multiplicity of specially formed tapered connector holes 77 are formed or otherwise provided through the header bar 86, each of which comprises a first circular opening 70 at the rear face 69 of the header bar 68 and a second circular opening 72 at the front face 71 of the header bar 68. The first circular opening 70 and the second circular opening 72 are concentrically formed about the longitudinal axis through the connector hole 77, and the first circular opening 70 has a diameter operably less than the diameter of the second circular opening 72, as will be better understood further herein. Additionally, the header bar 68 comprises a notch 76 at each end that, as will be better understood further herein, assists in seating the header bar 68 within the first housing member 101 and the second housing member 116 of the enclosure subassembly 65.

As previously generally described in the previously presented detailed description of the exemplary hand-held beverage dispenser 5, the multiplicity of individual fluid lines 141 conduct various beverage fluids from the flow control assembly 155 to the hand-held beverage dispenser 5 for mixing and dispensing as desired. The multiplicity of fluid lines 141 is conventionally contained within the elongate tubular sheath 138 to form the sheathed fluid line assembly 135. The proximal end from the flow control assembly 155 of each individual fluid line 141 protrudes a short distance from a proximal end 137 of the elongate tubular sheath 138. In use of the present invention, the male barbed connector 88 of a barbed quick connect fitting 86 must be connected in fluid communication to the accessible proximal end of each individual fluid line 141. In implementation of the connector assembly 185 of the present invention the previously described header bar 68 is interposed between the proximal end 137 of the sheath 138 of the fluid line assembly 135 and the proximal end of each individual fluid line 141 as the barbed quick connect fittings 86 are connected to the fluid lines 141.

To begin connection of the barbed quick connect fittings 86 to the proximal ends of the individual fluid lines 141, the header bar 68 is first oriented with the rear face 69 of the header bar 68 facing the individual fluid lines 141 protruding from the proximal end 137 of the sheath 138, as shown in FIGS. 45A-51. The proximal end of a selected one of the individual fluid lines 141 is then inserted through the first circular opening 70 to a tapered connector hole 77 at the rear face 69 of the header bar 68, and through the tapered connector hole 77 to project from the second circular opening 72 of the tapered connector hole 77 at the front face 71 of the header bar 68. The male barbed connector 88 of a barbed quick connect fitting 86 is then inserted into the proximal end of the selected one of the individual fluid lines 141, leaving substantially only the male quick connector 92 of the connected barbed quick connect fitting 86 to project from the proximal end of the selected one of the individual fluid lines 141. The male barbed connector 88 of connected barbed quick connect fitting 86 is then forced through the second circular opening 72 into the tapered connector hole 77, allowing the individual fluid line to retreat as necessary. As previously noted, each tapered connector hole 77 operatively decreases in diameter from the front face 71 to the rear face 69 of the header bar 68, such that the proximal end of the selected one of the individual fluid lines 141 is securely clamped about the male barbed connector 88, and each are frictionally secured within the tapered connector hole 77. This process, which may be conducted in parallel, is applied for each of the individual fluid lines 141, thereby forming the header subassembly 66.

As shown in the figures with particular reference to FIGS. 52-62B, the first housing member 101 comprises an interior 103 and an exterior 102, and the second housing member 116 comprises an interior 118 and an exterior 117. The first housing member 101 in the interior 103 defines a neck forming a first passage member 109, which is cooperatively adapted with a corresponding second passage member 121 formed by a mating neck in the interior 118 of the second housing member 116 for passage into the interior space of the assembled enclosure subassembly 65 of the proximal ends of the individual fluid lines 141 extending from the proximal end 137 of the sheath 138 of the fluid line assembly 135. A first groove segment 110 formed in the first passage member 109 is cooperatively adapted with a second segment 122 formed in the second passage member 126 for capturing the flange 140 about the proximal end 137 of the sheath 138 of the fluid line assembly 135.

Referring still to FIGS. 52-62B, the first housing member 101 comprises a mouth 106 formed in the interior 103 opposite the first passage member 109, and the second housing member 116 comprises a mouth 119 formed in the interior 118 opposite the second passage member 121. As shown in the figures, the mouth 106 of the first housing member 101 includes a first clamping member 107 and the mouth 119 of the second housing member 116 includes a second clamping member 120 for each individual fluid line 141 of the fluid line assembly 135. The provided first and second clamping members 107 and 120 are cooperatively adapted for capturing the barbed quick connect fittings 86 adjacent the male quick connectors 92 such that the male quick connectors 92 extend from the enclosure subassembly 65 in order to interface the connector assembly 185 with a flow control assembly. Additionally, the interior 103 of the first housing member 101 adjacent the first clamping member 107 includes a slot 99 terminating at each end in a cavity 108 formed by a projection 114. The slot 99 receives the header bar 68 therein while each cavity 108 and projection 114 cooperates with a respective notch 76 of the header bar 68 to maintain the header bar 68 oriented within the slot 99 such that the first and second clamping members 107 and 120 capture the barbed quick connect fittings 86 therebetween. The interior 103 of the first housing member 101 further includes a plurality of upwardly extending vertical walls 104 forming interior channels 105 through the enclosure subassembly 65. The channels 105 are provided to assist the header bar 68 in splaying out and facilitating placement of the proximal ends of the individual fluid lines 141 from the fluid line assembly 135 within the enclosure subassembly 65.

As shown in FIGS. 53A-54B, 60, and 63-69, insertion stop wings 112 are formed about the exterior 102 of the first housing member 101 and corresponding insertion stop wings 124 are formed about the exterior 117 of the second housing member 116. The insertion stop wings 112 of the first housing member 101 are cooperatively adapted with stop notches 163 formed in the flow control assembly 155 for controlling insertion depth of the connector assembly 185. Likewise, the insertion stop wings 124 of the second housing member 116 are cooperatively adapted with the corresponding stop notches 160 formed in the flow control assembly 155 for further controlling insertion depth of the connector assembly 185. Additionally, the exterior 117 of the second housing member 116 comprises an insertion alignment tab 125, which is cooperatively adapted with an alignment notch 164 formed in the flow control assembly 155 for facilitating insertion of the connector assembly 185.

Figure 60:
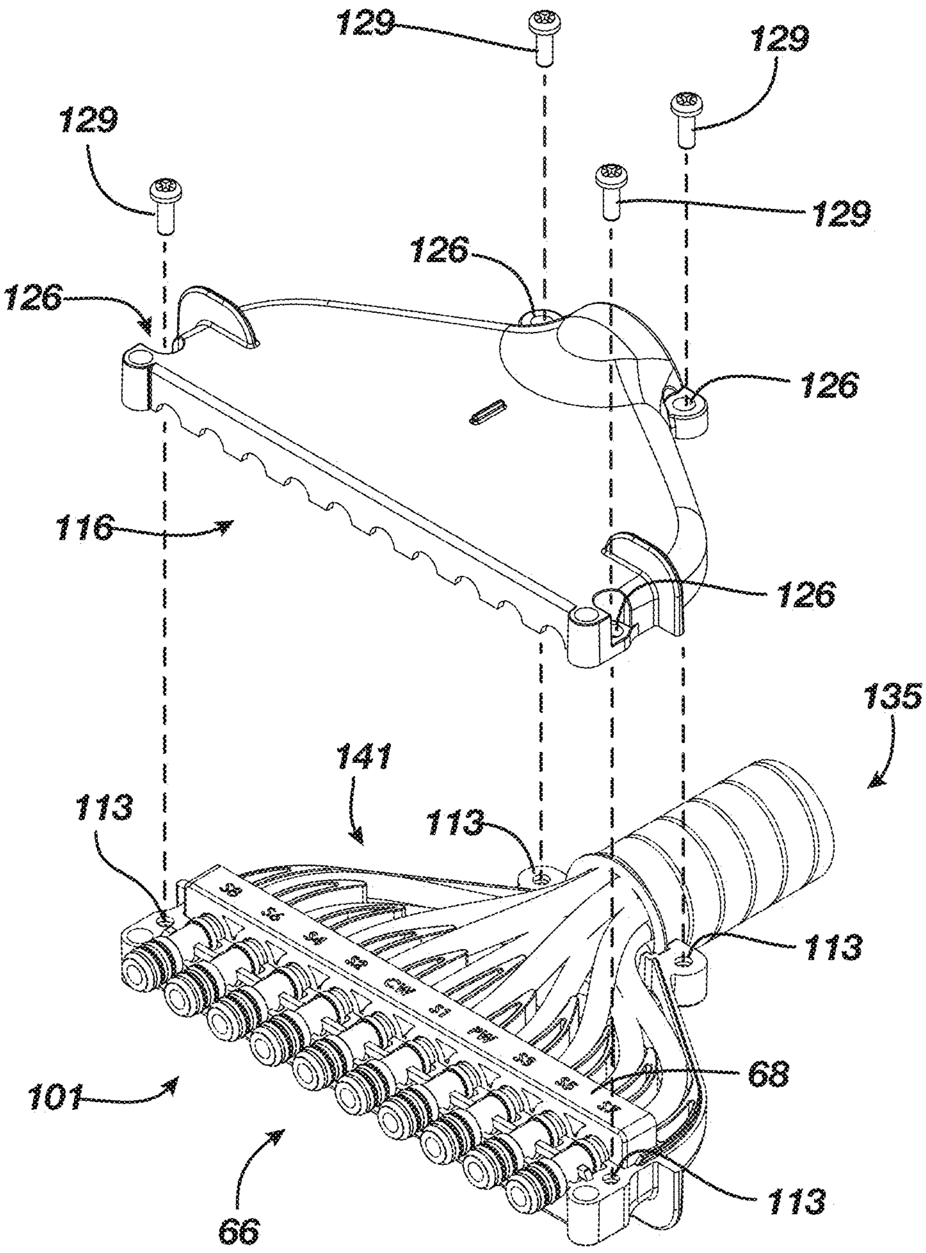
FIG. 60 is a partially exploded top front end isometric view illustrating a second stage in implementation of the second connector assembly wherein the second housing member of the enclosure subassembly of the second connector assembly is mated with the first housing member of the enclosure subassembly about the header subassembly of the second connector assembly.
Figure 61:
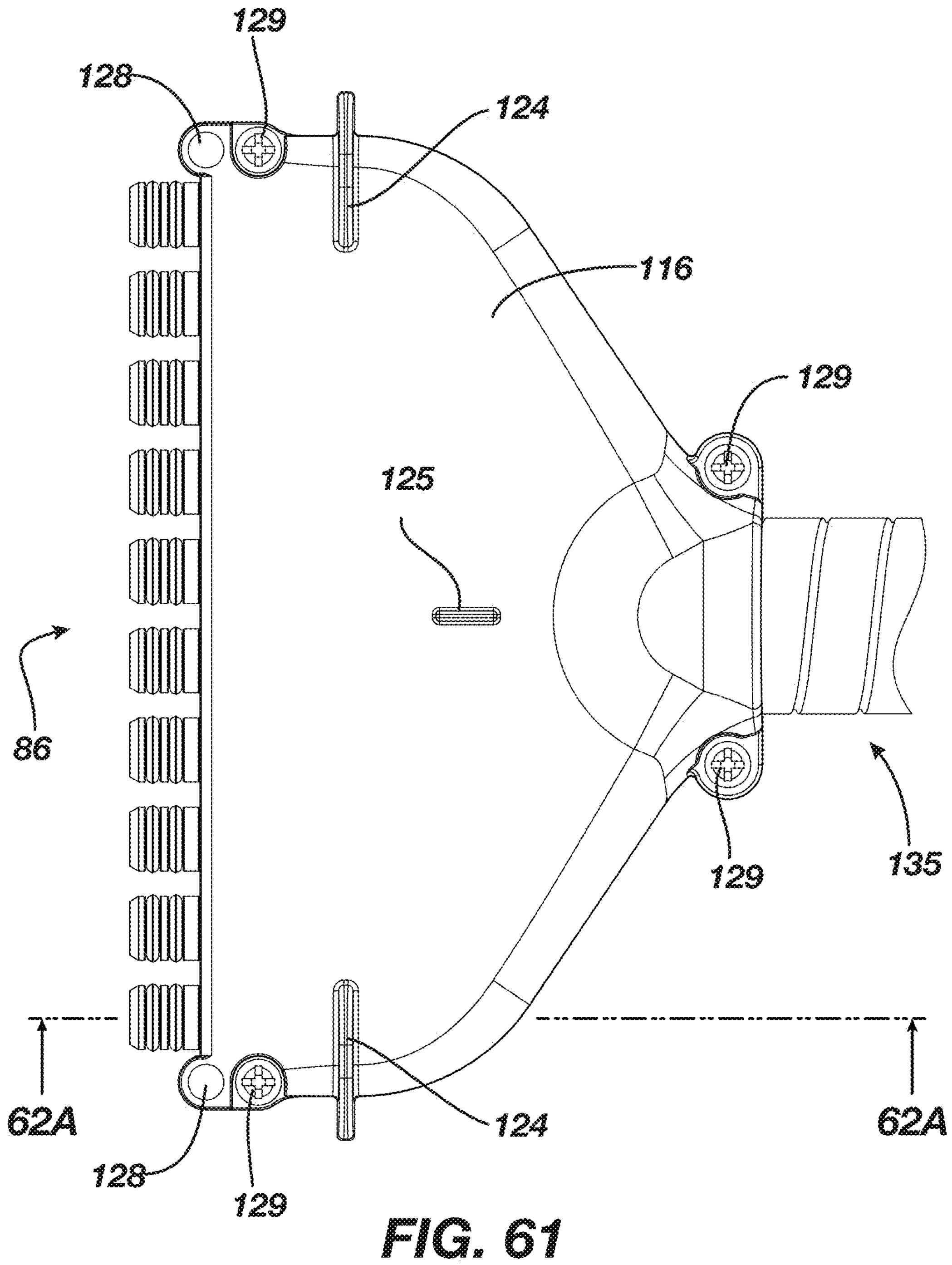
FIG. 61 is a top plan view illustrating the assembled second connector assembly of the fluid line connector arrangement.
Figure 62A:
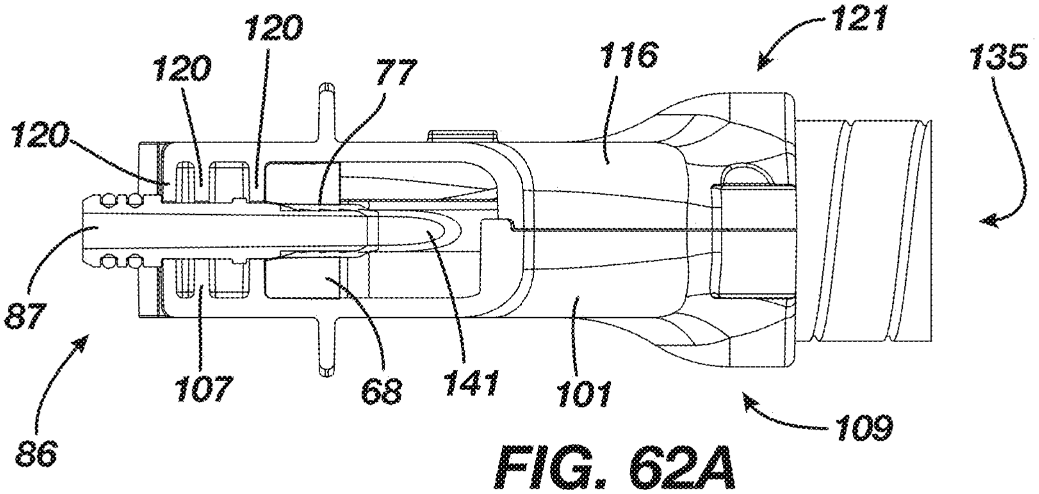
FIGS. 62A-62B illustrate various aspects of the assembled second connector assembly, where.
Figure 62B:
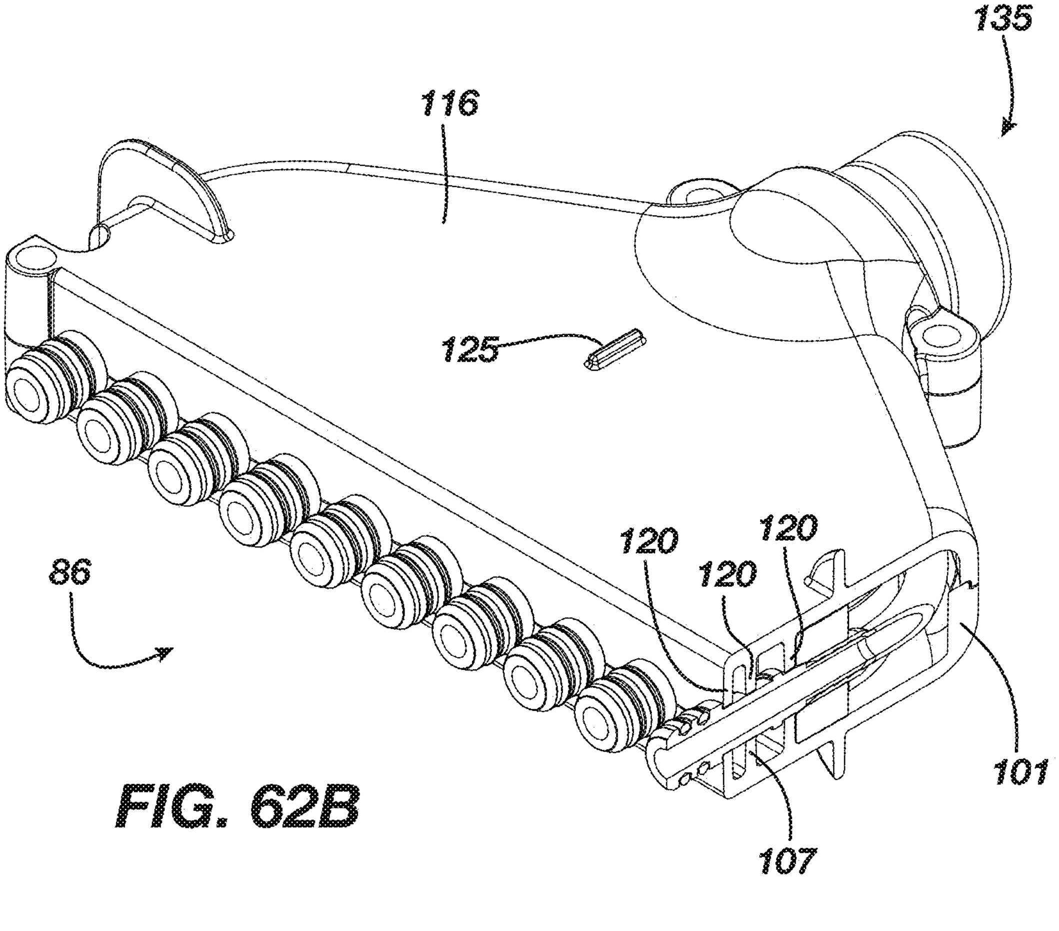
Figure 63:
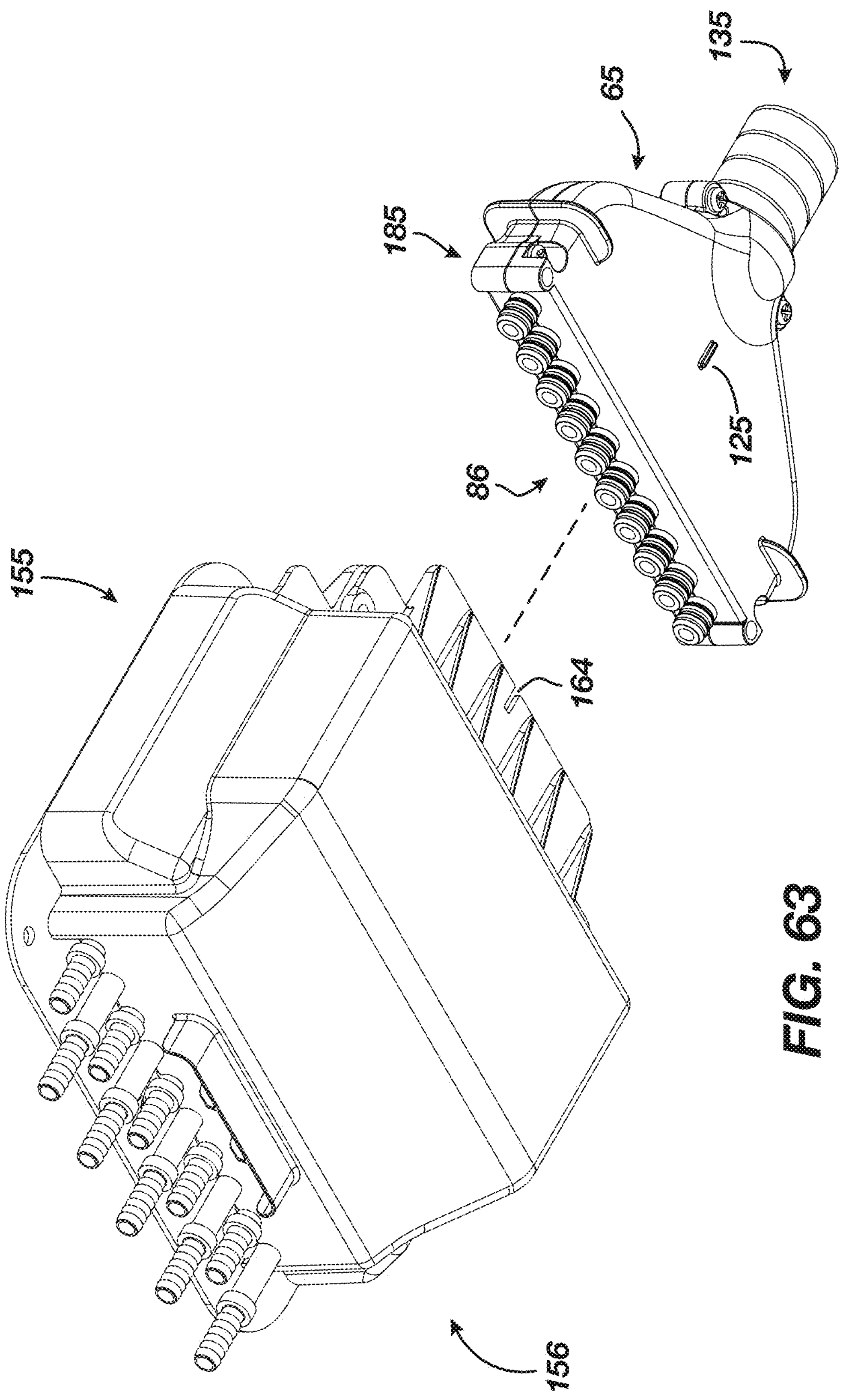
Figure 64:
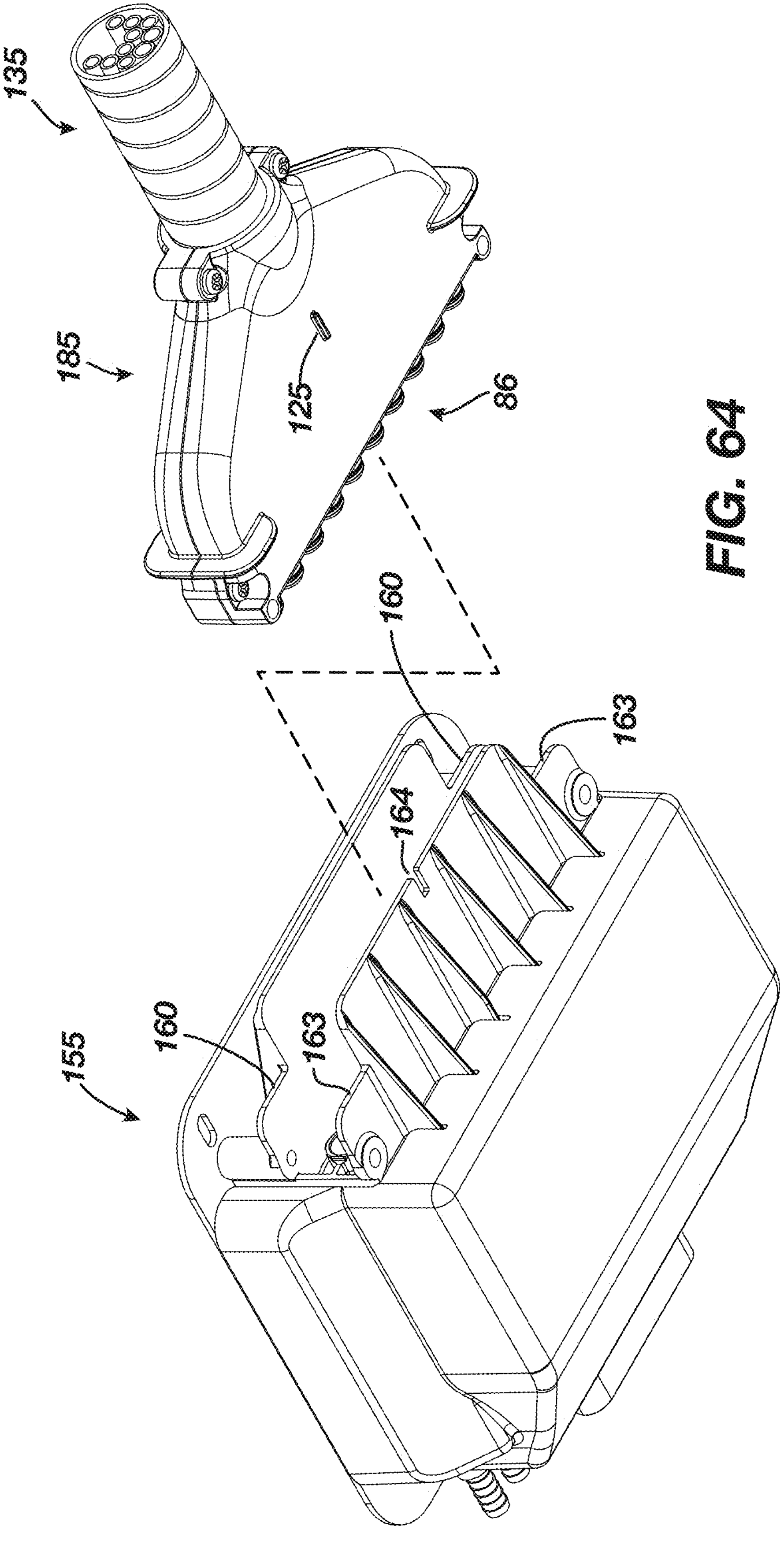
Figure 65A:
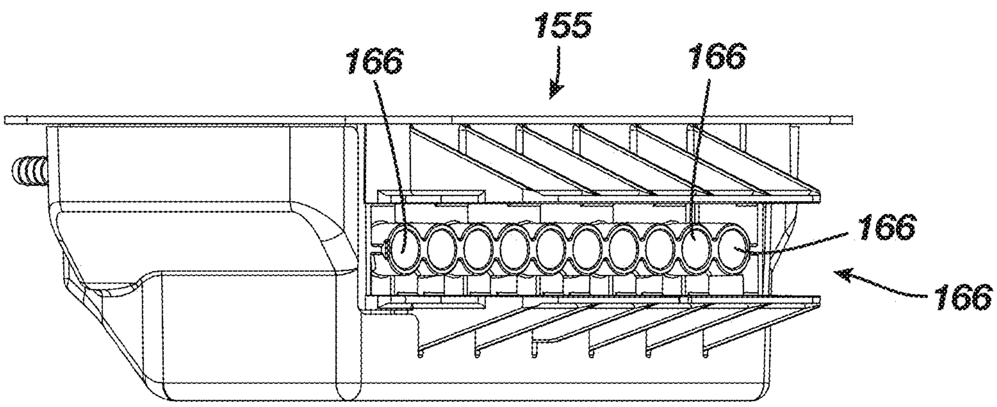
Figure 65B:
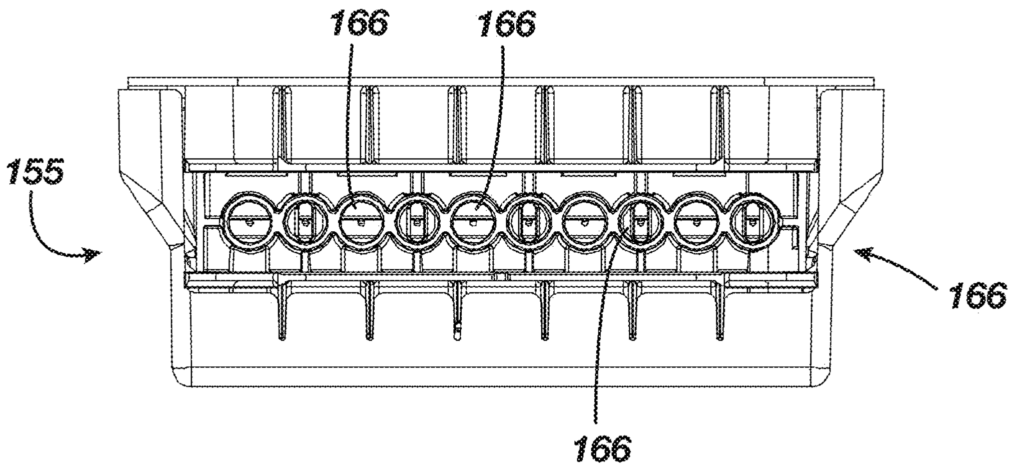
Figure 66:
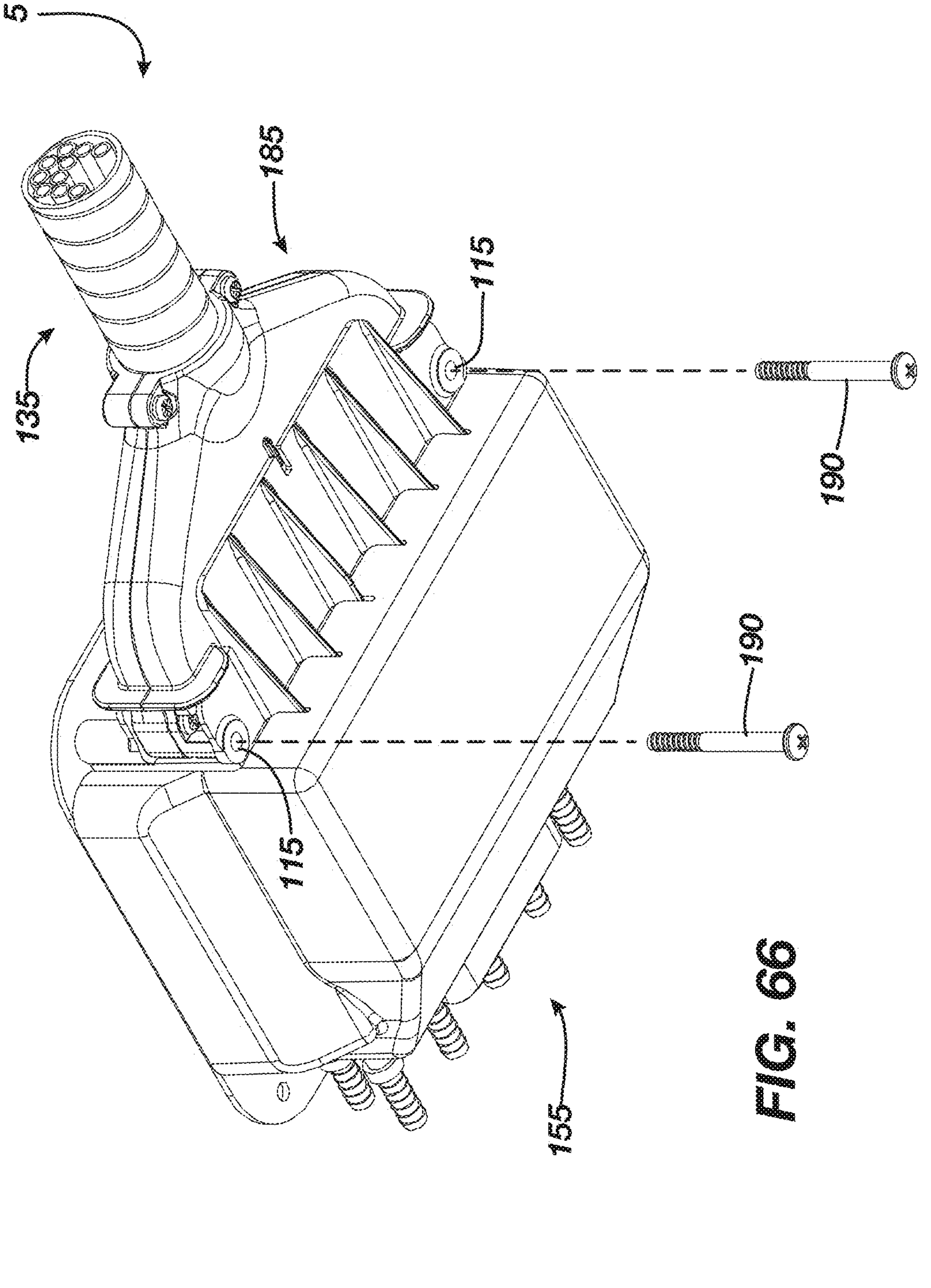
Figure 67:
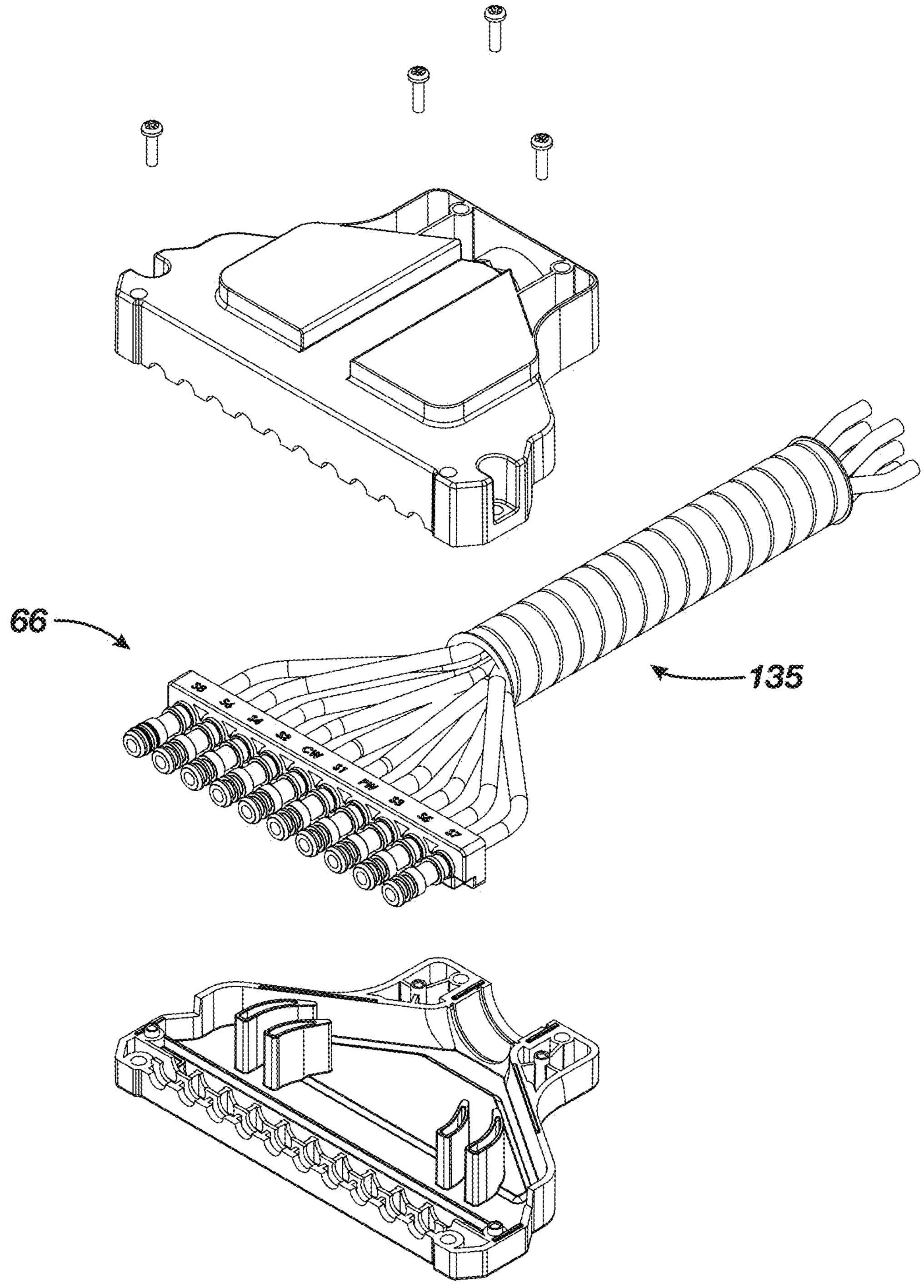
Figure 68:
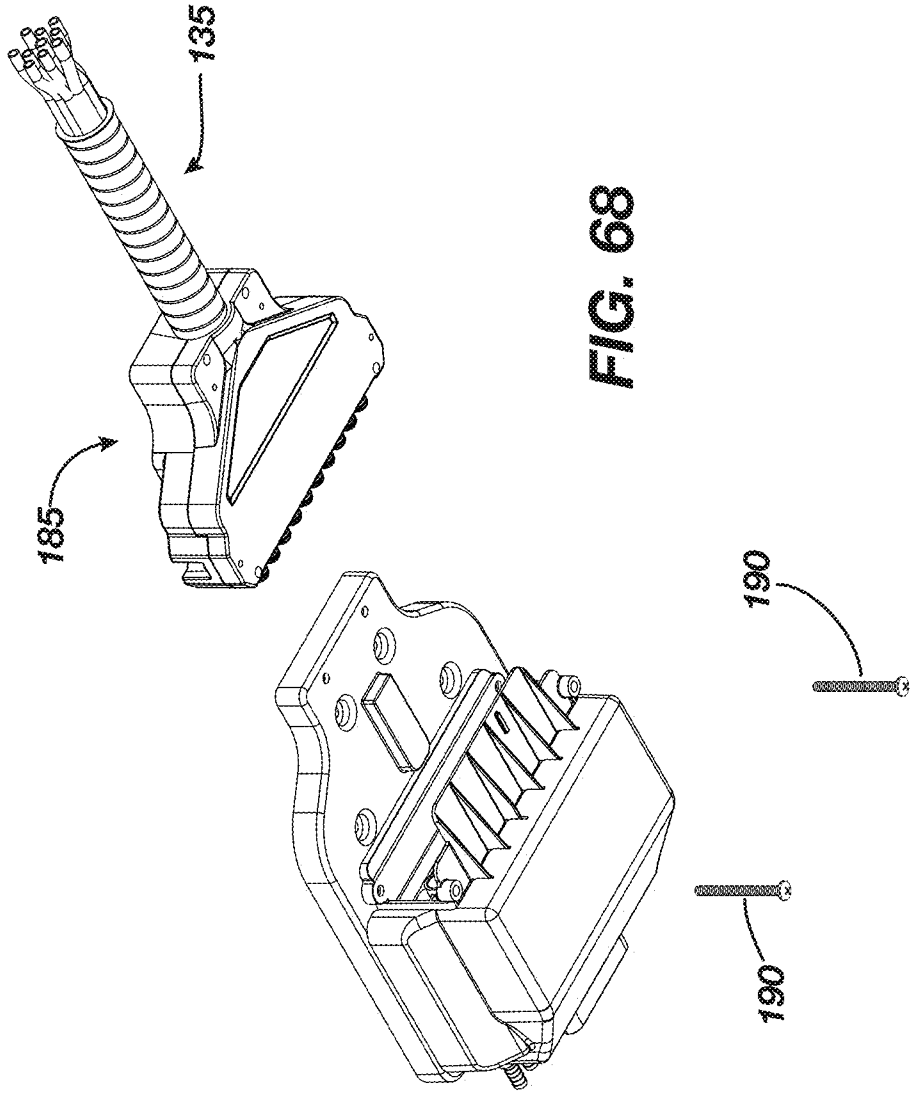

Clearance holes 126 are provided through the second housing member 116 and tapped holes 113 are provided in the first housing member 101 for screws 129 used to affix the first housing member 101 to the second housing member 116 in final assembly of the enclosure subassembly 65 and thus connector assembly 185, as shown in FIG. 60. Clearance holes 115 are provided through the first housing member 101 and clearance holes 128 are provided in the second housing member 116 for screws 190 used to fix the connector assembly 185 operably in place with the flow control assembly 155.

After completing the connector assembly 185, the male quick connector 92 of each of the multiplicity of dependently supported and arranged barbed quick connect fittings 86 is simultaneously inserted into a corresponding one of the fluid outlet ports 166 of the flow control assembly 155 until the insertion stop wings 112 and 124 respectively contact the stop notches 163 and the 160 formed in the flow control assembly 155. At this juncture, all of the individual fluid lines 141 are in fluid communication with a corresponding one of the fluid outlet ports 166 of the flow control assembly 155. With the individual fluid lines 141 are in fluid communication, screws 190 are inserted through clearance holes 115 and 128 for engagement with the flow control assembly 155, thereby affixing the connector assembly 185 operably in place with the flow control assembly 155.

What is claimed is:

1. A fluid line connector arrangement, comprising:

a first connector assembly at the proximal end of a fluid line assembly, the first connector assembly, comprising a header plate, comprising a rear face, a front face, and a multiplicity of tapered connector holes formed through the header plate, wherein each tapered connector hole comprises a first opening at the rear face and a second opening at the front face, further wherein the first opening has a diameter operably less than the diameter of the second opening; and a second connector assembly provided at the distal end of said fluid line assembly, the second connector assembly, comprising a header bar, comprising a rear face, a front face, and a multiplicity of tapered connector holes formed through the header bar, wherein each tapered connector hole comprises a first opening at the rear face and a second opening at the front face, further wherein the first opening has a diameter operably less than the diameter of the second opening.

2. A fluid line connector arrangement, comprising:

a first connector assembly at the distal end of a fluid line assembly, the first connector assembly being configured to connect a multiplicity of individual fluid lines extending from the distal end the fluid line assembly to a hand-held beverage dispenser, and the first connector assembly, comprising a header plate, comprising a rear face, a front face, and a multiplicity of tapered connector holes formed through the header plate, wherein each tapered connector hole comprises a first opening at the rear face and a second opening at the front face, further wherein the first opening has a diameter operably less than the diameter of the second opening; and a second connector assembly provided at the proximal end of the fluid line assembly, the second connector assembly being configured to connect a multiplicity of individual fluid lines extending from the proximal end of the fluid line assembly to a flow control assembly.

3. The fluid line connector arrangement of claim 2, wherein each of the individual fluid lines extending from the distal end the fluid line assembly inserts through the first opening to a tapered connector hole at the rear face of the header plate and through the tapered connector hole to project from the second opening of the tapered connector hole at the front face.

4. The fluid line connector arrangement of claim 3, wherein a multiplicity of barbed quick connect fittings each include a male barbed connector at a first end and a male quick connector at a second end, further wherein each male barbed connector at the male barbed connector thereof inserts into each of the individual fluid lines projecting from the second opening of the tapered connector hole at the front face, leaving the male quick connector of the barbed quick connect fittings to project from the individual fluid lines.

5. The fluid line connector arrangement of claim 4, wherein each male barbed connector of the barbed quick connect fittings is forced through the second opening into the tapered connector hole whereby each tapered connector hole, due to an operative decrease in diameter from the front face to the rear face, clamps each individual fluid line about the male barbed connector thereby frictionally securing each individual fluid line within the tapered connector hole.

6. The fluid line connector arrangement of claim 5, wherein each male quick connector of the barbed quick connect fittings supported and arranged by the header plate inserts into a fluid inlet port of the hand-held beverage dispenser.

7. The fluid line connector arrangement of claim 6, the first connector assembly, comprising a housing assembly cooperatively adapted with the header plate to affix each male quick connector of the barbed quick connect fittings in place within the fluid inlet ports of the hand-held beverage dispenser.

8. The fluid line connector arrangement of claim 7, the header plate including a plurality of clearance holes corresponding to a plurality of threaded holes provided in the hand-held beverage dispenser, wherein mounting hardware for the housing assembly passes through the clearance holes and engages the threaded holes such that the housing assembly and the header plate secure with the hand-held beverage dispenser thereby affixing each male quick connector of the barbed quick connect fittings in place within the fluid inlet ports of the hand-held beverage dispenser.

9. A fluid line connector arrangement, comprising:

a first connector assembly at the distal end of a fluid line assembly, the first connector assembly being configured to connect a multiplicity of individual fluid lines extending from the distal end the fluid line assembly to a hand-held beverage dispenser; and a second connector assembly provided at the proximal end of the fluid line assembly, the second connector assembly being configured to connect a multiplicity of individual fluid lines extending from the proximal end of the fluid line assembly to a flow control assembly, and the second connector assembly, comprising a header bar, comprising a rear face, a front face, and a multiplicity of tapered connector holes formed through the header bar, wherein each tapered connector hole comprises a first opening at the rear face and a second opening at the front face, further wherein the first opening has a diameter operably less than the diameter of the second opening.

10. The fluid line connector arrangement of claim 9, wherein each of the individual fluid lines extending from the proximal end of the fluid line assembly inserts through the first opening to a tapered connector hole at the rear face of the header bar and through the tapered connector hole to project from the second opening of the tapered connector hole at the front face.

11. The fluid line connector arrangement of claim 10, wherein a multiplicity of barbed quick connect fittings each include a male barbed connector at a first end and a male quick connector at a second end, further wherein each male barbed connector at the male barbed connector thereof inserts into each of the individual fluid lines projecting from the second opening of the tapered connector hole at the front face, leaving the male quick connector of the barbed quick connect fittings to project from the individual fluid lines.

12. The fluid line connector arrangement of claim 11, wherein each male barbed connector of the barbed quick connect fittings is forced through the second opening into the tapered connector hole whereby each tapered connector hole, due to an operative decrease in diameter from the front face to the rear face, clamps each individual fluid line about the male barbed connector thereby frictionally securing each individual fluid line within the tapered connector hole.

13. The fluid line connector arrangement of claim 12, the second connector assembly, comprising a first housing member and a second housing member cooperatively adapted to fit together about the header bar thereby forming an enclosure subassembly that captures each of the barbed quick connect fittings supported and arranged by the header bar such that each male quick connector of the barbed quick connect fittings extends from the enclosure subassembly.

14. The fluid line connector arrangement of claim 13, the first housing member including therein a plurality of upwardly extending vertical walls forming interior channels that assist the header bar in splaying out the individual fluid lines extending from the proximal end of the fluid line assembly.

15. The fluid line connector arrangement of claim 13, wherein each male quick connector of the barbed quick connect fittings supported and arranged by the enclosure subassembly and the header plate inserts into a fluid outlet port of the flow control assembly, further wherein affixing the second connector assembly operably in place with the flow control assembly secures each male quick connector of the barbed quick connect fittings within the fluid outlet ports of the flow control assembly.

* * * * *